US009223057B1

(12) United States Patent
Uy

(10) Patent No.: US 9,223,057 B1
(45) Date of Patent: *Dec. 29, 2015

(54) CROWDSOURCING PLATFORMS, SYSTEMS, AND METHODS FOR GENERATING ENVIRONMENTAL DATA REPORTS

(71) Applicant: BLUE TRIBE, INC., Solana Beach, CA (US)

(72) Inventor: Michael G. Uy, Solana Beach, CA (US)

(73) Assignee: BLUE TRIBE, INC., Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/660,501

(22) Filed: Mar. 17, 2015

Related U.S. Application Data

(63) Continuation of application No. 14/498,727, filed on Sep. 26, 2014, now Pat. No. 9,014,983.

(51) Int. Cl.
*G01W 1/02* (2006.01)
*G06F 19/00* (2011.01)
*G01V 99/00* (2009.01)

(52) U.S. Cl.
CPC . *G01V 99/00* (2013.01); *G01W 1/02* (2013.01)

(58) Field of Classification Search
CPC .......... G01W 1/02; G01W 1/00; G01C 23/00; G01C 21/00; G06F 1/3203; G06F 1/3262
USPC .............. 702/3, 93, 122, 141, 175, 182, 183, 702/187; 244/30; 701/117, 119, 540, 517
See application file for complete search history.

(56) References Cited

U.S. PATENT DOCUMENTS

| | | | |
|---|---|---|---|
| 6,811,113 B1 | 11/2004 | Silansky et al. | |
| 7,440,848 B2 | 10/2008 | Anderson | |
| 7,751,977 B2 | 7/2010 | Winkler et al. | |
| 8,725,462 B2 | 5/2014 | Jain et al. | |
| 8,731,835 B2 | 5/2014 | Chidlovskii et al. | |
| 8,793,062 B2 | 7/2014 | Fino | |
| 9,014,983 B1* | 4/2015 | Uy .................................. | 702/3 |
| 2012/0130625 A1 | 5/2012 | Srivastava | |
| 2012/0215446 A1 | 8/2012 | Schunder et al. | |
| 2013/0222369 A1 | 8/2013 | Huston et al. | |
| 2014/0201251 A1 | 7/2014 | Bao et al. | |

OTHER PUBLICATIONS

Accelerometer, Sensors Actuators Interfaces Communication Tutorials References. http://www.sensorwiki.org/doku.php/sensors/accelerometer [accessed Oct. 8, 2014] (5 pgs).

(Continued)

*Primary Examiner* — John H Le
(74) *Attorney, Agent, or Firm* — Wilson, Sonsini, Goodrich & Rosati

(57) ABSTRACT

The platforms, systems, methods and computer readable media provided herein monitor a shore or near shore environment using a plurality of sensors, each sensor associated with a near shore water recreationist or near shore water recreationist equipment. The platforms, systems, methods and computer readable media provided herein include a server application configured to generate and transmit an environmental data report. The platforms, systems, methods and computer readable media provided herein include a device configured to receive the environmental data report.

21 Claims, 40 Drawing Sheets

(56) References Cited

OTHER PUBLICATIONS

Accelerometer. Wikipedia, the free encyclopedia. http://en.wikipedia.org/wiki/Accelerometer. [accessed Oct. 8, 2014] (13 pgs).
Argo. http://www.argo.ucsd.edu/ [accessed Oct. 8, 2014] (2 pgs).
California Coastal Commission. http://www.coastal.ca.gov/pubs.html [accessed Oct. 8, 2014] (7 pgs).
Center for Coastal Monitoring and Assessment (CCMA). http://coastalscience.noaa.gov/about/centers/ccma [accessed Oct. 8, 2014] (3 pgs).
Co-pending U.S. Appl. No. 14/498,727, filed Sep. 26, 2014.
Co-pending U.S. Appl. No. 14/660,538, filed Mar. 17, 2015.
Coxworth. Computer-equipped surfboard could lead to, like, totally awesome boards. 9*30*3020. http://www.gizmag.com/computer-equipped-surfboard-could-lead-to-like-totally-awesome-boards/16090/ [accessed Oct. 10, 2014] (5 pgs).
Duffy. The Best Activity Trackers for Fitness. PC Magazine. May 21, 2014. http://www.pcmag.com/article2/0,2817,2404445,00.asp (6 pgs).
Garmin. http://sites.garmin.com/forerunnerCoach/ [accessed Oct. 8, 2014] (10 pgs).
iTunes Preview. https://itunes.apple.com/us/app/sensorlog/id388014573?mt=8 [accessed Oct. 8, 2014] (3 pgs).
Kennedy. 3 Types of Marine Algae. Seaweeds Come in Brown, Green and Red. Marine Life. http://marinelife.about.com/od/plants/tp/typesofalgae.htm [accessed Oct. 8, 2014] (16 pgs).
Magicseaweed. http://magicseaweed.com/ [accessed Oct. 8, 2014] (6 pgs).
Marine Microbes. C-More BioLincs. http://cmore.soest.hawaii.edu/cruises/biolincs/microbes.htm [accessed Oct. 8, 2014] (4 pgs).
National Data Buoy Center (NDBC). http://www.ndbc.noaa.gov/ [accessed Oct. 8, 2014] (1 pg).
Ocean Water: Salinity. Science & Technology Focus. http://www.onr.navy.mil/focus/ocean/water/salinity1.htm [accessed Oct. 8, 2014] (2 pgs).
Quick. Sensor-packed SurfSens brings surfing into the computer age. Mar. 3, 2011. Gizmag. Sensor-Packed-Surfboard. http://www.gizmag.com/sensor-packed-surfboard/18055/ [accessed Oct. 10, 2014] (5 pgs).
Ramsey. Flexible, Printable Sensors Detect Underwater Hazards. US San Diego News Center. Jul. 2011. http://ucsdnews.ucsd.edu/archive/newsrel/general/20110707UnderwaterSensors.asp (3 pgs).
Ripcurl. http://www.ripcurl.com/searchgps-1.html [accessed Oct. 8, 2014] (2 pgs).
Saildrone. http://www.saildrone.com/ [accessed Oct. 8, 2014] (3 pgs).
Seawater. Wikipedia, the free encyclopedia, http://en.wikipedia.org/wiki/Seawater [accessed Oct. 8, 2014] (5 pgs).
Slobig. A San Diego Company has created a wireless sensor that can be embedded in a surfboard fin to measure ocean acidification. Sep. 4, 2014. http://www.takepart.com/article/2014/09/02/surfers-may-be-soon-collecting-big-data-they-ride-big-waves (7 pgs.).
Surfline. http://www.surfline.com/home/index.cfm [accessed Oct. 8, 2014] (2 pgs).
Surfr. Connecting People to Places. http://surfrapp.co/ [accessed Oct. 8, 2014] (1 pg).
Suunto. http://www.suunto.com/en-US/Products/PODs/Suunto-GPS-Track-POD/ [accessed Oct. 8, 2014] (3 pgs).
Turbulence Kinetic Energy. Wikipedia, the free encyclopedia. http://en.wikipedia.org/wiki/Turbulence_kinetic_energy [accessed Oct. 8, 2014] (2 pgs).
U.S. Environmental Protection Agency (EPA). Coastal Areas. http://www.epa.gov/climatechange/impacts-adaptation/coasts.html [accessed Oct. 8, 2014] (3 pgs.
U.S. Appl. No. 14/498,727 Office Action dated Nov. 20, 2014.
Waze. https://www.waze.com/ [accessed Oct. 8, 2014] (4 pgs).
Whitney. Apple wins patent for crowd-sourced traffic navigation. CNET. Jul. 29, 2014. http://www.cnet.com/news/apple-crowdsourced-traffic-system-would-account-for-stop-lights/ (3 pgs).
Xensr. http://xensr.com/ [accessed Oct. 8, 2014] (3 pgs).
Xprize. Board Formula. http://xprize.boardformula.com/ [accessed Oct. 10, 2014] (2 pgs).
Xprize. Ocean Health. http://oceanhealth.xprize.org/ [accessed Oct. 10, 2014].
U.S. Appl. No. 14/660,538 Office Action dated Jun. 4, 2015.

* cited by examiner

CROWDSOURCING PLATFORMS, SYSTEMS, AND METHODS FOR GENERATING ENVIRONMENTAL DATA REPORTS

CROSS-REFERENCE

This application claims priority to U.S. application Ser. No. 14/498,727, filed Sep. 26, 2014, which is incorporated herein by reference.

BACKGROUND

Shore and near shore environmental data is important for several reasons. Shore and near shore environmental data provides useful information for water recreationalists and ocean sports enthusiasts. Moreover, shore and near shore environmental data provides critical insights for understanding and protecting the coastal environment and monitoring climate change.

SUMMARY OF THE INVENTION

Current information detailing a shore and near shore environment (e.g., wave heights, etc.) are generated using data that is geographically removed from the shore and near shore area. Devices such as buoys are used to collect data, for example wave height and/or energy data, at a location that is geographically distant from the shore and near shore area. In order to generate an estimation of the shore and near shore environment, the collected data is manipulated, for example, the data is interpolated, extrapolated, correction factors added or subtracted, and/or modeled based on an assumed topology of the shore or near shore area.

As an example, NOAA places buoys in the ocean to collect wave data that is far removed from the shore. This data, for example, is used along with assumptions of the ocean floor topology to predict wave heights. The ocean floor topology will affect the location of a wave break and the water height in which the wave break occurs. Persons interested in performing an activity in a shore or near shore environment (e.g., surfers, bodyboarders, etc.) use this information to select the coastal region to undertake the activity (e.g., surfing, bodyboarding, etc.). Such methods of determining a shore and near shore environment are erroneous because, for example, the topology of the ocean floor changes and as such the assumptions made in order to provide shore and near shore environmental information are erroneous when such changes are not taken into account.

The subject matter described herein overcomes such problems using systems, methods, media and platforms that collect shore and near shore environmental data based on activities of one or more recreationists at the location of interest. In one example, the data is collected in real-time so that, for example, the data detailing the shore and near-shore environment is location and time accurate. In one or an additional example, such shore and near shore environmental data is stored historically such that the changes can be tracked and used to generate more accurate reports (e.g. surf reports).

Current tracking devices are used to monitor a variety of user data comprising heart rate, pulse, calories burned, gps location, and speed of travel. While these data have been collected to monitor various user activities (e.g., exercise), the inventor of the subject matter described herein applies such data to monitor a shore and near shore environment. Further, in one example, the methods, media, systems, and platforms described herein use a plurality of data from a plurality of devices to generate reports detailing a shore and near shore environment. In some embodiments, a plurality of devices and the data is used in a crowdsourced manner. The systems, methods, media and platforms described herein, in some embodiments, directly monitor in real time the shore and near shore environment so that accurate reports based user activities are generated. In some embodiments, data from other sources (e.g., NOAA buoys) are also incorporated to generate a report on the shore and near shore environment.

Sensors used to monitor a shore and near shore environment are attached to devices comprising buoys and drones. As stated above, the buoys are placed at a geographically distant location making the data collected on the shore and near shore environment less accurate. Drones are sometimes placed near the shore or near shore environment, however they are often disturbed by conditions of the shore and near shore environment (e.g. drift away from site of interest) making the data less accurate and making reports generated therefrom erroneous. The inventor of the subject matter described herein solves this problem by using data collected from sensors attached to, for example, one or more shore or near shore water recreationists and/or one or more pieces of shore or near shore water recreationist equipment. This allows for accurate geographical (e.g., surfer riding a wave, a surfer transitioning from walking to paddling, etc.) and temporal data to be collected and generation of accurate reports therefrom.

In some aspects provided herein is, a shore and near shore environmental data monitoring platform comprising: a plurality of sensors, each sensor associated with a near shore water recreationist or near shore water recreationist equipment, each sensor comprising: a detector configured to collect environmental data pertaining to a shore and near shore environment; and a communications element configured to transmit the environmental data collected by the detector, a server comprising a server processor configured to provide a server application comprising: a software module configured to receive the environmental data; a software module configured to apply an algorithm to the environmental data to determine a shore and near shore environmental condition; a software module configured to generate an environmental data report comprising the shore and near shore environmental condition; and a software module configured to transmit the environmental data report; and a device comprising a report processor configured to provide a report application comprising a software module configured to receive the environmental data report.

In some embodiments, the detector comprises one or more of: an accelerometer, a gyroscope, a compass, a clock or other time monitoring device, a GPS, and an altimeter. In some embodiments, the detector comprises an element configured to determine a condition of the shore or near shore environment, the condition comprising temperature, pH, salinity, turbidity, light, or clarity. In some embodiments, the detector comprises an element configured to monitor bio-matter of the shore or near shore environment, the bio-matter comprising bacteria, algae, fungi, or plankton. In some embodiments, the detector comprises an element to monitor pollution of the shore or near shore environment, the pollution comprising hydrocarbons, radiation, or chemicals. In some embodiments, the detector comprises a location element configured to determine the location of the sensor, the location element comprising a GPS.

In some embodiments, one or more sensors are wearable. In some embodiments, one or more sensors are water-resistant. In some embodiments, the platform comprises more than 1, more than 10, more than 100, more than 1000, more than 10,000, more than 100,000, or more than 1,000,000 sensors.

In some embodiments, the server application further comprises a software module configured to parse and clean the environmental data received from each sensor, the cleaning comprising removing erroneous data, removing outlier data, flagging erroneous data, interpolating missing data, and flagging outlier data. In some embodiments, the server application further comprises a software module configured to apply an algorithm to the cleaned environmental data to generate pre-analytic data, the pre-analytic data comprising events and conditions to which each sensor was subjected. In some embodiments, the server application further comprises a software module configured to apply an algorithm to a set of pre-analytic data to generate analytic data, the analytic data comprising trends of a plurality of events, correlations of a plurality of events, trends of a plurality of conditions, correlations of a plurality of conditions, trends of a plurality of events and conditions, or correlations of a plurality of trends and conditions. In some embodiments, the pre-analytic data comprises user behavior comprising one or more of walking, paddling, swimming, floating, dropping into a wave, riding a wave, wiping out, or exiting a wave. In some embodiments, the pre-analytic data comprises near shore dynamics comprising one or more of shore exposure, sea level rise, wave position, wave travel direction, wave travel speed, wave and set timing, wave kinetic energy, wave potential energy, wave break energy, shore current speed, shore current direction, wave heights, and wave phase. In some embodiments, the pre-analytic data comprises a water condition comprising one or more of temperature, pH, turbidity, salinity and clarity. In some embodiments, the pre-analytic data comprises bio-matter data comprising one or more of a plankton concentration, a bacterium concentration, a fungi concentration, and/or an algae concentration. In some embodiments, the pre-analytic data comprises pollution data comprising one or more of hydrocarbon concentration, radiation level, and toxic chemical concentration. In some embodiments, the analytic data comprises one or more of user behavior analyzed over time, near shore dynamics analyzed over time, water condition analyzed over time, bio-matter data analyzed over time, and pollution data analyzed over time. In some embodiments, the analytic data comprises one or more of user behavior analyzed in aggregate, near shore dynamics analyzed in aggregate, water condition analyzed in aggregate, bio-matter data analyzed in aggregate, and pollution data analyzed in aggregate. In some embodiments, the analytic data comprises surf report features comprising one or more of surf condition, surf condition difficulty level, surf location quality, surf location conditions compared to historical potential, and surf location current ranking compared to other surf locations. In some embodiments, the server application further comprises a software module configured to apply an algorithm to the environmental data to determine one or more of: surf location difficulty level, surf location quality and surf location current ranking as compared to other surf locations. In some embodiments, the server application further comprises a software module configured to apply an algorithm to the environmental data to determine one or more of: surfer wipeouts, surfer wave take rate, and surfer travel direction in a wave.

In some embodiments, the environmental data report is a surf report, comprising one or more of: wave height, wave frequency, wave and set timing, wave speed, current speed and direction, surf conditions, and surf quality. The platform according to claim 1, wherein the environmental data report is a surf report comprising one or more of: surf location difficulty level, surf location quality, surf location conditions compared to historic potential, surf location current ranking as compared to other surf locations, wave frequency, wave and set timing, wave speed, current speed and direction, surf condition, and surf condition difficulty level. In some embodiments, the environmental data report is a meteorological report, wherein the meteorological report comprises one or more of weather information, tide information, water condition, wave height, wave speed, wave frequency and timing, current, surf conditions, and surf quality. In some embodiments, the environmental data report is a geographical report, the geographical report comprising one or more of sea-level rise, coastline changes, and shore and near shore topology. In some embodiments, the environmental data report is an ecological report, the ecological report comprising one or more of erosion, bio-matter data, pollution, and water composition. In some embodiments, the environmental data report is a municipal report, the municipal report comprising information related to infrastructure development, transportation, residential development, and adaptation. In some embodiments, the environmental data report comprises one or more of a surf report, a meteorological report, a geographical report, an ecological report, and a municipal report.

In some embodiments, the near shore water recreationist comprises a surfer, a paddle boarder, a body boarder, a boogie boarder, a kayaker, a swimmer, or a person in the water. In some embodiments, the near shore water recreationist is a surfer. In some embodiments, the sensor is worn by the near shore water recreationist, the sensor worn on a wrist, an armband, a piece of clothing, a wet suit, a piece of footwear, or a piece of swimwear. In some embodiments, the near shore water recreationist equipment comprises a surfboard, a kayak, a paddle board, a body board, a raft, an inner tube, or a flotation device. In some embodiments, the near shore water recreationist equipment is a surfboard.

In some embodiments, the communications element is configured to transmit the environmental data to the software module configured to receive the environmental data. In some embodiments, the communications element is configured to transmit the environmental data to a computational device, the computational device comprising a communications element configured to transmit the environmental data to the software module configured to receive the environmental data. In some embodiments, the computational device further comprises a processor configured to provide an application comprising a software module configured to apply an algorithm to the environmental data received from the sensor to clean the environmental data, the cleaned environmental data transmitted to the server. In some embodiments the raw data is also transmitted to the server. In some embodiments, the computational device further comprises a processor configured to provide an application comprising a software module configured to apply an algorithm to the cleaned environmental data to generate pre-analytic data, the pre-analytic data transmitted to the server. In some embodiments, the sensor transmits the environmental data to the computational device wirelessly. In some embodiments, the sensor transmits the environmental data to the computational device through a wired connection. In some embodiments, the device comprises the sensor, the device comprising a communications element configured to transmit the environmental data to the software module configured to receive the environmental data. In some embodiments, the device further comprises a processor configured to provide an application comprising a software module configured to apply an algorithm to clean the environmental data, the cleaned environmental data transmitted to the server. In some embodiments the raw data is also transmitted to the server. In some embodiments, the device further comprises a processor configured to provide an application comprising a software module configured to apply an algorithm to the cleaned environmental data to generate pre-analytic data, the pre-analytic data transmitted to the server.

In some embodiments, the device comprises the sensor, the device comprising a communication module to transmit the environmental data to a computational device, the computational device comprising a communication module configured to transmit the environmental data to the software module configured to receive the environmental data. In some embodiments, the computational device further comprises a processor configured to provide an application comprising a software module configured to apply an algorithm to the environmental data received from the sensor to clean the environmental data, the cleaned environmental data transmitted to the server. In some embodiments the raw data is also transmitted to the server. In some embodiments, the computational device further comprises a processor configured to provide an application comprising a software module configured to apply an algorithm to the cleaned environmental data to generate pre-analytic data, the pre-analytic data transmitted to the server. In some embodiments, the device transmits the environmental data to the computational device wirelessly. In some embodiments, the device transmits the environmental data to the computational device through a wired connection. In some embodiments, the device comprises a cellular phone, a smart phone, a smart watch, a computer, a tablet computer, a Rip Curl surf watch, a Xensr Move, a Fit Bit, an activity tracking device, or a personal activity or health tracking device. In some embodiments, the computational device comprises a computer, a cellular phone, a smart phone, a tablet, or a smart watch.

In some embodiments, the server processor is configured to provide an application to receive environmental data from an external institution. In some embodiments, the external institution comprises a government research facility, a research institute, a university, a college, a corporation, a non-government organization, or a non-profit entity.

In some embodiments, the platform further comprises an application programming interface, the application programming interface providing access to the environmental data. In some embodiments, the platform further comprises an application programming interface, the application programming interface providing access to the cleaned or pre-analytic data. In some embodiments, the platform further comprises an application programming interface, the application programming interface providing access to the analytic data. In some embodiments, the platform further comprises a graphical user interface, the graphical user interface providing access to the environmental data. In some embodiments, the platform further comprises a graphical user interface, the graphical user interface providing access to the cleaned pre-analytic data. In some embodiments, the platform further comprises a graphical user interface, the graphical user interface providing access to the analytic data.

In some embodiments, the report processor is further configured to provide an application to provide an interface to display the environmental data report. In some embodiments, the report processor is further configured to provide an application comprising a software module configured to retrieve from the server one or more of: the environmental data or the shore and near shore environmental condition. In some embodiments, the environmental data report is generated in real-time or is generated according to a timed delay. In some embodiments, the device is a cellular phone, a smart phone, a smart watch, a tablet computer, a laptop computer, a personal computer, an activity tracking device, or a personal activity tracking device. In some embodiments, the device is a cellular phone, a smart phone, a smart watch, a tablet computer, a laptop computer, a personal computer, an activity tracking device, or a personal activity tracking device. In some embodiments, the report processor is further configured to provide an application to provide an interface to display the environmental data report.

In one aspect provided herein is a shore and near shore environmental data monitoring platform comprising: a plurality of sensors, each sensor associated with a surfer or surf equipment, each sensor comprising: a detector comprising an accelerometer, a gyroscope, a compass, an altimeter and a location element configured to determine the location of the sensor, the detector configured to collect environmental data pertaining to the shore and near shore environment when the surfer is surfing; and a communications element configured to transmit the environmental data collected by the detector; a server comprising a server processor configured to provide a server application comprising: a software module configured to receive the environmental data from the plurality of sensors; a software module configured to clean the environmental data received from each sensor, the cleaning comprising removing erroneous data, removing outlier data, flagging erroneous data, interpolating missing data, and flagging outlier data a software module configured to apply an algorithm to the environmental data received from each sensor to generate pre-analytic data comprising one or more of: shore exposure, wave height, wave position, wave travel direction, wave travel speed, wave timing, set timing, wave kinetic energy, wave potential energy, wave break energy, shore current speed, shore current direction, and wave phase; a software module configured to apply an algorithm to a set of pre-analytic data to generate analytic data comprising one or more of: surf report features comprising surf condition, surf condition difficulty level, surf location wave quality, surf location current conditions compared to historical potential, and surf location current ranking as compared to other surf locations; and a software module configured to generate an environmental data report comprising one or more pieces of analytic data; and a software module configured to transmit the environmental data report; and an external device comprising a report processor configured to provide a report application comprising a software module configured to receive the environmental data report and a software module configured to provide an interface configured to display the environmental data report.

In one aspect provided herein is a computer-implemented system for shore and near shore environmental data monitoring, the system comprising: a digital processing device comprising an operating system configured to perform executable instructions and a memory; a computer program including instructions executable by the digital processing device to create an application comprising: a software module configured to receive environmental data from a plurality of sensors, each sensor associated with a near shore water recreationist or near shore water recreationist equipment, each sensor comprising a detector configured to collect environmental data pertaining to the shore and near shore environment and a communications element configured to transmit the environmental data collected by the detector; a software module configured to apply an algorithm to the environmental data to determine a shore and near shore environmental condition; a software module configured to generate an environmental data report comprising the shore and near shore environmental condition; and a software module configured to transmit the environmental data report; wherein the environmental data report is transmitted to a device comprising a report processor configured to provide a report application comprising a software module configured to receive the environmental data report.

In one aspect provided herein is Non-transitory computer-readable storage media encoded with a computer program including instructions executable by a processor to create an application comprising: a software module configured to receive environmental data from a plurality of sensors, each sensor associated with a near shore water recreationist or near shore water recreationist equipment, each sensor comprising a detector configured to collect environmental data pertaining to the shore and near shore environment and a communications element configured to transmit the environmental data collected by the detector; a software module configured to apply an algorithm to the environmental data to determine a shore and near shore environmental condition; a software module configured to generate an environmental data report comprising the shore and near shore environmental condition; and a software module configured to transmit the environmental data report; wherein the environmental data report is transmitted to a device comprising a report processor configured to provide a report application comprising a software module configured to receive the environmental data report.

DETAILED DESCRIPTION OF THE INVENTION

Figure 1A:
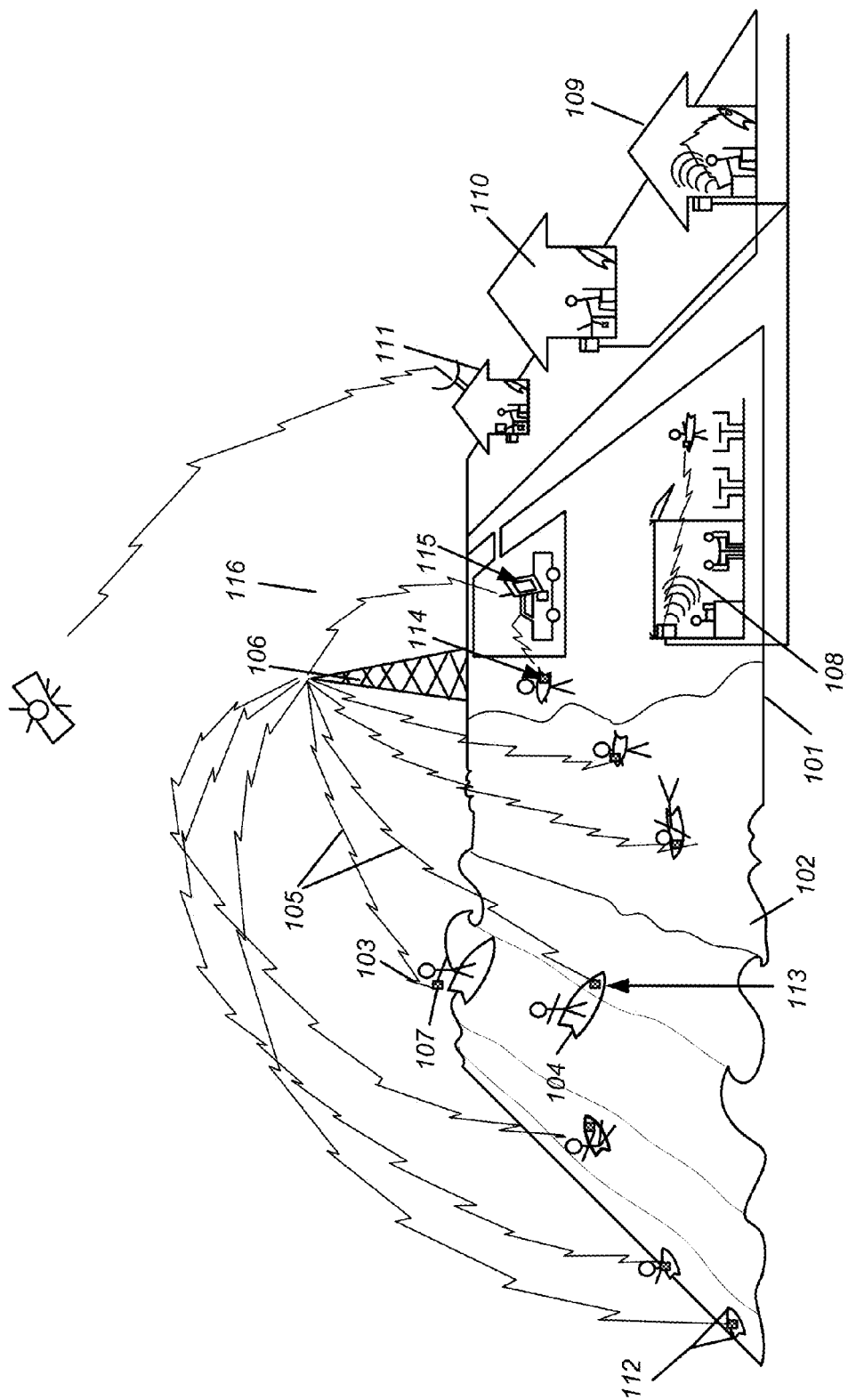
FIG. 1A and FIG. 1B show a non-limiting example of the platforms, systems, methods and computer readable media to monitor a shore and near shore environment.

In certain aspects described herein are platforms, systems, methods and computer readable media to monitor a shore and near shore environment. In some embodiments, the platforms, systems methods and media comprise a plurality of sensors, each sensor associated with a near shore water recreationist or near shore water recreationist equipment, each sensor comprising: a detector configured to collect environmental data pertaining to a shore and near shore environment; and a communications element configured to transmit the environmental data collected by the detector, a server comprising a server processor configured to provide a server application comprising: a software module configured to receive the environmental data; a software module configured to apply an algorithm to the environmental data to determine a shore and near shore environmental condition; a software module configured to generate an environmental data report comprising the shore and near shore environmental condition; and a software module configured to transmit the environmental data report; and a device comprising a report processor configured to provide a report application comprising a software module configured to receive the environmental data report.

In some aspects described herein is a shore and near shore environmental data monitoring platform comprising: a plurality of sensors, each sensor associated with a near shore water recreationist or near shore water recreationist equipment, each sensor comprising: a detector configured to collect environmental data pertaining to a shore and near shore environment; and a communications element configured to transmit the environmental data collected by the detector, a server comprising a server processor configured to provide a server application comprising: a software module configured to receive the environmental data; a software module configured to apply an algorithm to the environmental data to determine a shore and near shore environmental condition; a software module configured to generate an environmental data report comprising the shore and near shore environmental condition; and a software module configured to transmit the environmental data report; and a device comprising a report processor configured to provide a report application comprising a software module configured to receive the environmental data report.

In some aspects described herein is a computer-implemented system for shore and near shore environmental data monitoring, the system comprising: a digital processing device comprising an operating system configured to perform executable instructions and a memory; a computer program including instructions executable by the digital processing device to create an application comprising: a software module configured to receive environmental data from a plurality of sensors, each sensor associated with a near shore water recreationist or near shore water recreationist equipment, each sensor comprising a detector configured to collect environmental data pertaining to the shore and near shore environment and a communications element configured to transmit the environmental data collected by the detector; a software module configured to apply an algorithm to the environmental data to determine a shore and near shore environmental condition; a software module configured to generate an environmental data report comprising the shore and near shore environmental condition; and a software module configured to transmit the environmental data report; wherein the environmental data report is transmitted to a device comprising a report processor configured to provide a report application comprising a software module configured to receive the environmental data report.

In some aspects described herein are non-transitory computer-readable storage media encoded with a computer program including instructions executable by a processor to create an application comprising: a software module configured to receive environmental data from a plurality of sensors, each sensor associated with a near shore water recreationist or near shore water recreationist equipment, each sensor comprising a detector configured to collect environmental data pertaining to the shore and near shore environment and a communications element configured to transmit the environmental data collected by the detector; a software module configured to apply an algorithm to the environmental data to determine a shore and near shore environmental condition; a software module configured to generate an environmental data report comprising the shore and near shore environmental condition; and a software module configured to transmit the environmental data report; wherein the environmental data report is transmitted to a device comprising a report processor configured to provide a report application comprising a software module configured to receive the environmental data report.

In some aspects described herein is a shore and near shore environmental data monitoring platform comprising: a plurality of sensors, each sensor associated with a surfer or surf equipment, each sensor comprising: a detector comprising an accelerometer, a gyroscope, a compass, an altimeter and a location element configured to determine the location of the sensor, the detector configured to collect environmental data pertaining to the shore and near shore environment when the surfer is surfing; and a communications element configured to transmit the environmental data collected by the detector; a server comprising a server processor configured to provide a server application comprising: a software module configured to receive the environmental data from the plurality of sensors; a software module configured to clean the environmental data received from each sensor, the cleaning comprising removing erroneous data, removing outlier data, flagging erroneous data, interpolating missing data, and flagging outlier data a software module configured to apply an algorithm to the environmental data received from each sensor to generate pre-analytic data comprising one or more of: shore exposure, wave position, wave height, direction or wave breaking, wave direction, wave travel speed, wave timing, set timing, wave kinetic energy, wave potential energy, breaking wave energy, water current speed, water current direction, wave phase, and user activity comprising one or more of: wipeout, walking, paddling, wave riding, swimming; a software module configured to apply an algorithm to a set of pre-analytic data to generate analytic data comprising one or more of: surf report features comprising surf condition, surf condition difficulty level, surf location wave quality, surf location current conditions compared to historical potential, and surf location current ranking as compared to other surf locations; and a software module configured to generate an environmental data report comprising one or more pieces of analytic data; and a software module configured to transmit the environmental data report; and an external device comprising a report processor configured to provide a report application comprising a software module configured to receive the environmental data report and a software module configured to provide an interface configured to display the environmental data report.

In some aspects provided here is a computer-implemented system for shore and near shore environmental data monitoring, the system comprising: a digital processing device comprising an operating system configured to perform executable instructions and a memory; a computer program including instructions executable by the digital processing device to create an application comprising: a software module configured to receive environmental data from a plurality of sensors, each sensor associated with a surfer or surfboard, each sensor a detector comprising an accelerometer, a gyroscope, a compass, an altimeter and a location element configured to determine the location of the sensor, the detector configured to collect environmental data pertaining to the shore and near shore environment when the surfer is surfing; and a communications element configured to transmit the environmental data collected by the detector; a software module configured to clean the environmental data received from each sensor, the cleaning comprising removing erroneous data, removing outlier data, flagging erroneous data, interpolating missing data, and flagging outlier data; a software module configured to apply an algorithm to a set of pre-analytic data comprising one or more of: shore exposure, wave position, wave travel direction, wave travel speed, wave timing, set timing, wave kinetic energy, wave potential energy, wave break energy, shore current speed, shore current direction, and wave phase, and user activity comprising one or more of: wipeout, walking, paddling, wave riding, swimming; a software module configured to apply an algorithm to a set of pre-analytic data to generate analytic data comprising one or more of: surf report features comprising surf condition, surf condition difficulty level, surf location wave quality, surf location current conditions compared to historical potential, and surf location ranking as compared to other surfing locations; a software module configured to generate an environmental data report comprising one or more pieces of analytic data; and a software module configured to transmit the environmental data report; wherein the environmental data report is transmitted to an external device comprising a report processor configured to provide a report application comprising a software module configured to receive the environmental data report and a software module configured to provide an interface configured to display the environmental data report.

In some aspects provided here is a non-transitory computer-readable storage media encoded with a computer program including instructions executable by a processor to create an application comprising: a software module configured to receive environmental data from a plurality of sensors, each sensor associated with a surfer or surfboard, each sensor comprising a detector comprising an accelerometer, a gyroscope, a compass, an altimeter and a location element configured to determine the location of the sensor, the detector configured to collect environmental data pertaining to the shore and near shore environment when the surfer is surfing; and a communications element configured to transmit the environmental data collected by the detector; a software module configured to clean the environmental data received from each sensor, the cleaning comprising removing erroneous data, removing outlier data, flagging erroneous data, interpolating missing data, and flagging outlier data; a software module configured to apply an algorithm to a set of pre-analytic data comprising one or more of: shore exposure, wave position, wave travel direction, wave travel speed, wave timing, set timing, wave kinetic energy, wave potential energy, wave break energy, shore current speed, shore current direction, and wave phase, and user activity comprising one or more of: wipeout, walking, paddling, wave riding, swimming; a software module configured to apply an algorithm to a set of pre-analytic data to generate analytic data comprising one or more of: surf report features comprising surf condition, surf condition difficulty level, surf location wave quality, surf location current conditions compared to historical potential, and surf location current conditions ranking as compared to other surf locations; a software module configured to generate an environmental data report comprising one or more pieces of analytic data; and a software module configured to transmit the environmental data report; wherein the environmental data report is transmitted to an external device comprising a report processor configured to provide a report application comprising a software module configured to receive the environmental data report and a software module configured to provide an interface configured to display the environmental data report.

In some aspects described here are platforms, systems, methods and media that non-invasively collect ocean data by crowdsourcing one or more near shore water recreationists and/or one or more pieces of near shore water recreationist equipment. In some embodiments, the platforms, systems, methods and media crowdsource data from surfers and other people in the water wearing activity monitors, aggregate the data onto a remote server via a network or a cloud, and use proprietary methods on the sensor, server or a connected secondary computing platform to calculate surf and other oceanographic conditions. In some embodiments, data is aggregated for multiple locations, and in historical catalogs. In some embodiments, the platforms, systems, methods and media described herein are asynchronous or synchronous. In some embodiments, asynchronous data is stored by the sensor (or a device with sensors such as a smartphone) and uploaded via an app or other method such as connecting with computer once the surfer gets out of the water and is in proximity to a smartphone, laptop, designated location, a hot spot or some other network. In some embodiments, asynchronous data is uploaded in real-time (or with a reasonable delay), while the data is gathered. In some embodiments, the transmission method is a cellular network or a specialized microcellular network locate on-shore or in the ocean.

In some embodiments, it is not necessary for all near shore water recreationists, for example surfers, in an area to have sensors in order to draw conclusions about that area; most water recreationists tend to move around in an activity area or "operational area" (OA) that overlaps with other water recreationists. In some embodiments, because ocean waves have a regular shape and characteristic phase cycle, it can be inferred that certain environmental events or phenomena (such as waves) occur in a certain sequence and within a certain span of area even if only one part is sampled by an individual or group of individuals. In some embodiments, data is uploaded to a server that "cleans" the data (checks for validity, and adjusts or corrects errors if necessary), and curates the data on a managed storage device. In some embodiments, an API facilitates reading data to and from the database by other apps or software (including third-party clients). In certain embodiments, processing of environmental data pertaining to a shore and near shore environment occurs on the sensor itself (smart sensor), or via an intermediary that reads the data from the sensor, and/or on the server that ingests raw data from a "dumb" sensor with telemetry capabilities.

In some embodiments, there are two types of sensing schemes with a group of surfer/individuals in the water wearing activity sensors: spatial sensing and temporal sensing. In certain embodiments, in spatial sensing, at any given time (t), the location of different sensors in the water is aggregated to derive a state of a defined area. In some embodiments, a surfer sitting on the outside is drifting due to a current, another surfer is paddling through a wave with a particular velocity, and force and another surfer is surfing the same wave with a different velocity and height. At the same time, on another wave in another position, other surfers are recording different states unique to that wave.

In some embodiments, in temporal sensing, as an individual surfer moves through an operational area over time, the surfer encounters various conditions and events that are recorded. In some embodiments, the surfer starts out walking and then paddling through white water of a broken wave close to shore. In some embodiments, as the surfer heads out, the surfer duck dives under a wave with particular force and velocity. In some embodiments, the surfer then encounters yet another wave, unbroken of a particular velocity, height, etc. In some embodiments, the temporal sensing works no matter which way a surfer is going, for example, paddling out, surfing, sitting in one place, and/or drifting as the current carries the surfer in a particular direction at a particular speed. From these events, various characteristics from topography to dynamics of the coastline and near shore waters are determined.

In some aspects described herein are platforms, systems, methods and media for determining shore exposure from multiple, directly sampled, randomly originated data points. In some embodiments, shore exposure is a relative indicator of the boundary between the swash zone and surf zone. In some embodiments, the platforms, systems, methods and media determine how much of the beach is exposed by examining how much the water line has moved onshore. In some embodiments, for surfers, it helps to know whether a high tide has limited access by completely covering the beach or if a low tide presents a longer than usual walk to get to the water. In some embodiments, the platforms, systems, methods and media compare a "paddle point line" for a particular section of the coastline, to determine how much of the beach is exposed. In some embodiments, the paddle point line is a line across a section of shore that represents the average distance from a baseline on shore of individual paddle points created by one or more rides from one or more surfers over a period of time. In some embodiments, individual paddle points are a location in the surf zone and/or swash zone where a surfer switches from walking to paddling out on their board. In some embodiments, surfers will walk out into the surf, and then start paddling when the water gets to about knee to waist deep, in some embodiments this is the "paddle point." In some embodiments, the platforms, systems, methods and media record the paddle points of one or more rides from one or more surfers over a period of time and mathematically determine the average distance of through those points from a baseline on shore. In some embodiments, the platforms, systems, methods and media determine the distance of this average line from a baseline to determine shore exposure. In some embodiments, the baseline on shore is the boundary of the beach, a berm crest, a dune base, or a particular structure such as a sea wall, wave break, or parking lot, or a topographic mechanism such as a relief line or contour line of a specific altitude, or a mathematically determined line or curve of any of the foregoing, such as an average berm crest line, average beach boundary line, averaged altitude contour line. In some embodiments, the shore exposure for multiple, adjacent locations of the shore can be determined by determining the paddle point line for each section and then fitting a curve through a point in each line in each section. In some embodiments the fitted curve is the shore exposure contour line. In some embodiments, the width of each shore section does not have to be equal or proportional to determine a shore exposure contour line across multiple sections of shore. In some embodiments, the paddle point line for a single section or the shore exposure contour line across multiple sections is expressed by its location (i.e., GPS) position.

In some aspects described herein are platforms, systems, methods and media for determining predominant direction of wave breaks from multiple, directly sampled, randomly originated data points. In some embodiments, the platforms, systems methods and media count the number of times a motion sensor or GPS determines that a surfer goes left or right on a wave. In some embodiments, a ride in either direction is counted for the cases when the surfer's direction is parallel to the face of the wave and the forward velocity (heading towards shore) is equal to the speed of the wave. In some embodiments, rides that occur closer to the shore and have relatively straight trajectories are not counted, as these are most likely beginners riding on the inside after the wave has broken. In some embodiments, when a significant amount of directional rides occur in a specific location, the number of rides in one or more directions are counted and the one or more directions are assigned a frequency (x %); thus a break can be described as having waves that are 70% left, 10% right with 20% closeouts (straight).

In some aspects provided herein are platforms, systems, methods and media for determining a surfing wipeout using accelerometers and position sensors. In some embodiments, the platforms, systems, methods and media use one or more curves from a multi-axis accelerometer, or gyroscope. In some embodiments, data from an accelerometer and/or a gyroscope is used to collect data that indicate a sudden spike in movement followed by a period of turbulent movement, then followed by a period of more controlled movement. In some embodiments, the spike indicates an initial crash, and the turbulent movement is the board or individual tumbling in the surf. In some embodiments, it is important to look for the pattern following a drop-in and—if present—a ride.

In some aspects provided herein are platforms, systems, methods and media for determining, a quantitative measurement of the energy contained in a breaking wave. In some embodiments of the platforms, systems, methods and media described herein use the accelerometer and/or gyroscope data when the surfer or similar near-shore water recreationist wipes out to determine the wave energy. In some embodiments, a wipe-out is determined when the accelerometer data registers a sudden magnitude increase in one or more axis, and is followed by a relatively longer period of large-amplitude noise in all axes as the surfer and board tumble through the surf. In some embodiments, the pattern may or may not follow a ride, as some surfers wipe out on the drop. In some embodiments, a drop-in is determined by downward motion and sometimes a corresponding negative acceleration. In some embodiments, several data sets for a particular break within a specific time period are recorded and averaged to arrive at a characterizing index for the wave strength conditions at that break (e.g., a "crush factor"). In some embodiments, the area underneath an accelerometer curve, and/or a gyroscope curve is used to determine an energy magnitude. In some embodiments a relationship exists between the energy of the wave and Turbulent Kinetic Energy (TKE).

In some aspects provided herein are platforms, systems, methods and media for determining shore current from multiple, directly sampled, randomly originating data points. In some embodiments, while surfers are sitting in a line-up waiting for a wave, the platforms, systems, methods and media described herein measure drift that may be occurring via GPS, accelerometer, gyroscope and/or compass. In some embodiments, the component of the vector that is parallel to the shore is presented as the shore current. In some embodiments, current is measured for a surfer sitting, drifting while drifting, paddling out, and/or drifting while paddling out.

In some aspects provided herein are platforms, systems, methods and media for determining shore current from multiple, directly sampled, randomly originating data points. In some embodiments, while surfers are sitting in a line-up waiting for a wave, the platforms, systems, methods and media described herein measure drift that may be occurring via GPS, accelerometer, gyroscope and/or compass. In some embodiments, the component of the vector that is perpendicular to the shore is presented as the rip current. In some embodiments, a rip current is detected and/or monitored. In the case of a rip current, drift vector is generally perpendicular to the beach. In some embodiments, rip current drifts are correlated with other drift readings in the area to determine the width of the rip current.

In some aspects provided herein are platforms, systems, methods and media for determining the quality of surf conditions at a break by measuring activity tracker data and self-assigned ability level from multiple participants. In some embodiments, the quality of surf conditions is similar to assigning ski difficulty ratings to a surf site based on the data gathered about the site that day. In some embodiments, a user creates a profile in an application and assigns him a skill level rating (e.g., beginner, novice, skilled, advanced, pro). In some embodiments, when data from an activity tracker is uploaded to a master database, it is tagged with the skill level to qualify it. In some embodiments, the platforms, systems, methods and media determine skill rating by examining ride data sets for multiple surfers in each category (e.g., beginner, novice, skilled, advanced, pro). In some embodiments, the length of one or more rides, number of waves ridden in one session, and the number of waves ridden compared to number of waves presented (take rate) are used. In some embodiments, categories that have tight clustering of ride lengths (a plurality of many rides of similar length) and waves ridden, and higher take rates compared to other categories are most likely doing so because the conditions are favorable, so in some embodiments it is inferred the break is suitable for that group of riders. In some embodiments, a rating to the break is assigned. In some embodiments, categories that have a higher percentage of successfully rides and higher take rates compared to other categories are most likely doing so because the conditions are favorable for the category, as such in some embodiments it is inferred that the break is suitable for that group of riders and is assigned a corresponding ranking.

In some aspects provided herein are platforms, systems, methods and media for determining wave height without the use of an altimeter. In some embodiments, accelerometer data, and/or gyroscope data are used to determine a surfer is riding down the face of a wave. In some embodiments, if no wipeout occurs, an estimate of the wave face height is determined by using physics formulas to calculate free fall adjusted for resistance from the water and angle of descent. In some embodiments, for a specific acceleration within a given period of time, the distance traveled is estimated and used to calculate to the wave face height. In some cases, travel down the wave manifests as a significant spike in the negative direction in at least one accelerometer or gyroscopic axis.

In some aspects provided herein are platforms, systems, methods and media to determine the wave quality, or "surfability" or "stoke factor" of a particular wave break. In some embodiments, in a given time period at a particular break, the waves that pass under surfers while the surfers are sitting still, waiting in the line-up are measured. In some embodiments, the number of waves ridden and the total number of waves (those ridden+those passed up) are compared, and the value is averaged across all surfers in a particular location. In some embodiments, this value is the stoke factor. In some embodiments, the stoke factor describes the percentage of waves that are "worth riding," independent of the height of the wave or skill level of the surfers. In some embodiments, taken waves are calculated using accelerometer curves and position data to determine whether a surfer attempted and/or completed a ride. In some embodiments, taken waves include waves where a surfer makes an attempt, but then "misses" (backs out or falls out) the wave, or wipes out. In some embodiments, the number of passed up waves are calculated using the number of vertical bobbing cycles that occur while a surfer is sitting still on their board, waiting for a wave. In some embodiments, it is possible that on some days, surfers may just hang out in the lineup and talk instead of surfing, which on such days it is assumed that even if the waves are rideable, but surfers are willing to pass them up to talk, then the wave quality is relatively not good, which would be thusly reflected by a lower stoke factor.

In some aspects provided herein are platforms, systems, methods and media for ranking wave condition across multiple locations relative to the wave location's potential. In some embodiments, the ranking is referred to as a real ranking. In some embodiments, for a particular break, the range of wave heights and other conditions such as wave quality over a period of time are recorded. In some embodiments, a history of these conditions is recorded and used to determine a historical running average for each value. In some embodiments, based on these conditions, the current day's wave heights are compared and the break is rated based on this comparison. In some embodiments, conditions comprise typical, good, better than normal, worse than normal, exceptionally good, or exceptionally bad. In some embodiments, a list of the breaks ranked according to these ratings is created. In some embodiments, the list ranks breaks based on potential and not only by wave height. In some embodiments, the ranking provides surfers with an easy way to qualitatively assess conditions at multiple surf locations at a glance, and understand whether a break is having an exceptionally good day and should be visited. In some embodiments, the real ranking can also be comprised of the quality rating for the break paired with the difficulty rating for that break to indicate for which skill level or type of surfing the rating best applies, for example breaks that are "good for beginner," "good for intermediate," "good for expert."

In some aspects provided herein are platforms, systems, methods and media for providing a significance rating to qualify the integrity or reliability of crowd sourced data. In some embodiments, the significance rating uses surf conditions. In some embodiments, the significance rating uses any crowdsourced data set and/or any data set. In some embodiments, the statistically significant number of samples, n, that need to be obtained to reach a statistically significant confidence level, for example greater than or equal to about 50%, about 55%, about 60%, about 65%, about 70%, about, 75%, about 80%, about 85%, about 90%, about 95%, about 99%, or equal to 100%, is calculated and displayed as an indicator when presenting results/analysis to show the viability of the data being presented. In some embodiments, the indicator is a meter type or a single state status indicator with an optional numerical label. In some embodiments, the rating provides users with a quick way to qualitatively decide whether data presented from a crowdsourced report is accurate. In some embodiments, a report with a low significance rating (data gathered from only a few people) is less likely to be accurate, and one with a high significance rating (data gathered from a plurality of people) is more likely to be representative of actual conditions.

In some aspects provided herein are platforms, systems, methods and media for visualizing ocean conditions in a time-variable environment. In some embodiments, conditions update continually as new data is received. In some embodiments, a main graphical view presents a break and is updated as new data comes in at regular intervals from a cloud computation source. In some embodiments, the main view graphically depicts the shoreline with waves breaking, wave break direction, and wave height. In some embodiments, the main view also shows other crowdsourced information such as hazards or notable points of interest. In some embodiments points of interest comprise a dolphin sighting, a shark sighing, a hazard sighting, and/or an aggressive surfer. In some embodiments, additional data can also be manually entered by other surfers or users either in the same application or via a separate application. In some embodiments, tapping the display with a finger causes more detailed information to be displayed on the interface. In some embodiments, wave shapes are used to display data such as break direction, and/or wave phase such as bumps, rising, breaking/cresting, and/or white water. In some embodiments, a straight line is used to indicate where rising wave swells were occurring. In some embodiments, a user interacts with the display by tapping the interface to display the lineup positions and tracks of surfers providing data. In some embodiments, a user interacts with the display using pinching and spreading to zoom in and out. In some embodiments, a user is able to scroll and choose from a list of breaks. A user is able to choose a break by progressively zooming into a map. In some embodiments, rotating the orientation of a mobile device while in the main view shows a secondary view that contains information comprising graphical information on wave timing. In some embodiments, a user is able to swipe across the secondary view to display more detail comprising wave and set timing details. In some embodiments, wave heights and distribution are graphically depicted, the distribution calculated by collecting a plurality of wave height data and then summarizing for a particular time interval by height and frequency of occurrence; for example, if waves were 3-5 foot in the last hour, 45% were 3-footers, 35% were 4-footers, and 25% were 5-footers. In some embodiments, a user can interact with the screen to change the wave height increments in real time, for example from greater than or equal to 1 foot, to greater than or equal to 2 foot, 2.5 foot, 3 foot, 3.5 foot, 4 foot, 4.5 foot, 5 foot, 5.5 foot, 6 foot, 6.5 foot, 7 foot, 7.5 foot, 8 foot, 8.5 foot, 9 foot, 9.5 foot, 10 foot, or greater, or from less than or equal to 1 foot to less than or equal to 0.5 foot, 1.0 foot, 1.5 foot, 2.0 foot, 2.5 foot, 3 foot, 3.5 foot, 4 foot, 4.5 foot, 5 foot, 5.5 foot, 6 foot, 6.5 foot, 7 foot, 7.5 foot, 8 foot, 8.5 foot, 9 foot, 9.5 foot, 10 foot, or greater. In some embodiments, when graphically depicting wave and set timing, two wave sets are shown: one representing the smallest set, and the other representing the largest set. In some embodiments, waves are displayed at varying heights. In some embodiments, in order to crowdsource wave and set timing data, the vertical bobbing of each surfer in the line-up is tracked against their GPS position and clock time.

Certain Definitions

Unless otherwise defined, all technical terms used herein have the same meaning as commonly understood by one of ordinary skill in the art to which the invention belongs. As used in the specification and the appended claims, the singular forms "a," "an," and "the" include plural references unless the context clearly dictates otherwise. Any reference to "or" herein is intended to encompass "and/or" unless otherwise stated.

Near Shore Water Recreationist and Equipment

In certain aspects described herein are platforms, systems, methods and computer readable media to monitor a shore and near shore environment. In some embodiments, the platforms, systems methods and media comprise a plurality of sensors, each sensor associated with a near shore water recreationist or near shore water recreationist equipment, each sensor comprising: a detector configured to collect environmental data pertaining to a shore and near shore environment; and a communications element configured to transmit the environmental data collected by the detector.

In some embodiments, the near shore water recreationist comprises a surfer, a paddle boarder, a body boarder, a boogie boarder, a kayaker, a swimmer, or a person in the water. In some embodiments, the near shore water recreationist is a surfer. In some embodiments, the sensor is worn by the near shore water recreationist, the sensor worn on a wrist, an armband, a piece of clothing, a wet suit, a piece of footwear, or a piece of swimwear. In some embodiments, the sensor is operatively attached to the near shore water recreationist by a piece of clothing, a piece of swimwear, a string, a cable, and/or a leash. In some embodiments, the leash is operatively connected to a wrist, an arm, an ankle, a leg, a waist, a torso, and/or a body of the near shore water recreationist. In some embodiments, the near shore water recreationist equipment comprises a surfboard, a kayak, a paddle board, a body board, a raft, an inner tube, or a flotation device. In some embodiments, the near shore water recreationist equipment is a surfboard. In some embodiments, the sensor is operatively connected to the near shore water recreationist by a leash and the leash is operatively connected to the near shore water recreationist equipment. In some embodiments, the near shore water recreationist equipment comprises a buoy, an anchor, and/or a dock. In some embodiments, the near shore water recreationist equipment comprises a boat, a jet-ski, a waverunner, a water sled, a water ski. In some embodiments, the near shore water recreationist equipment comprises a fishing lure, a fishing line, a fishing pole, and/or a piece of fishing equipment.

Referring to FIG. 1A, in some embodiments, the near shore water recreationist or near shore water recreationist equipment is located in a shore or near shore environment. In some embodiments, a shore area 101 is present in the shore or near shore environment. In some embodiments, a body of water 102 is present in the shore or near shore environment. In some embodiments, the body of water is an ocean. In some embodiments, the near shore water recreationist 103 or near shore water recreationist equipment 104 is performing an activity in the body of water. In some embodiments the near shore water recreationist 103 or near shore water recreationist equipment 104 comprises a sensor 113 and the sensor is configured to transmit 105 data to the server, the transmission in some embodiments going through a cellular tower or micro-cellular tower 106. In some embodiments a mobile device 107 comprises the sensor and/or the detector. In some embodiments, the device is configured to transmit 105 data to the server, the transmission in some embodiments going through a cellular tower 106. In some embodiments, the device is configured to transmit data to the server, the transmission in some embodiments going through a public 108 wireless network, a private 109 wireless network, a wired network 110, or a satellite network 111. In some embodiments the device is a cellular phone, table, smart phone, or a computer. In some embodiments the device is operatively attached to the near shore water recreationist and/or the near shore water recreationist equipment. In some embodiments, the near shore water recreationist equipment comprises a moored or untethered flotation platform such as a buoy 112. In some embodiments, a sensor transfers 105 environmental data to a cellular network tower 106. In some embodiments, the sensor and/or detector 114 transfers environmental data to a mobile device 115 and the device transfers 116 data to a cellular network tower.

Figure 1B:
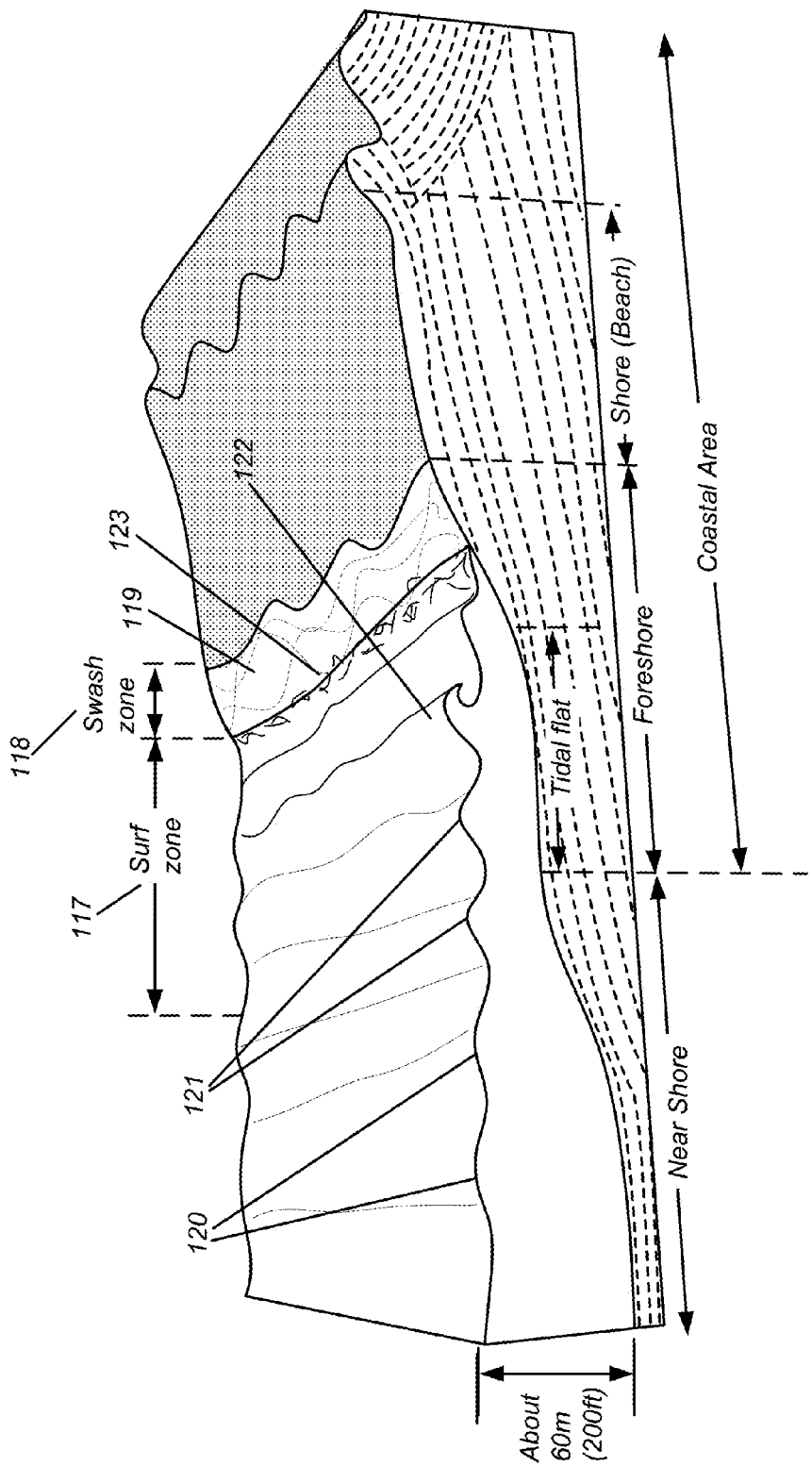

Referring to FIG. 1B, depicted is a non-limiting example of the shore and near shore environment. In some embodiments, the shore and near shore environment comprises a surf zone, 117 and a swash zone 118, wherein the surf zone at least partially overlaps the near shore region and comprises one or more of bumps 120, rising waves 121, breaking waves 122, and white water 123, and wherein the swash zone comprises swash 119. In some embodiments swash is the area of the shore and near shore environment wherein surfers typically switch from walking to paddling on their surfboard. In some embodiments the shore and near shore environment depicted in FIG. 1B represents the shore and near shore environment depicted in FIG. 1A.

Sensors, Detectors and Environment

In certain aspects described herein are platforms, systems, methods and computer readable media to monitor a shore and near shore environment. In some embodiments, the platforms, systems methods and media comprise a plurality of sensors, each sensor associated with a near shore water recreationist or near shore water recreationist equipment, each sensor comprising: a detector configured to collect environmental data pertaining to a shore and near shore environment; and a communications element configured to transmit the environmental data collected by the detector, a server comprising a server processor configured to provide a server application comprising: a software module configured to receive the environmental data; a software module configured to apply an algorithm to the environmental data to determine a shore and near shore environmental condition; a software module configured to generate an environmental data report comprising the shore and near shore environmental condition; and a software module configured to transmit the environmental data report; and a device comprising a report processor configured to provide a report application comprising a software module configured to receive the environmental data report. In some embodiments the platforms, systems, methods and computer readable media comprise more than 1, more than 10, more than 100, more than 1000, more than 10,000, more than 100,000, or more than 1,000,000 sensors.

In some embodiments, the detector comprises one or more of: an accelerometer, a gyroscope, a compass, a clock, a GPS, and an altimeter. In some embodiments, the accelerometer is configured to measure proper acceleration of the detector. In some embodiments, the accelerometer measures capacitance to detect acceleration. In some embodiments, the accelerometer is a capacitance-based accelerometer. In some embodiments, the accelerometer utilizes the piezoelectric effect to detect acceleration. In some embodiments, the accelerometer is piezoelectric based accelerometer. In some embodiments the accelerometer is configured to measure within a range of up to about +/−5 g. In some embodiments the accelerometer is configured to measure within a range of up to about +/−10 g. In some embodiments the accelerometer is configured to measure within a range of up to about +/−15 g. In some embodiments the accelerometer is configured to measure within a range of up to about +/−25 g. In some embodiments the accelerometer is configured to measure within a range of up to about +/−50 g. In some embodiments the accelerometer is configured to measure within a range of up to about +/−100 g. In some embodiments the accelerometer is configured to measure within a range of up to about +/−200 g. In some embodiments, the gyroscope is configured to measure orientation of the detector. In some embodiments, the gyroscope is a MEMS gyroscope. In some embodiments, the compass is configured to measure the direction in which the detector is pointing. In some embodiments, the compass is a digital compass. In some embodiments, the altimeter is configured to measure the altitude of the detector. In some embodiments, when the detector comprises an accelerometer, a gyroscope, a compass and an altimeter, the platforms, systems, methods, and media described herein are able to monitor a near shore water recreationist and/or near shore water recreationist equipment speed, change in speed, 3-axis orientation, change in 3-axis orientation, direction with respect to true north, change in direction with respect to true north, altitude, and change in altitude. In some embodiments, the detector comprises a location element configured to determine the location of the sensor. In some embodiments the location element is a GPS device.

In some embodiments, the detector comprises an element configured to determine a condition of the shore or near shore environment, the condition comprising temperature, pH, salinity, turbidity, light, or clarity. In some embodiments the detector is configured to monitor a temperature from about 30° F. to about 100° F., from about 30° F. to about 90° F., from about 30° F. to about 80° F., from about 30° F. to about 70° F., from about 30° F. to about 60° F., from about 40° F. to about 100° F., from about 50° F. to about 100° F., and/or from about 60° F. to about 100° F. In some embodiments, the detector is configured to measure temperature to an accuracy of about 0.1° F., about 0.5° F., about 1° F., about 2° F., or about 5° F. In some embodiments, the detector is configured to measure pH to an accuracy of about 0.000001 pH unit, about 0.00001 pH unit, 0.0001 pH unit, 0.001 pH unit, 0.01 pH units, 0.1 pH unit, 1 pH unit, 2 pH units, 3 pH units and/or about 5 pH units. In some embodiments, the detector is configured to measure pH form about 0 pH units to about 14 pH units and/or any range of pH units therein. In some embodiments, the detector is configured to measure salinity to within a concentration of about 0.1 mM, about 0.2 mM, about 0.5 mM, about 1 mM, about 2 mM, about 5 mM, about 10 mM, about 100 mM, or about 1 M. In some embodiments, turbidity is quantified as the cloudiness or haziness of the water. In some embodiments, the light and/or clarity is quantified as the amount of light that is measured by the detector.

In some embodiments, the detector comprises an element configured to measure and monitor bio-matter concentrations, for example in ppm, of the shore or near shore environment, the bio-matter comprising bacteria, algae, fungi, or plankton. In some embodiments, the bacteria comprise total coliforms, fecal coliforms such as *enterococcus* and *Escherichia coli, vibrio vulnificus*, halophilic bacteria, cyanobacteria, for example, such as *synechococcus, crocosphaera*, and *prochlorococcus*, ammonium oxidizing bacteria, and nitrite oxidizing bacteria. In some embodiments, the detector comprises an element to monitor archaea and/or eukaryotes. In some embodiments, the archaea comprise ammonium oxidizing archaea. In some embodiments, the algae comprise brown algae (phaeophyta), green algae (chlorophyta), and/or red algae (rhodophyta). In some embodiments, the plankton comprise phytoplankton, zooplankton, and/or bacterioplankton. In some embodiments, the detector can measure plankton ranging in size from about 0.2 μm to about 20 cm, from about 0.2 μm to about 30 cm, from about 0.2 μm to about 50 cm, from about 0.2 μm to about 100 cm, from about 0.5 μm to about 20 cm, from about 1 μm to about 20 cm, from about 2 μm to about 20 cm, from about 5 μm to about 20 cm, and/or from about 10 μm to about 20 cm. In some embodiments, bio-matter comprises algae that cause Harmful Algae Blooms (HAB), such as *Karenia brevis*, the algae that causes "Red Tide," or Microcystin produced by cyanobacterial blooms. In some embodiments, the detector comprises an element to monitor pollution of the shore or near shore environment, the pollution comprising hydrocarbons, radiation, or chemicals. In some embodiments, the hydrocarbons comprise petroleum, oil, sewage and/or runoff. In some embodiments, the chemicals comprise petroleum, oil, sewage and/or runoff.

In some embodiments, the sensors are wearable. In some embodiments, the sensors are worn by the near shore water recreationist, the sensor worn on a wrist, an armband, a piece of clothing, a wet suit, a piece of footwear, or a piece of swimwear. In some embodiments, the sensor is operatively attached to the near shore water recreationist by a piece of clothing, a piece of swimwear, a string, a cable, and/or a leash. In some embodiments, the leash is operatively connected to a wrist, an arm, an ankle, a leg, a waist, a torso, and/or a body of the near shore water recreationist. In some embodiments, the near shore water recreationist equipment comprises a surfboard, a kayak, a paddle board, a body board, a raft, an inner tube, or a flotation device. In some embodiments, the near shore water recreationist equipment is a surfboard. In some embodiments, the sensor is operatively attached to or connected to the near shore water equipment, and the equipment is operatively connected to the near shore water recreationist by a leash. In some embodiments, the near shore water recreationist equipment comprises a buoy, an anchor, and/or a dock. In some embodiments, the near shore water recreationist equipment comprises a boat, a jet-ski, a waverunner, a water ski. In some embodiments, the near shore water recreationist equipment comprises a fishing lure, a fishing line, a fishing pole, and/or a piece of fishing equipment. In some embodiments, the sensors are water-resistant. In some embodiments, the sensors are contained in a water-resistant housing, water-resistant chemical coating, and/or case. In some embodiments, the sensors are contained in a water-resistant housing, water-resistant chemical coating, and/or case, and the housing, coated sensor, or case is operatively attached to the near shore water recreationist and/or the near shore water recreationist equipment.

In some embodiments, the communications element is configured to transmit the environmental data to the software module configured to receive the environmental data. In some embodiments, the communications element is configured to transmit the environmental data to a computational device, the computational device comprising a communications element configured to transmit the environmental data to the server software module configured to receive the environmental data. In some embodiments, the computational device comprises a computer, a cellular phone, a smart phone, a tablet, a smart watch, an activity tracker, a personal activity tracker, and/or a surf watch. In some embodiments, the computational device is the server. In some embodiments a personal activity tracking device is the same as an activity tracking device. In some embodiments, a surf watch is an activity tracking device and/or a personal activity tracking device. In some embodiments, the computational device further comprises a processor configured to provide an application comprising a software module configured to apply an algorithm to the environmental data received from the sensor to clean the environmental data, the cleaned environmental data transmitted to the server. In some embodiments the raw data is also transmitted to the server. In some embodiments, the cleaning comprises removing erroneous data, removing outlier data, flagging erroneous data, interpolating missing data, and flagging outlier data. In some embodiments, the environmental data is cleaned in order to configure the data such that the data is prepared for pre-analytic analysis. In some embodiments, the computational device further comprises a processor configured to provide an application comprising a software module configured to apply an algorithm to the cleaned environmental data to generate pre-analytic data, the pre-analytic data transmitted to the server. In some embodiments, the pre-analytic data comprises events and conditions to which each sensor was subjected. In some embodiments, the pre-analytic data is generated by fitting the cleaned data to one or more pre-defined mathematical functions. In some embodiments, the pre-defined function describes a wave height, wave phase, wave speed and direction, a wave ride length, breaking wave direction, a wave kinetic energy, a wave potential energy, and/or a wave break energy. In some embodiments at least a portion of the cleaned data is mathematically transformed prior to generating the pre-analytic data, mathematical transformations comprising a rotation, a reflection, a translation, a scaling, a shear, interpolation, a regression analysis, a Fourier transformation, and/or laplacian transformation. In some embodiments at least a portion of the cleaned data is mathematically transformed to generate the pre-analytic data, mathematical transformations comprising a rotation, a reflection, a translation, a scaling, a shear, interpolation, a regression analysis, a Fourier transformation, and/or laplacian transformation. In some embodiments, the pre-analytic data comprises user behavior comprising one or more of walking, paddling, paddling duration, swimming, floating, dropping into a wave, pulling out of a drop, riding a wave, ride duration, wiping out, or exiting a wave. In some embodiments, the pre-analytic data comprises near shore dynamics comprising one or more of shore exposure, sea level rise, wave position, wave travel direction, wave travel speed, breaking wave direction, wave and set timing, wave kinetic energy, wave potential energy, wave break energy, shore current speed, shore current direction, wave heights, and wave phase. In some embodiments, the pre-analytic data comprises a water condition comprising one or more of temperature, turbidity, salinity and clarity. In some embodiments, the pre-analytic data comprises bio-matter data comprising one or more of a plankton concentration, a bacterium concentration, a fungi concentration, and/or an algae concentration. In some embodiments, the pre-analytic data comprises pollution data comprising one or more of hydrocarbon concentration, radiation, and toxic chemical concentration. In some embodiments transmission of the environmental data and/or the pre-analytic data is through a wireless connection. In some embodiments, the transmission of the environmental data and/or the pre-analytic data is through a wired connection. In some embodiments cleaning data comprises applying additional third party algorithms, for example algorithms to fix known problems with GPS data. In some embodiments, cleaning also includes a process of cross-checking data between multiple platform users. In some embodiments, unusual data can be eliminated or verified by cross checking the unusual data with another user's data in a similar location at a similar time. In some embodiments, cross-checked data is used as pre-analytic data. In some embodiments cross-checking data is performed externally from cleaning data.

In some embodiments, a device comprises the sensor, the device comprising a communications element configured to transmit the environmental data to the software module configured to receive the environmental data. In some embodiments, the device comprises a cellular phone, a smart phone, a smart watch, a computer, a tablet computer, a GPS watch, a surf watch, an activity tracking device, and/or a personal activity tracking device. In some embodiments, a surf watch comprises a Rip Curl Search GPS surf watch. In some embodiments, an activity tracking device comprises a Suunto Ambit, Polar V800 GPS Triathlon Watch, TomTom Multisport GPS Watch, Garmin Forerunner, Nike SportWatch GPS, Xensr Move. In some embodiments, an activity tracking device comprises a Fit Bit, a Jawbone Up, a Misfit Shine, a Nike+ Fuelband, a Samsung Gear Fit, a Garmin Vivofit. In some embodiments, an activity-tracking device comprises a wearable, mobile device such as a smartphone or smartwatch running an activity tracking app or software. In some embodiments, a personal activity tracking device comprises a Suunto Ambit, Xensr Move, Garmin Forerunner, a Fit Bit, a Jawbone Up, a Misfit Shine, a Nike+ Fuelband, a Samsung Gear Fit, a Garmin Vivofit. In some embodiments a personal activity tracking device is the same as an activity tracking device. In some embodiments, a surf watch is an activity tracking device and/or a personal activity tracking device. In some embodiments, the device further comprises a processor configured to provide an application comprising a software module configured to apply an algorithm to the environmental data received from the sensor to clean the environmental data, the cleaned environmental data transmitted to the server. In some embodiments the raw data is also transmitted to the server. In some embodiments, the cleaning comprises removing erroneous data, removing outlier data, flagging erroneous data, interpolating missing data, and flagging outlier data. In some embodiments, the environmental data is cleaned in order to configure the data such that the data is prepared for pre-analytic analysis. In some embodiments, the device further comprises a processor configured to provide an application comprising a software module configured to apply an algorithm to the cleaned environmental data to generate pre-analytic data, the pre-analytic data transmitted to the server. In some embodiments, the pre-analytic data comprises events and conditions to which each sensor was subjected. In some embodiments, the pre-analytic data is generated by fitting the cleaned data to one or more pre-defined mathematical functions. In some embodiments, the pre-defined function describes a wave height, wave phase, breaking wave direction, wave speed and direction, a wave ride length, a wave kinetic energy, a wave potential energy, and/or a wave break energy. In some embodiments at least a portion of the cleaned data is mathematically transformed prior to generating the pre-analytic data, mathematical transformations comprising a rotation, a reflection, a translation, a scaling, a shear, interpolation, a regression, a Fourier transformation, and/or laplacian transformation. In some embodiments at least a portion of the cleaned data is mathematically transformed to generate the pre-analytic data, mathematical transformations comprising a rotation, a reflection, a translation, a scaling, a shear, a Fourier transformation, and/or laplacian transformation. In some embodiments, the pre-analytic data comprises user behavior comprising one or more of walking, paddling, paddling duration, swimming, floating, dropping into a wave, pulling out of a drop, missing a drop, riding a wave, ride duration, wiping out, or exiting a wave. In some embodiments, the pre-analytic data comprises near shore dynamics comprising one or more of shore exposure, sea level rise, wave position, wave travel direction, wave travel speed, wave and set timing, wave kinetic energy, wave potential energy, wave break energy, shore current speed and direction, rip current speed and location, wave heights, and wave phase. In some embodiments, the pre-analytic data comprises a water condition comprising one or more of temperature, turbidity, salinity and clarity. In some embodiments, the pre-analytic data comprises bio-matter data comprising one or more of a plankton concentration, a bacterium concentration, a fungi concentration, and/or an algae concentration. In some embodiments, the pre-analytic data comprises pollution data comprising one or more of hydrocarbon concentration, radiation, and toxic chemical concentration. In some embodiments transmission of the environmental data and/or the pre-analytic data is through a wireless connection. In some embodiments, the transmission of the environmental data and/or the pre-analytic data is through a wired connection. In some embodiments cleaning data comprises applying additional third party algorithms, for example algorithms to fix known problems with GPS data. In some embodiments, cleaning also includes a process of cross-checking data between multiple platform users. In some embodiments, unusual data can be eliminated or verified by cross checking the unusual data with another user's data in a similar location at a similar time. In some embodiments, cross-checked data is used as pre-analytic data. In some embodiments cross-checking data is performed externally from cleaning the data. In some embodiments, a first device comprising a sensor configured to collect shore and near shore environmental data is configured to communicate with a second device comprising a sensor configured to collect shore and near shore environmental. In some embodiments, the first and second device communicate to cross-check data, which, in some embodiments, allows unusual data to be eliminated or verified. In some embodiments, a plurality of devices, each comprising a sensor configured to collect shore and near shore environmental data, are configured to communicate with each other in order to cross-check data, which in some embodiments unusual data can be eliminated or verified. In some embodiments, communication comprises transferring at least a portion of data and/or analyzed data and/or cleaned data.

In some embodiments, a device comprises the sensor, the device comprising a communication module to transmit the environmental data to a computational device, the computational device comprising a communication module configured to transmit the environmental data to the software module configured to receive the environmental data. In some embodiments, the device comprises a cellular phone, a smart phone, a smart watch, a computer, a tablet computer, a surf watch, an activity tracking device, and/or a personal activity tracking device. In some embodiments, the computational device is the server. In some embodiments, a surf watch comprises a Rip Curl surf watch. In some embodiments, an activity tracking device comprises a Suunto Ambit, Polar V800 GPS Triathlon Watch, TomTom Multisport GPS Watch, Garmin Forerunner, Nike SportWatch GPS, Xensr Move. In some embodiments, an activity tracking device comprises a Fit Bit, a Jawbone Up, a Misfit Shine, a Nike+ Fuelband, a Samsung Gear Fit, a Garmin Vivofit. In some embodiments, a personal activity tracking device comprises a Xensr Move, a Fit Bit, a Jawbone Up, a Misfit Shine, a Nike+ Fuelband, a Samsung Gear Fit, a Garmin Vivofit. In some embodiments, the computational device comprises a computer, a cellular phone, a smart phone, a tablet, a smart watch, an activity tracker, a personal activity tracker, and/or a surf watch. In some embodiments a personal activity tracking device is the same as an activity tracking device. In some embodiments, a surf watch or a GPS watch is an activity tracking device and/or a personal activity tracking device. In some embodiments, the computational device further comprises a processor configured to provide an application comprising a software module configured to apply an algorithm to the environmental data received from the sensor to clean the environmental data, the cleaned environmental data transmitted to the server. In some embodiments the raw data is also transmitted to the server. In some embodiments, the cleaning comprises removing erroneous data, removing outlier data, flagging erroneous data, interpolating missing data, and flagging outlier data. In some embodiments, the environmental data is cleaned in order to configure the data such that the data is prepared for pre-analytic analysis. In some embodiments, the computational device further comprises a processor configured to provide an application comprising a software module configured to apply an algorithm to the cleaned environmental data to generate pre-analytic data, the pre-analytic data transmitted to the server. In some embodiments, the pre-analytic data comprises events and conditions to which each sensor was subjected. In some embodiments, the pre-analytic data is generated by fitting the cleaned data to one or more pre-defined mathematical functions. In some embodiments, the pre-defined function describes a wave height, wave phase, wave speed and direction, a wave ride length, a wave kinetic energy, a wave potential energy, and/or a wave break energy. In some embodiments at least a portion of the cleaned data is mathematically transformed prior to generating the pre-analytic data, mathematical transformations comprising a rotation, a reflection, a translation, a scaling, a shear, interpolation, a regression, a Fourier transformation, and/or laplacian transformation. In some embodiments at least a portion of the cleaned data is mathematically transformed to generate the pre-analytic data, mathematical transformations comprising a rotation, a reflection, a translation, a scaling, a shear, interpolation, a regression, a Fourier transformation, and/or laplacian transformation. In some embodiments, the pre-analytic data comprises user behavior comprising one or more of walking, paddling, paddling duration, swimming, floating, floating duration, dropping into a wave, riding a wave, ride duration, wiping out, or exiting a wave. In some embodiments, the pre-analytic data comprises near shore dynamics comprising one or more of shore exposure, sea level rise, wave position, wave travel direction, wave travel speed, wave and set timing, wave kinetic energy, wave potential energy, wave break energy, shore current speed and direction, rip current speed and location, wave heights, and wave phase. In some embodiments, the pre-analytic data comprises a water condition comprising one or more of temperature, turbidity, salinity and clarity. In some embodiments, the pre-analytic data comprises bio-matter data comprising one or more of a plankton concentration, a bacterium concentration, a fungi concentration, and/or an algae concentration. In some embodiments, the pre-analytic data comprises pollution data comprising one or more of hydrocarbon concentration, radiation, and toxic chemical concentration. In some embodiments transmission of the environmental data and/or the pre-analytic data is through a wireless connection. In some embodiments, the transmission of the environmental data and/or the pre-analytic data is through a wired connection. In some embodiments cleaning data comprises applying additional third party algorithms, for example algorithms to fix known problems with GPS data. In some embodiments, cleaning also includes a process of cross-checking data between multiple platform users. In some embodiments, unusual data can be eliminated or verified by cross checking the unusual data with another user's data in a similar location at a similar time. In some embodiments, cross-checked data is used as pre-analytic data. In some embodiments cross-checking data is performed externally from cleaning data.

Figure 2:
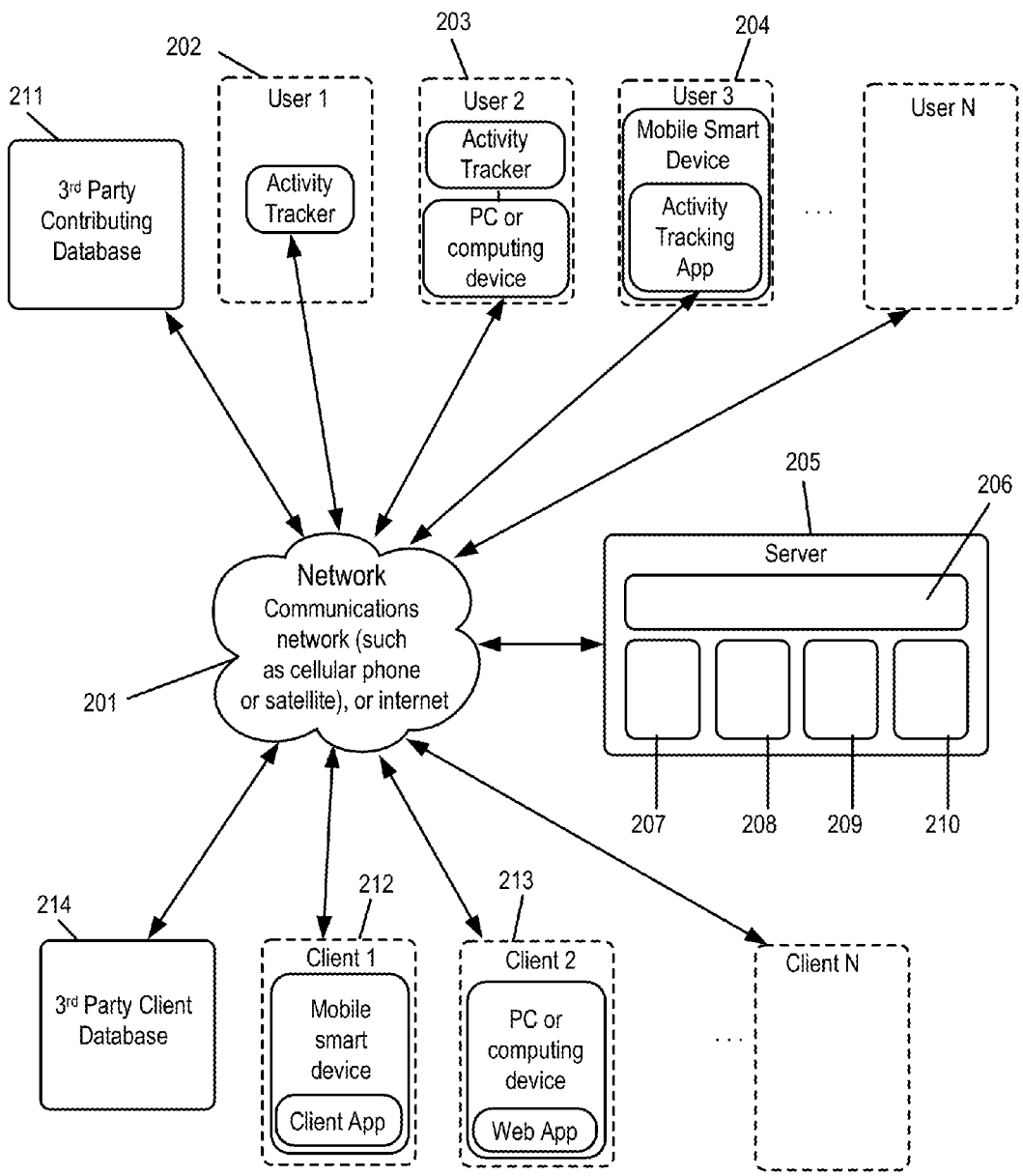
FIG. 2 shows a non-limiting example of the platforms, systems, methods and computer readable media to monitor a shore and near shore environment, in a non-limiting example data is collected by a sensor and/or a device.

Referring to FIG. 2, in some embodiments of the platforms, systems, methods and media described herein, a network provides communication between a plurality of sensors, a server, an external device, and/or third party data. In some embodiments the network 201 comprises a cellular network, a microcellular network, a satellite network and/or the internet. In some embodiments, a near shore water recreationist or a piece near shore water recreationist equipment comprises an activity tracker 202 comprising the sensor, the activity tracker comprising an element to transmit environmental data pertaining to a shore and near shore environment to the server. In some embodiments, a near shore water recreationist or a piece near shore water recreationist equipment comprises an activity tracker comprising the sensor transmits the environmental data pertaining to a shore and near shore environment to a computing device 203, the computing device comprising an element to transmit environmental data pertaining to a shore and near shore environment to the server. In some embodiments, a near shore water recreationist or a piece near shore water recreationist equipment comprises a mobile device 204, for example a smart phone or a smart watch comprises an activity tracking application, for example Strava, Moves, Endomondo, Runtastic, Argus, Apple's Health App, and Nike+ Running, the mobile device comprising an element to transmit app data to the server. In some embodiments, data from all near shore water recreationists, all pieces near shore water recreationist equipment, and or all third party contributing data from a third party database 211 are transferred to the server 205 through the network. In some embodiments, the server comprises a software module 206 configured to provide a graphical user interface and/or an application programming interface. In some embodiments, the server comprises an intake engine 207, a data repository and storage 208, an analytics engine 209, and a reporting and services engine 210. In some embodiments, a device comprising a mobile device 212, for example a smart phone or a smart watch, is configured to receive data from the server, for example an environmental data report. In some embodiments, a device comprising a computing device 213, for example a personal computer, a tablet, and a laptop, is configured to receive data from the server, for example an environmental data report. In some embodiments, a database 214 is configured to receive data from the server, for example an environmental data report. In some embodiments data is transmitted through a wireless connection. In some embodiments, data is transmitted through a wired connection. In some embodiments, the computing device is a cellular phone, a smart phone, a smart watch, a tablet, and/or a laptop computer. In some embodiments, a sensor is configured to transmit data to the server. In some embodiments, a device comprises a sensor and the device is configured to transmit data to the server. In some embodiments, a sensor is configured to transmit data to a computational device and the computational device is configured to transmit data to the server. In some embodiments, the server is configured to transmit data and/or the environmental data report to a device. In some embodiments, data and/or a report is transmitted using the internet. In some embodiments the server comprises a store, an application programming interface and a data query language.

Figure 3:
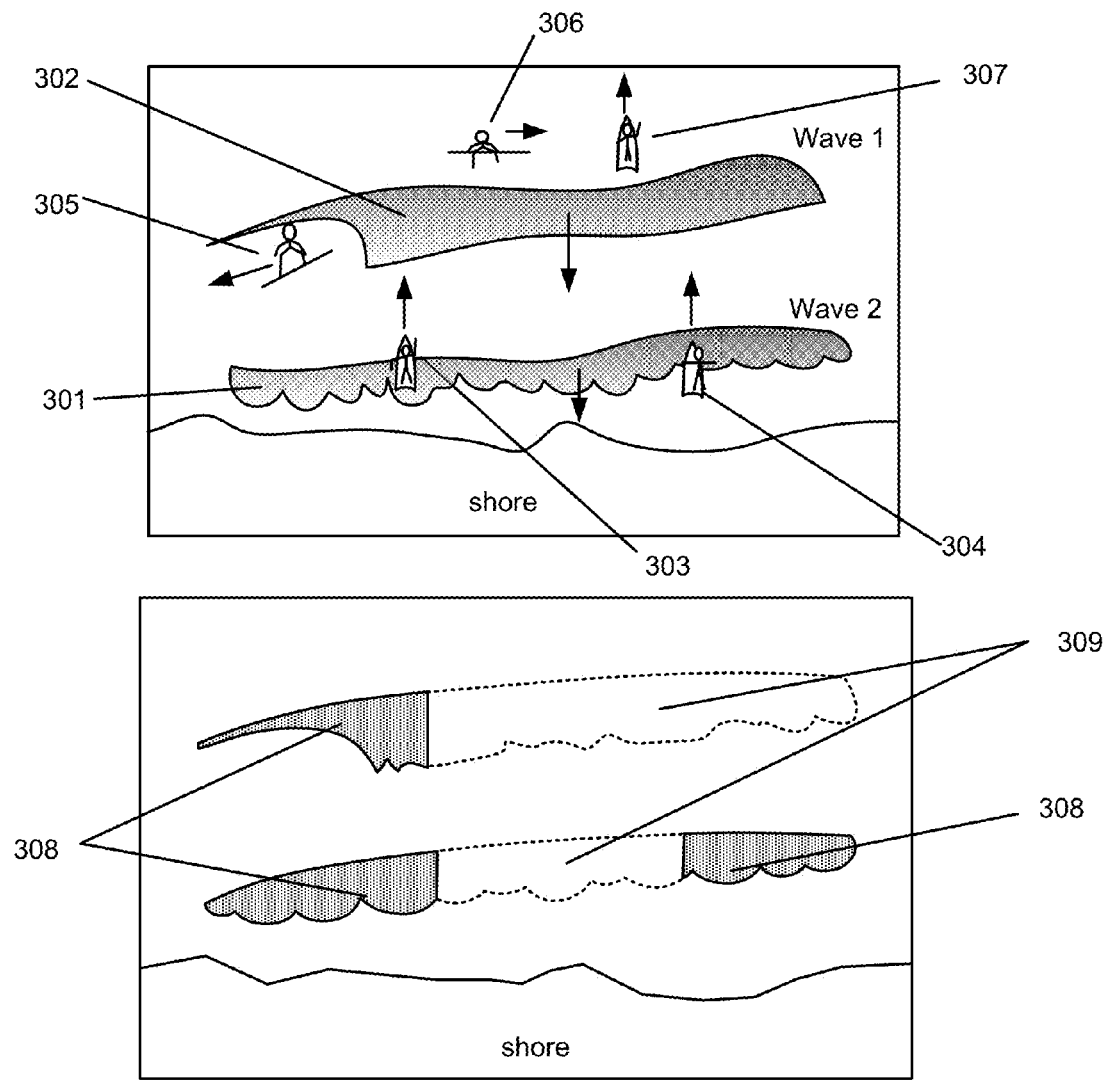
FIG. 3 shows a non-limiting example of the platforms, systems, methods and computer readable media to monitor a shore and near shore environment, in a non-limiting example the environment is spatially monitored.

In some embodiments, a plurality of sensors are associated with one or more near shore water recreationists or pieces of near shore water recreationist equipment. Referring to FIG. 3, in some embodiments the platforms, systems, methods and media described herein are configured receive and analyze data spatially arranged in the shore and near shore environment for a given time or time interval. In some embodiments, the shore and near shore environment comprise a first wave 301 and a second wave 302. In some embodiments, a plurality of sensors and/or detectors are used to determine a plurality shore and near shore environmental conditions occurring in temporal relation to one another. As a non-limiting example, surfers 303 and 304 are paddling through the wave 301 and data collected by the sensor and/or detectors is configured to collect data that is used to determine the presence of white water. At the same time, another surfer 305 is surfing on the second wave 302 and data collected by the sensor and/or detectors based is configured to determine the direction of the break of the second wave relative to the white water and/or the shore. Additionally at the same time, another surfer 306 is sitting outside the surf zone is drifting and the sensor and/or detector is monitoring current data comprising current speed and direction. Also, at the same time data collected by the sensor and/or detectors of another surfer 307 paddling outside the surf zone is used to determine wave bumps and their relative locations to the other waves and/or the shore. Based on the data collected by the plurality of sensors and/or detectors, shore and near shore environmental data can be calculated 308 and additional data can be interpolated 309. In some embodiments, when interpolating data assumptions are made, such as a width of a wave for a particular break and a phase of a wave for a particular break.

Figure 4:
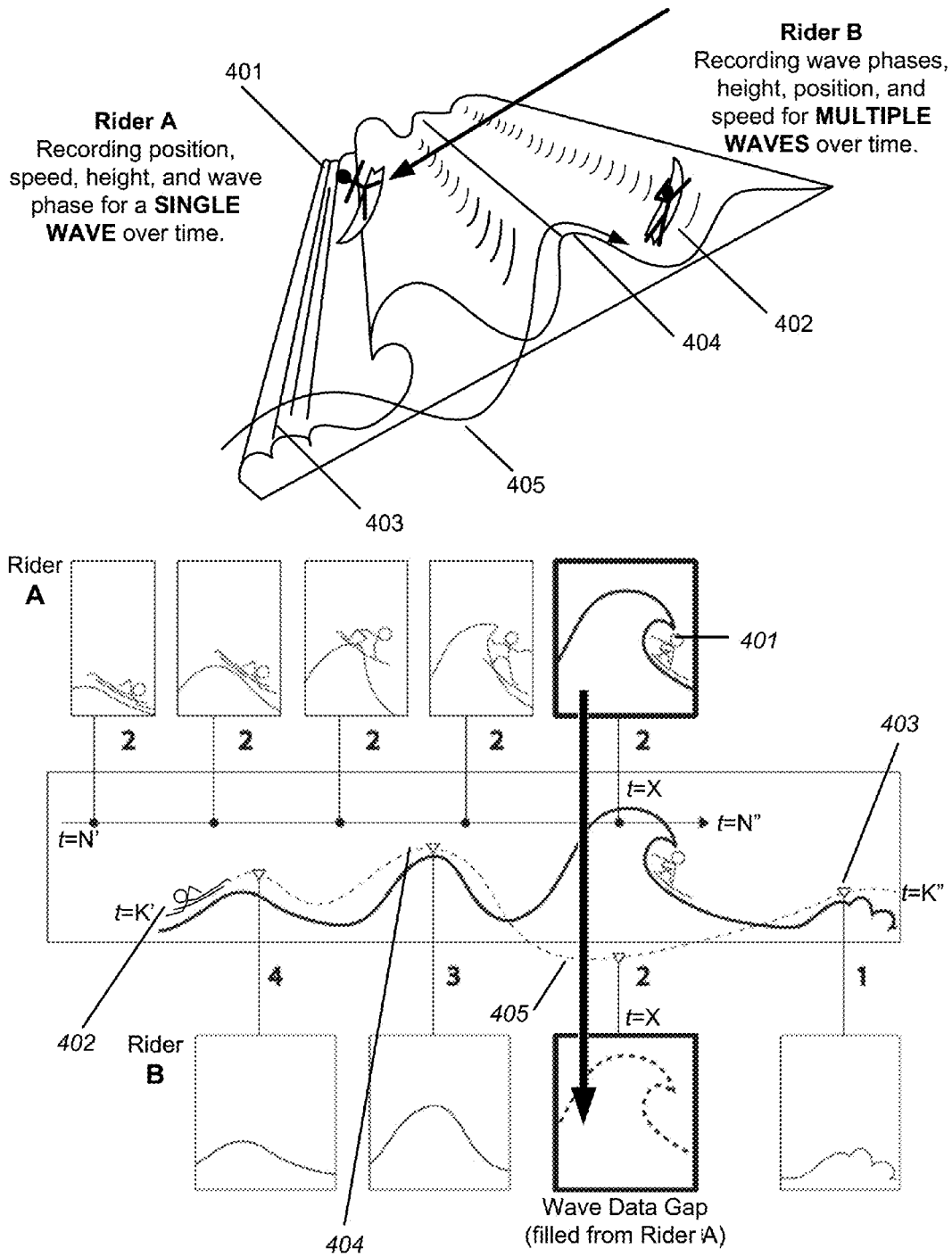
FIG. 4 depicts a non-limiting example of the platforms, systems, methods and computer readable media to monitor a shore and near shore environment, in a non-limiting example the environment is temporally monitored.

Referring to FIG. 4 each depict a non-limiting example of the platforms, systems, methods and computer readable media to monitor a shore and near shore environment, in each non-limiting example the environment is temporally monitored. Referring to FIG. 4A, in some embodiments, a first near shore water recreationist, for example a first surfer, 401 or first piece of near shore water recreationist equipment 401, comprises a sensor that monitors the shore and near shore environment. In some embodiments, at a first time, the first surfer 401 is surfing a wave in which the sensor records data comprising the position, speed, height and wave phase of the single wave. At the same time a second near shore water recreationist, for example a second surfer, 402 or second piece of near shore water recreationist equipment 402, comprises a sensor that monitors the shore and near shore environment, the second surfer being in relative close spatial relation to the first surfer. While the first surfer is surfing, the second surfer 402 is paddling through multiple waves, one of which is the wave that the wave that was surfed by the first surfer. The sensor of the second surfer records the phase 403, height 404, position, and speed for each wave encountered. While paddling through the waves, the second surfer swims under 405 the wave surfed by the first surfer, thus not collecting data on this wave and creating a gap in the data. By combining the data from the first and second near shore water recreationist, a data set describing each wave in a given period of time is generated.

Figure 5A:
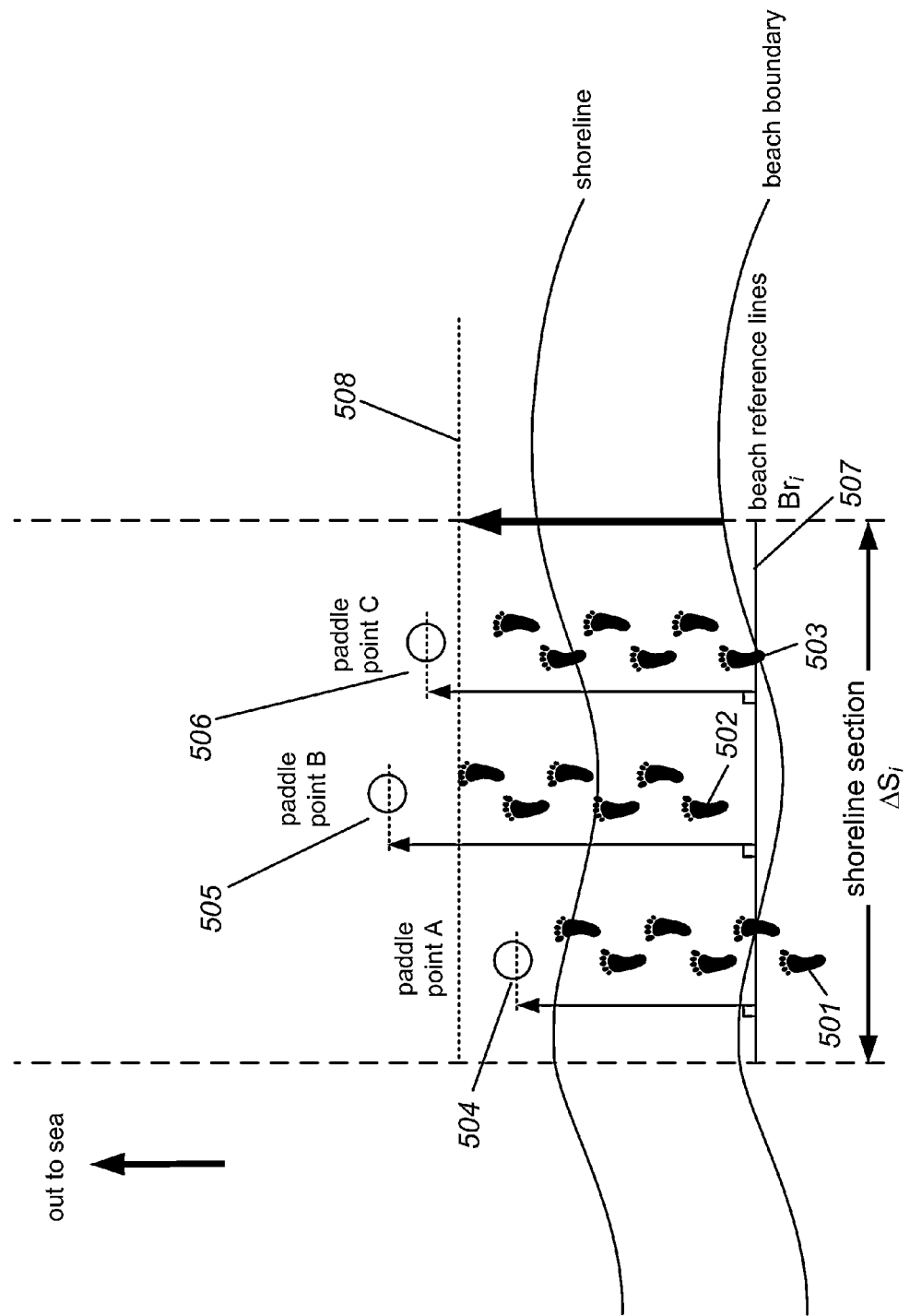
FIG. 5A and FIG. 5B each show a non-limiting example of the platforms, systems, methods and computer readable media to monitor a shore and near shore environment, in each non-limiting example the environment comprises a shore exposure.
Figure 5B:
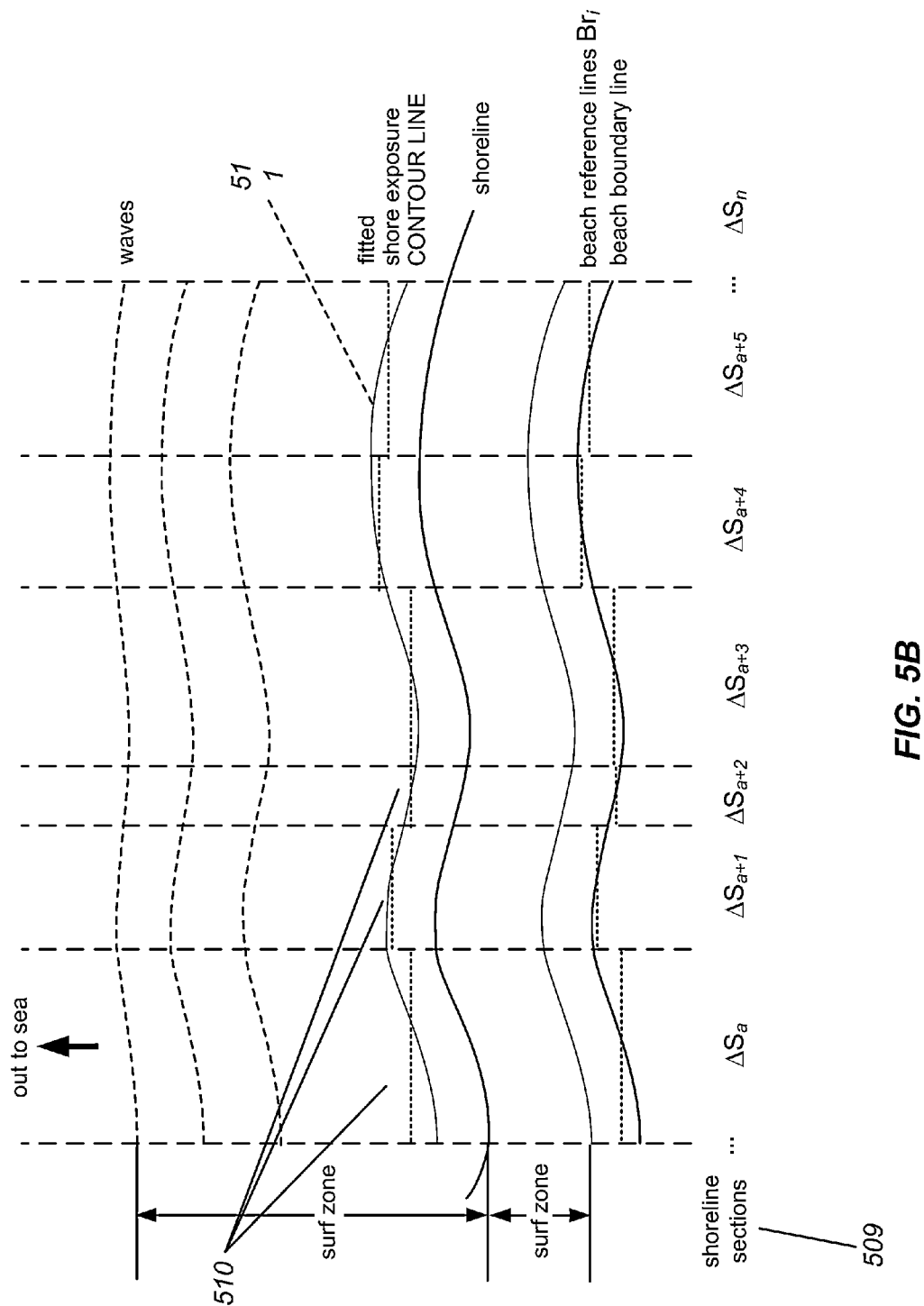

Referring to FIG. 5A, in some embodiments, the platforms, systems, methods, and media described herein are configured to determine a shore exposure. In some embodiments one or more sensors and/or detectors are associated with one or more near shore water recreationists 501, 502 and 503, for example a surfer, and/or near shore water recreationist equipment, for example a surfboard. In some embodiments, individual paddle points 504, 505, and 506, are a location in the surf zone and/or the swash zone where a surfer switches from walking to paddling out on their board. In some embodiments, a shore exposure 508 is a line across a section of shore that represents the average paddle point distance from a baseline on shore 507 created by one or more rides from one or more surfers over a period of time. In some embodiments the average paddle point distance for an individual surfer in a particular shore section is used to calculate the shore exposure for a particular shoreline section. In some embodiments, the average paddle point for a plurality of surfers in a particular shore section is used to calculate the shore exposure for a particular shoreline section. Referring to FIG. 5B, in some embodiments, the shore exposure 508 for multiple, adjacent locations 509 of the shore can be determined by determining the paddle point line 510 for each section and then fitting a curve 511 through a point in each line in each section. In some embodiments the fitted curve is the shore exposure contour line. In some embodiments, the width of each shore section does not have to be equal or proportional to determine a shore exposure contour line across multiple sections of shore. In some embodiments, the paddle point line for a single section or the shore exposure contour line across multiple sections is expressed by its location (i.e., GPS) position.

Figure 6:
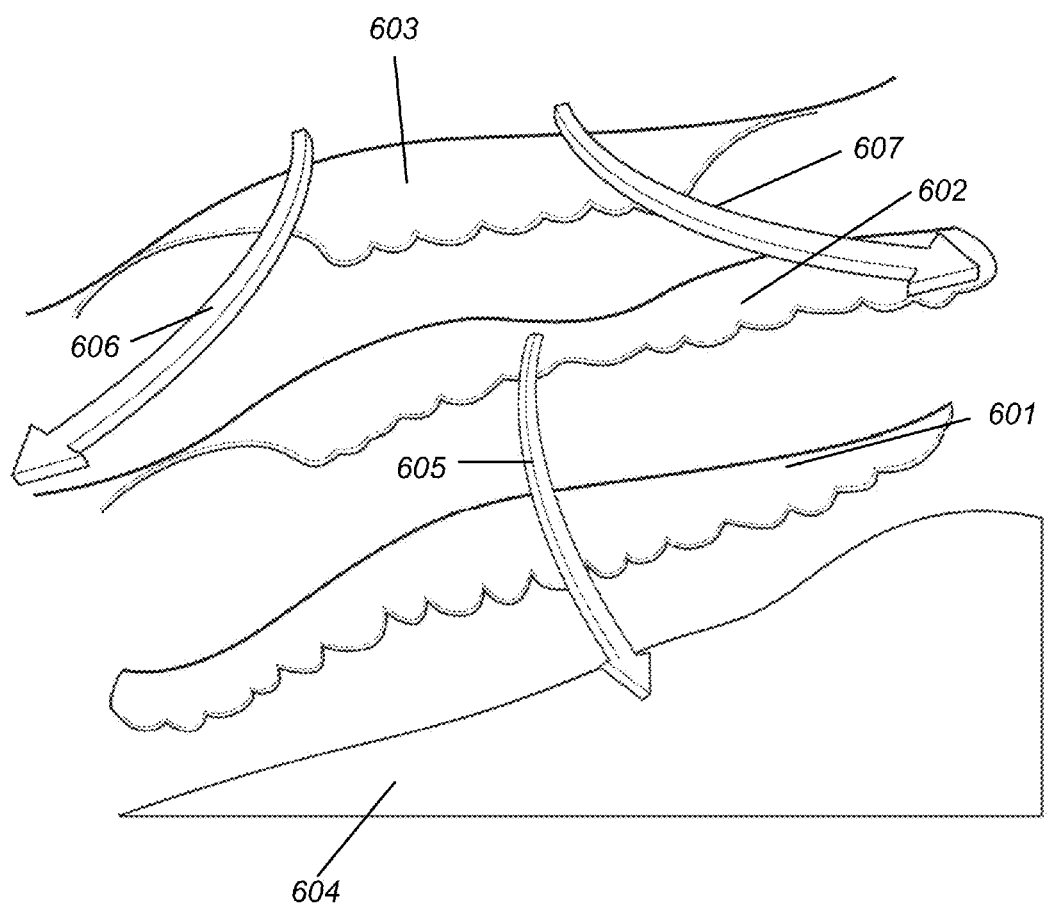
FIG. 6 shows a non-limiting example of the platforms, systems, methods and computer readable media to monitor a shore and near shore environment, in a non-limiting example the environment comprises a direction of a breaking wave.

Referring to FIG. 6, in some embodiments, the platforms, systems, methods and media described herein are configured to determine the wave break direction. In some embodiments, a plurality of sensors are associated with one or more near shore water recreationists or pieces of near shore water recreationist equipment. In some embodiments a plurality of waves are monitored, for example a first wave 601, a second wave 602, and a third wave 603. In some embodiments, the directions of the break of each wave is determined relative to the direction a surfer or near-shore recreationist travels while riding the wave 604. In some embodiments, the wave break direction comprises straight-in or closed-out 605, right 606, or left 607.

Figure 7:
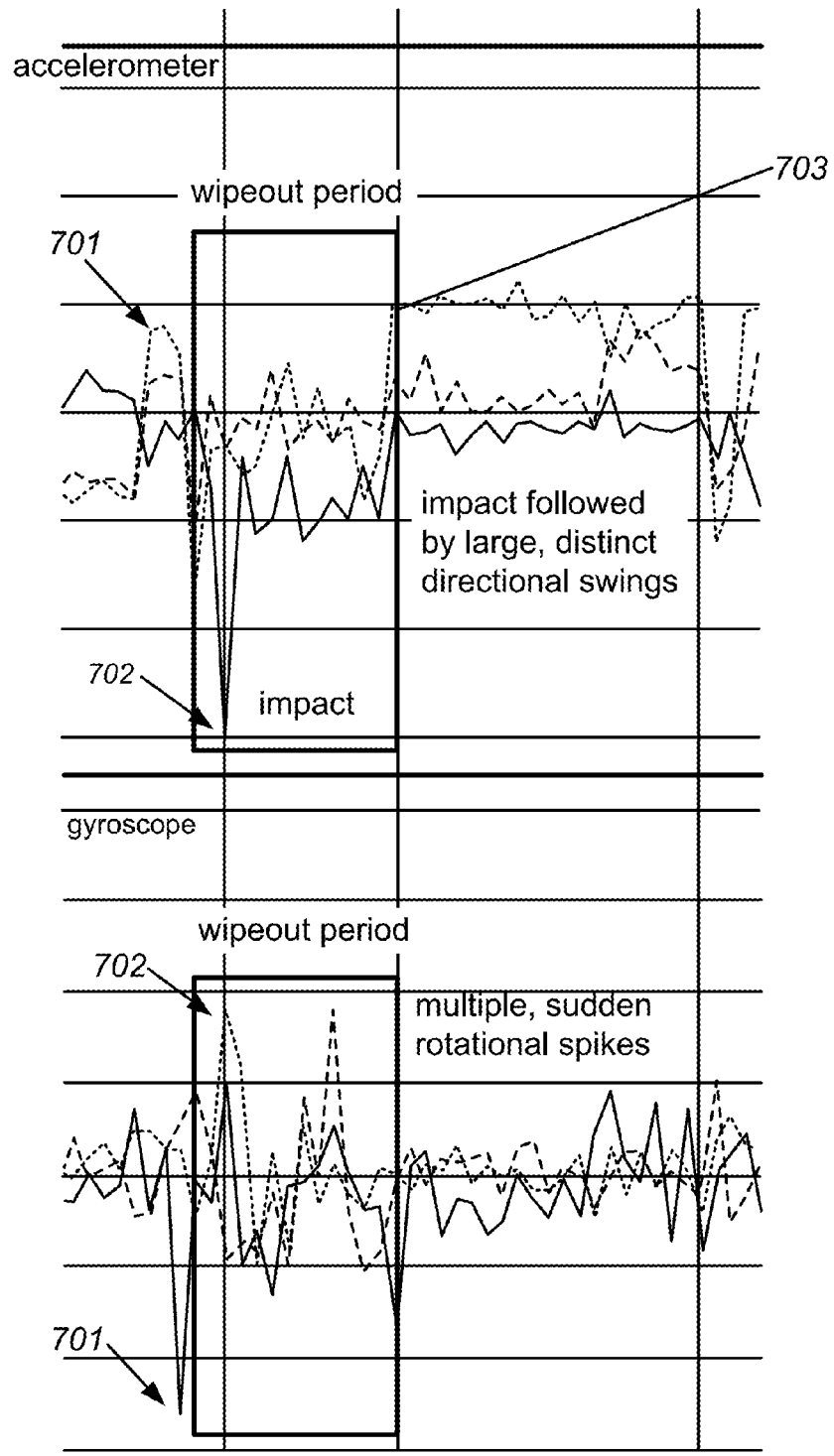
FIG. 7 shows a non-limiting example of the platforms, systems, methods and computer readable media to monitor a shore and near shore environment, in a non-limiting example, accelerometer and/or gyroscope data is used to determine a wipeout for a shore or near-shore water recreationist.

Referring to FIG. 7, in some embodiments the detector comprises one or more of an accelerometer and a gyroscope. In some embodiments, the platforms, methods, systems, and computer-implemented media are configured to determine a surfing wipeout. In some embodiments, the platforms, systems, methods and media use data from a multi-axis accelerometer or gyroscope to monitor the near shore water recreationist or near shore water recreationist equipment acceleration and/or orientation. In some embodiments, a sudden spike 701 in movement followed by a period of turbulent movement, then followed by a period of more controlled movement 703 is measured by an accelerometer and/or a gyroscope. In some embodiments, the spike 701 indicates an initial crash, and the turbulent movement 702 indicates tumbling in the surf. In some embodiments, after the turbulent movement, the accelerometer curves will show a distinct shift in the opposite direction 703 as the recreationist or equipment comes out of the turbulent water.

Figure 8:
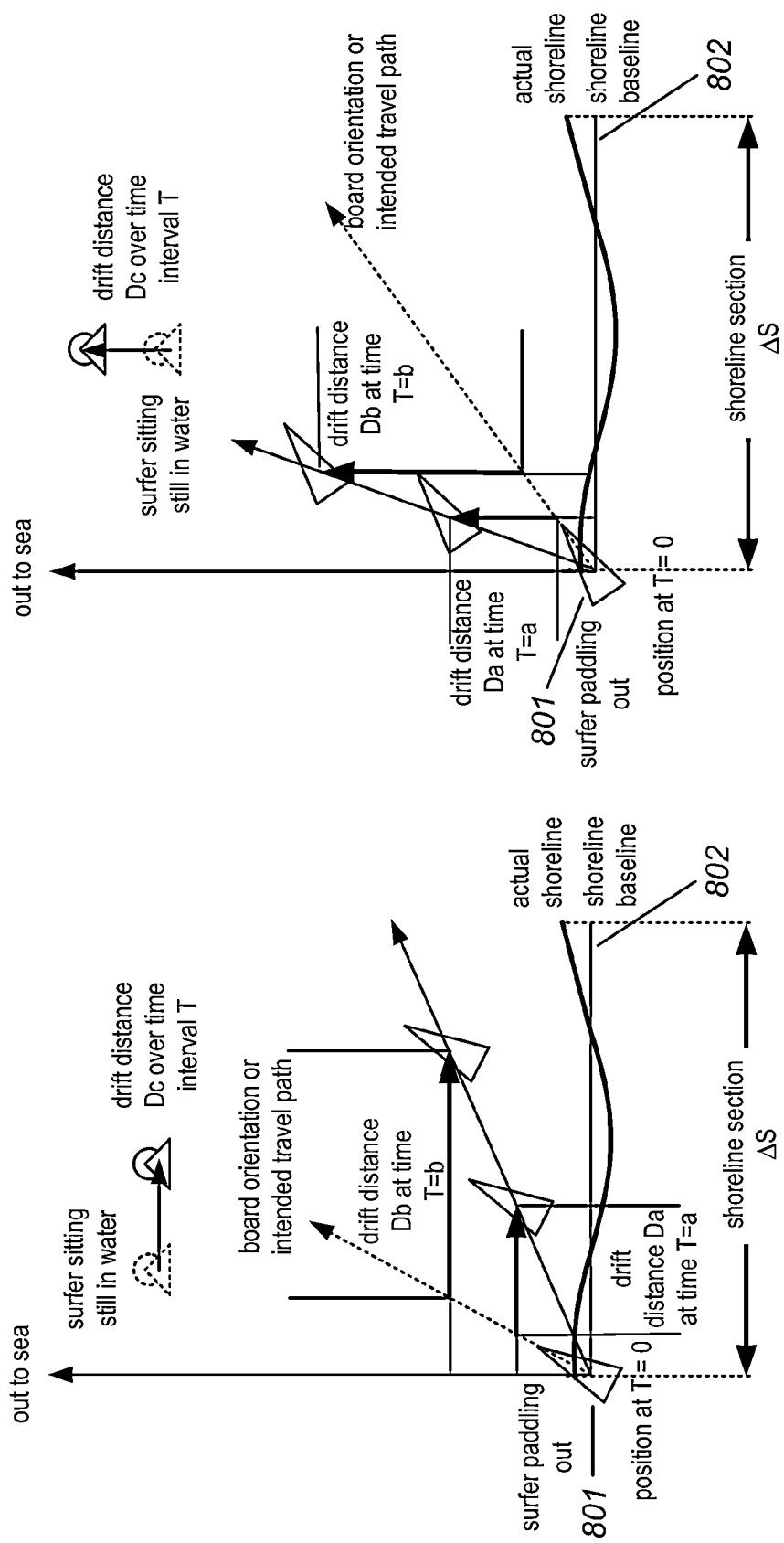
FIG. 8 shows a non-limiting example of the platforms, systems, methods and computer readable media to monitor a shore and near shore environment, in a non-limiting example a plurality of sensors are used to determine a vector field map of water currents.

Referring to FIG. 8, in some embodiments the platforms, systems, methods and media described herein comprise plurality of sensors configured to monitor the drift current speed and/or the rip current speed of one or more near shore water recreationists 801 or one or more pieces of near shore water recreationist equipment 801. In some embodiments, the drift current speed is the speed of travel of a plurality of sensors and/or detectors parallel to the shore baseline 802 in a particular shoreline section. In some embodiments, the rip current speed is the speed of travel of a plurality of sensors and/or detectors perpendicular to the shore baseline 802 in a particular shoreline section. In some embodiments, drift comprises a shore current. In some embodiments, the drift comprises a rip current.

Figure 9A:
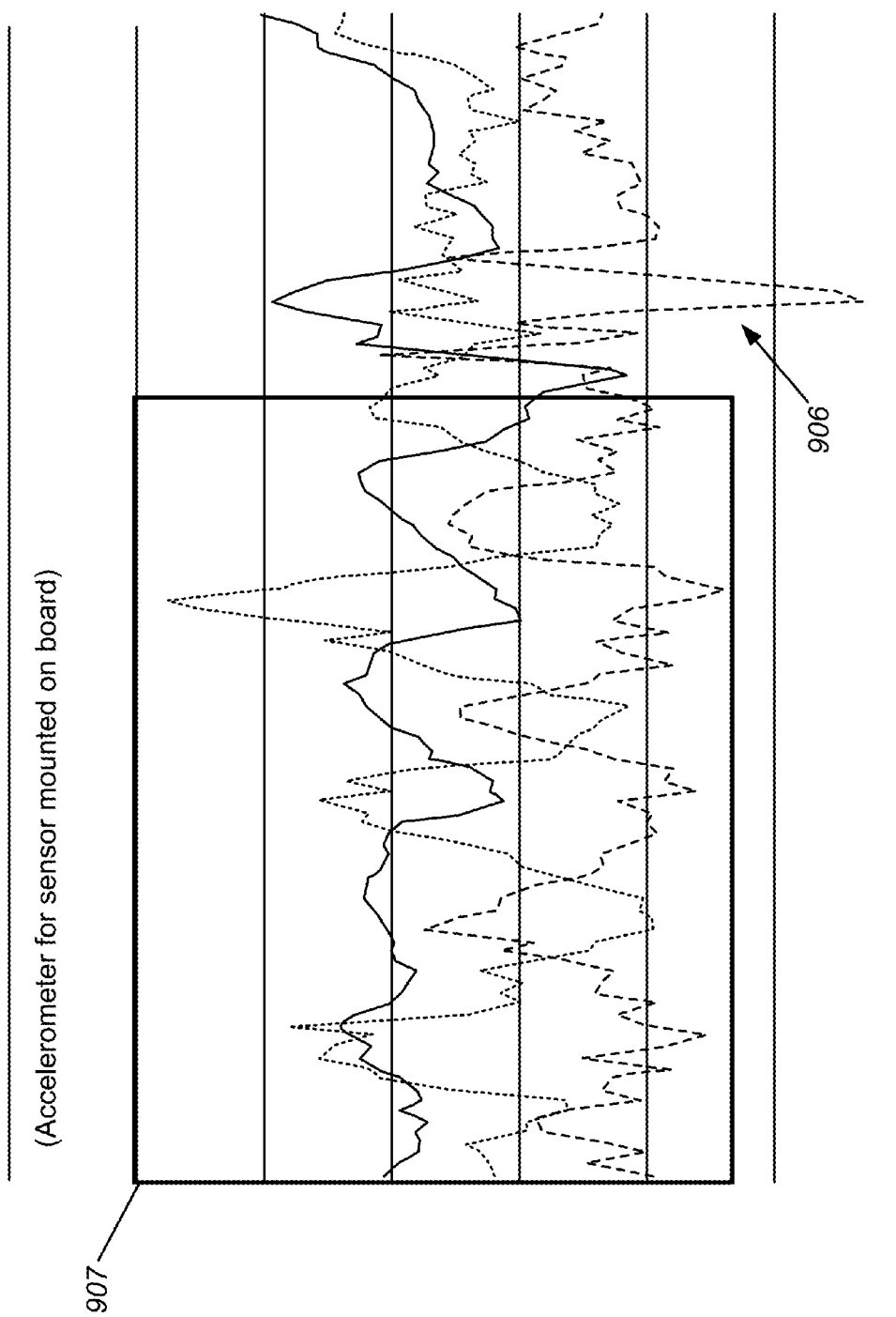
FIG. 9A and FIG. 9B each show a non-limiting example of the platforms, systems, methods and computer readable media to monitor a shore and near shore environment, in each non-limiting example sensor data is used to determine wave height.
Figure 9B:
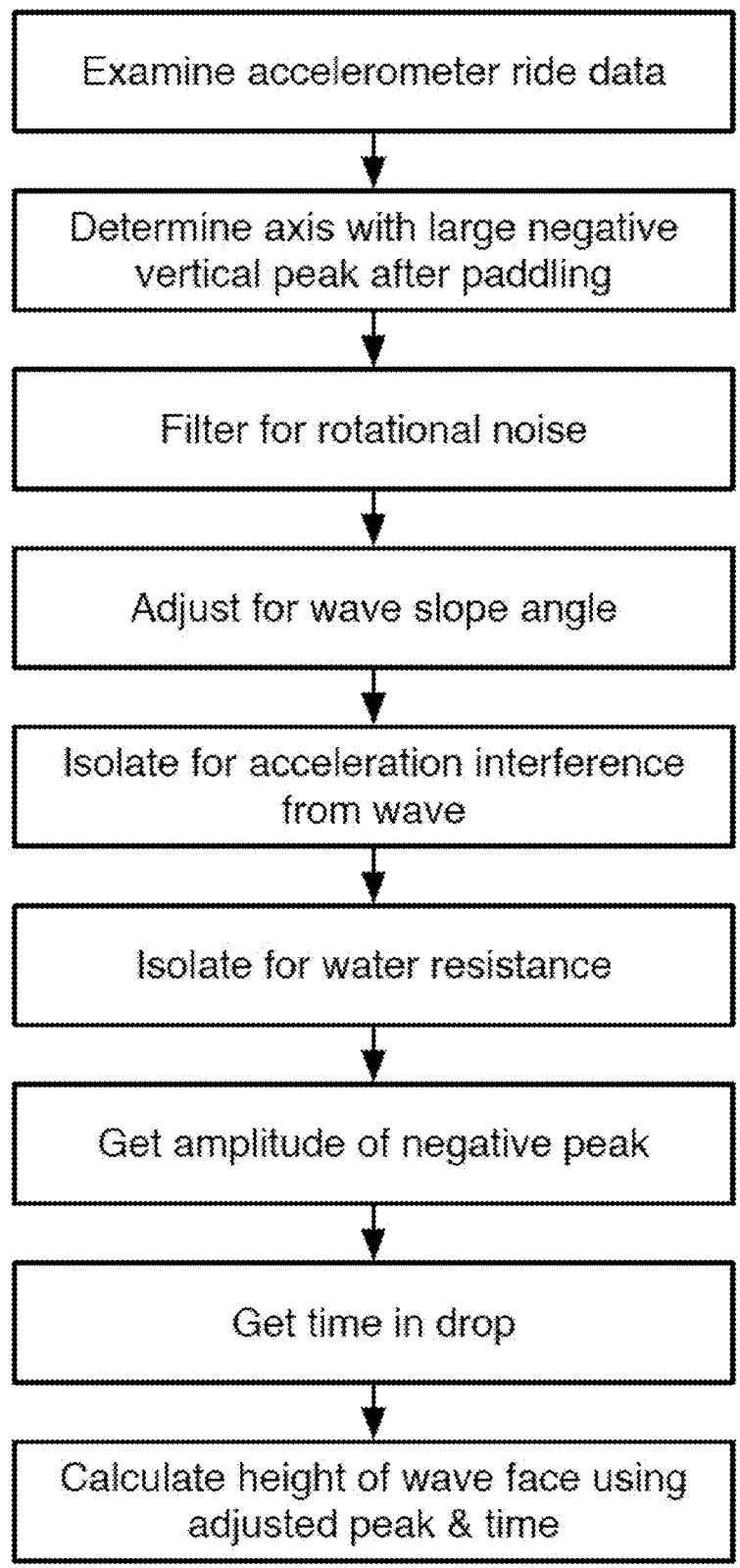

Referring to FIG. 9A, in some embodiments, the platforms, systems, methods and media are configured to determine a wave height. In some embodiments, accelerometer data and gyroscope data are used to determine when a surfer is riding down the face of a wave. In some embodiments, a large amplitude negative peak 901 in one axis of the accelerometer data indicates dropping down the face of a wave. In some embodiments, the accelerometer data contains a sinusoidal-like pattern in one or more axes that indicate paddling 902. In some embodiments, paddling occurs prior to dropping in and ceases during the drop in. Referring to FIG. 9B, in some embodiments, the platforms, systems, methods and media, use the method depicted to determine wave height. In some embodiments, the method depicted in FIG. 9B does not use data collected by an altimeter.

Figure 26:
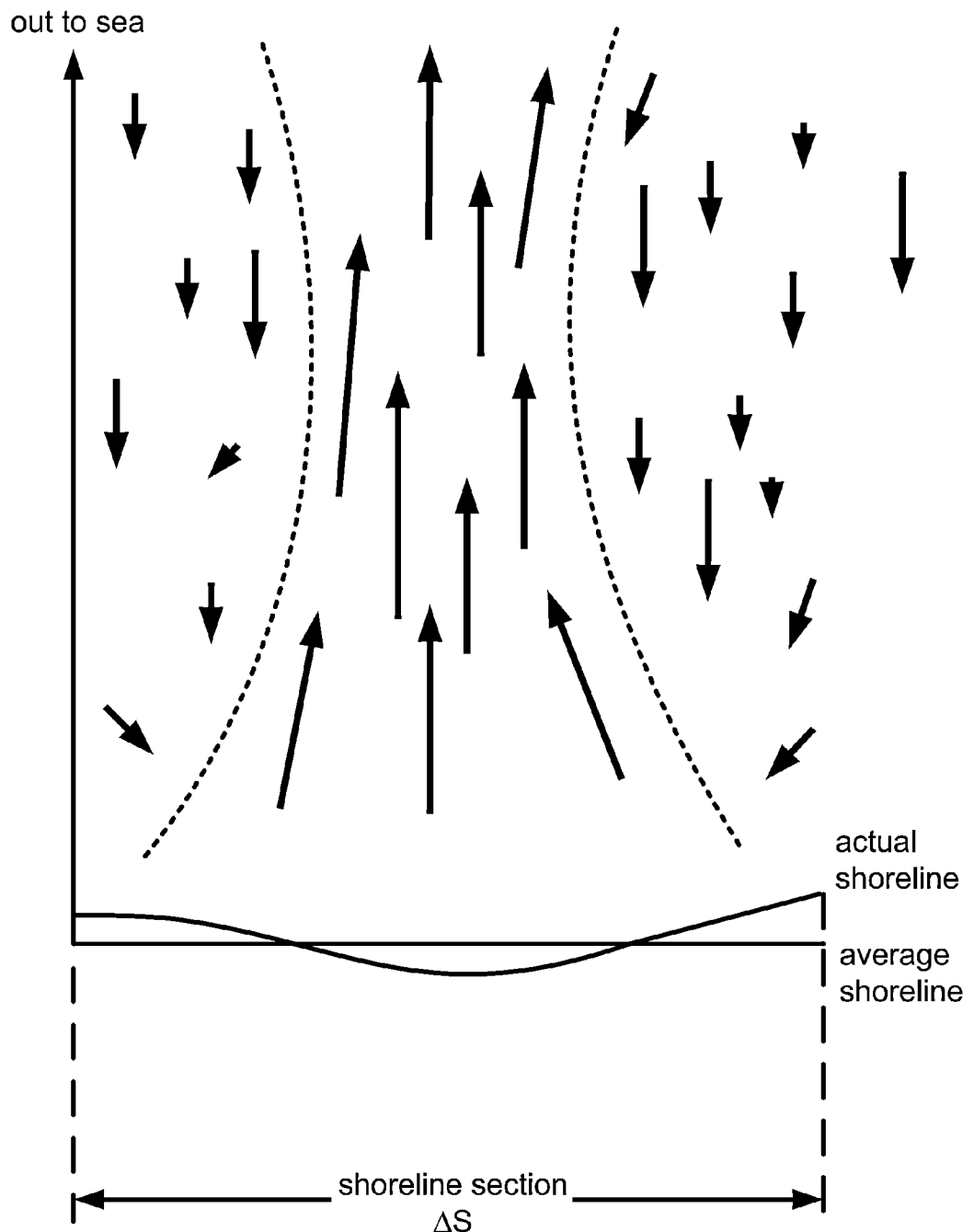
FIG. 26 shows a non-limiting example of the platforms, systems, methods and computer readable media to monitor a shore and near shore environment, in a non-limiting example rip current boundaries are monitored and/or detected.

Referring to FIG. 26, in some embodiments, the platforms, systems, methods and media are configured to determine rip current boundaries for a particular section of the shoreline. In some embodiments, the rip current boundary defines the boundary between water moving perpendicular to the shoreline and in opposite to the direction of wave travel with a significant difference in speed compared to normal current speed (i.e., the rip current) and "normal" moving water (e.g., perpendicular to the shoreline and/or moving at "normal" speeds).

Server, Data Processing and Reports, and Report Processor

In certain aspects described herein are platforms, systems, methods and computer readable media to monitor a shore and near shore environment. In some embodiments, the platforms, systems methods and media comprise a plurality of sensors, each sensor associated with a near shore water recreationist or near shore water recreationist equipment, each sensor comprising: a detector configured to collect environmental data pertaining to a shore and near shore environment; and a communications element configured to transmit the environmental data collected by the detector, a server comprising a server processor configured to provide a server application comprising: a software module configured to receive the environmental data; a software module configured to apply an algorithm to the environmental data to determine a shore and near shore environmental condition; a software module configured to generate an environmental data report comprising the shore and near shore environmental condition; and a software module configured to transmit the environmental data report; and a device comprising a report processor configured to provide a report application comprising a software module configured to receive the environmental data report.

In some embodiments, the server application comprises a software module configured to parse and clean the environmental data received from each sensor, the cleaning comprising removing erroneous data, removing outlier data, flagging erroneous data, interpolating missing data, and flagging outlier data. In some embodiments the server comprises an intake engine, the intake engine comprising one or more applications configured to receive the environmental data, and/or parse and clean the environmental data received from each sensor, the cleaning comprising removing erroneous data, removing outlier data, flagging erroneous data, interpolating missing data, and flagging outlier data. In some embodiments, the environmental data is cleaned in order to configure the data such that the data is prepared for pre-analytic analysis. In some embodiments, the server further comprises a store configured to store the environmental data and/or the cleaned environmental data. In some embodiments the store comprises a data repository. In some embodiments the server further comprises a database. In some embodiments, the environmental data and/or the cleaned environmental data is stored in the database. In some embodiments, the store is connected to the server and/or is remotely connected to the server. In some embodiments the store is connected to the server through a wired connection. In some embodiments, the store is connected to the server through a wireless connection. In some embodiments cleaning data comprises applying additional third party algorithms, for example algorithms to fix known problems with GPS data. In some embodiments, cleaning also includes a process of cross-checking data between multiple platform users. In some embodiments, unusual data can be eliminated or verified by cross checking the unusual data with another user's data in a similar location at a similar time. In some embodiments, cross-checked data is used as pre-analytic data. In some embodiments cross-checking data is performed externally from cleaning data.

In some embodiments, the server application further comprises a software module configured to apply an algorithm to the cleaned environmental data received from each sensor to generate pre-analytic data, the pre-analytic data comprising events and conditions to which each sensor was subjected. In some embodiments, the server comprises an analytics engine configured to provide a software module configured to apply an algorithm to the cleaned environmental data received from each sensor to generate pre-analytic data, the pre-analytic data comprising events and conditions to which each sensor was subjected. In some embodiments, the pre-analytic data is generated by fitting the cleaned data to one or more pre-defined mathematical functions. In some embodiments, the pre-defined function describes a wave height, a wave ride length, a wave kinetic energy, a wave potential energy, and/or a wave break energy. In some embodiments at least a portion of the cleaned data is mathematically transformed prior to generating the pre-analytic data, the mathematical transformations comprising a rotation, a reflection, a translation, a scaling, a shear, interpolation, a regression, a Fourier transformation, and/or laplacian transformation. In some embodiments at least a portion of the cleaned data is mathematically transformed to generate the pre-analytic data, mathematical transformations comprising a rotation, a reflection, a translation, a scaling, a shear, interpolation, a regression, a Fourier transformation, and/or laplacian transformation. In some embodiments, the pre-analytic data comprises user behavior comprising one or more of walking, paddling, paddling duration, swimming, floating, floating duration, dropping into a wave, riding a wave, ride duration, wiping out, or exiting a wave. In some embodiments, the pre-analytic data comprises near shore dynamics comprising one or more of shore exposure, sea level rise, wave position, wave travel direction, wave travel speed, wave and set timing, wave kinetic energy, wave potential energy, wave break energy, shore current speed, shore current direction, wave heights, and wave phase. In some embodiments, the pre-analytic data comprises a water condition comprising one or more of temperature, pH, turbidity, salinity and clarity. In some embodiments, the pre-analytic data comprises bio-matter data comprising one or more of a plankton concentration, a bacterium concentration, a fungi concentration, and/or an algae concentration. In some embodiments, the pre-analytic data comprises pollution data comprising one or more of hydrocarbon concentration, radiation, and toxic chemical concentration. In some embodiments the server further comprises a database. In some embodiments, the pre-analytic data is stored in the database. In some embodiments cleaning data comprises applying additional third party algorithms, for example algorithms to fix known problems with GPS data. In some embodiments, cleaning also includes a process of cross-checking data between multiple platform users. In some embodiments, unusual data can be eliminated or verified by cross checking the unusual data with another user's data in a similar location at a similar time. In some embodiments, cross-checked data is used as pre-analytic data. In some embodiments cross-checking data is performed externally from cleaning data.

In some embodiments, the server application further comprises a software module configured to apply an algorithm to a set of pre-analytic data to generate analytic data, the analytic data comprising trends of a plurality of events, correlations of a plurality of events, trends of a plurality of conditions, correlations of a plurality of conditions, trends of a plurality of events and conditions, correlations of a plurality of events and conditions, or historical trends of events and/or conditions. In some embodiments, the server comprises an analytics engine configured to provide a software module configured to apply an algorithm to a set of pre-analytic data to generate analytic data, the analytic data comprising trends of a plurality of events, correlations of a plurality of events, trends of a plurality of conditions, correlations of a plurality of conditions, trends of a plurality of events and conditions, or correlations of a plurality of events and conditions. In some embodiments, sets of pre-analytic data are selected such that the correlation or lack of correlation will result in analytic data to be included in an environmental data report. In some embodiments, the analytic data comprises wave patterns, surf quality, and/or shore exposure. In some embodiments, the analytic data comprises one or more of user behavior analyzed over time, near shore dynamics analyzed over time, water condition analyzed over time, bio-matter data analyzed over time, and pollution data analyzed over time. In some embodiments, the analytic data comprises one or more of user behavior analyzed in aggregate, near shore dynamics analyzed in aggregate, water condition analyzed in aggregate, bio-matter data analyzed in aggregate, and pollution data analyzed in aggregate. In some embodiments, the analytic data comprises surf report features comprising one or more of wave patterns, wave heights, surf condition, surf condition difficulty level, surf location quality, surf location conditions compared to historic potential, and surf location current ranking compared to other surf locations. In some embodiments the server further comprises a database. In some embodiments, the analytic data is stored in the database.

In some embodiments, the server application further comprises a software module configured to apply an algorithm to the environmental data to determine one or more of: surf location difficulty level, surf location wave quality and surf location current ranking as compared to other ranked surf locations. In some embodiments, the server application further comprises a software module configured to apply an algorithm to the environmental data to determine one or more of: surfer wipeouts, surfer wave take rate, and surfer travel direction in a wave.

In some embodiments, the server is configured to provide a software module configured to generate an environmental data report. In some embodiments, the server comprises a reporting engine configured to provide an application comprising a software module configured to generate an environmental data report. In some embodiments, the server is configured to transmit to an external device one or more of the environmental data, the cleaned environmental data, the pre-analytic data, and/or the analytic data, the external device comprising a processor configured to provide an application comprising a software module configured to use one or more pieces of the transmitted data to generate an environmental data report. In some embodiments, the environmental data report is a surf report, comprising one or more of: wave height, wave frequency, wave timing, current, surf conditions, and surf location wave quality. In some embodiments, the environmental data report is a meteorological report, wherein the meteorological report comprises one or more of weather information, tide information, water condition, wave height, wave frequency and timing, current, surf conditions, and surf location wave quality. In some embodiments, the environmental data report is a geographical report, the geographical report comprising one or more of coastline changes and shore and near shore topology. In some embodiments the environmental data report is an ecological and/or environmental report, the ecological report comprising one or more of sea level rise, erosion, bio-matter data, and water pH, water salinity, pollutant levels. In some embodiments the environmental data report is a municipal report, the municipal report comprising information related to coastal tourism, infrastructure development, transportation development, residential development, public health, and adaptation.

In some embodiments the server processor is configured to provide an application to receive environmental data from an external institution. In some embodiments the server processor is configured to provide an application to receive pre-analytic data from an external institution. In some embodiments the server processor is configured to provide an application to receive analytic data from an external institution. In some embodiments the server processor is configured to convert shore and near shore data from an external institution into data to supplement pre-analytic data, analytic data and environmental reporting. In some embodiments the external institution comprises a government research facility, a research institute, a university, a college, a corporation, a non-government organization, or a non-profit entity.

In some embodiments an external device comprises the report processor. In some embodiments the report processor is further configured to provide an application comprising a software module configured to receive from the server one or more of: the environmental data, pre-analytic data, analytic data, and/or the environmental data report. In some embodiments the environmental data report is generated in real-time or is generated according to a timed delay. In some embodiments the report processor is further configured to provide an application to provide an interface to display the environmental data report. In some embodiments the report processor is further configured to provide an application to provide an interface to allow a user to receive from the server one or more of: the environmental data, pre-analytic data, analytic data, and/or the environmental data report. In some embodiments the device is a cellular phone, a smart phone, a smart watch, a tablet computer, a laptop computer, a personal computer, an activity tracking device, or a personal activity tracking device. In some embodiments the interface is displayed as a standalone application or as an included in an existing application. In some embodiments, the interface is a web application. In some embodiments, the interface is a pop-up window and/or an overlay. In some embodiments, the interface is a website.

Figure 10:
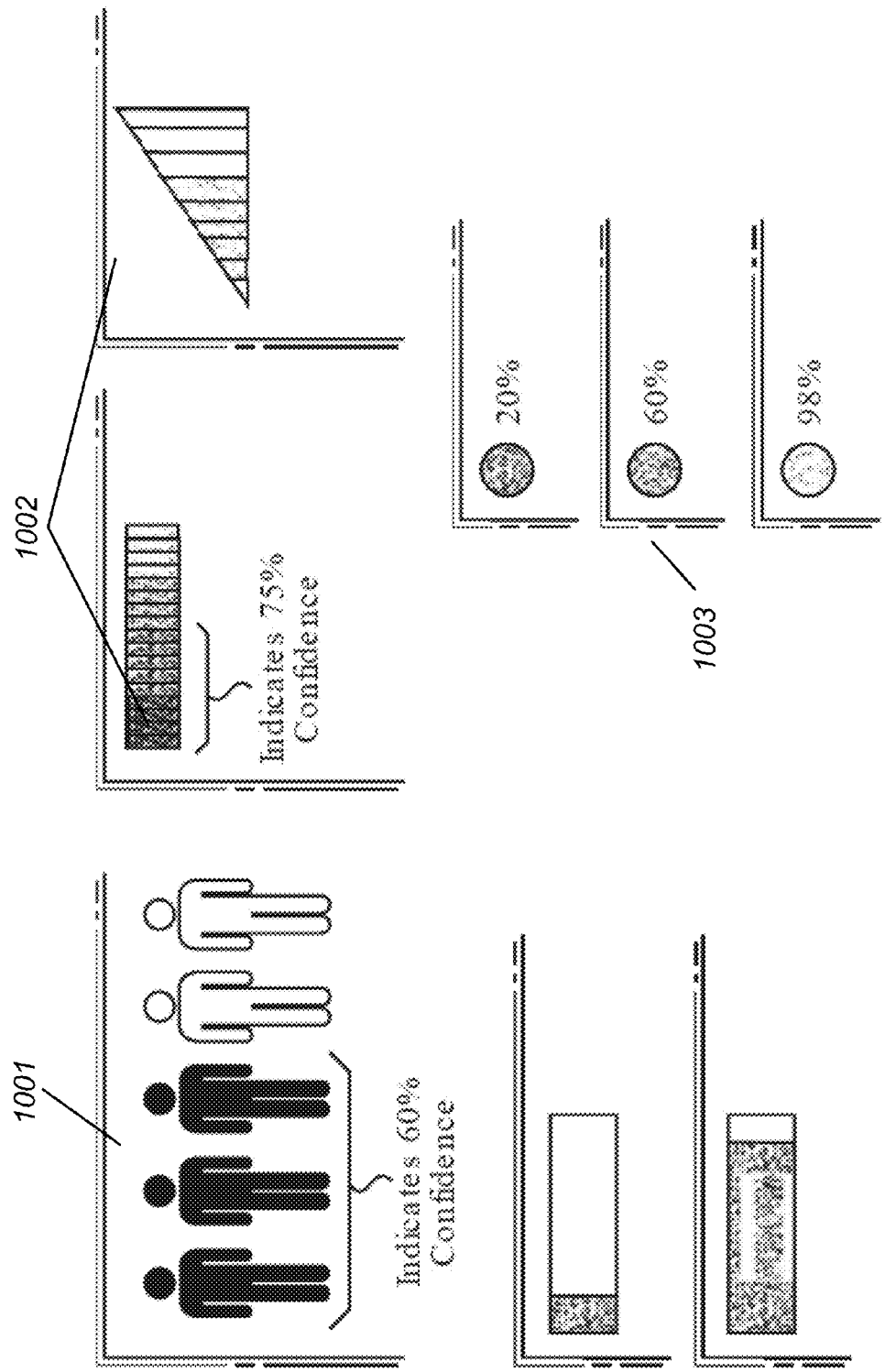
FIG. 10 shows a non-limiting example of the platforms, systems, methods and computer readable media to monitor a shore and near shore environment, in a non-limiting example an interface is provided to display a confidence level for reported information from crowdsourced data.

Referring to FIG. 10, in some embodiments the platforms, systems, methods and media provide a significance rating for crowd sourced data. In some embodiments FIG. 10, depicts an interface for displaying the significance rating on an external device. In some embodiments, the significance rating uses surf conditions. In some embodiments, the significance rating uses any crowdsourced data set and/or any data set. In some embodiments, the statistically significant number of samples that need to be obtained to reach statistically significant confidence level, for example greater than or equal to about 50%, about 55%, about 60%, about 65%, about 70%, about, 75%, about 80%, about 85%, about 90%, about 95%, about 99%, or equal to 100%, is calculated and displayed as an indicator when presenting information so as to depict the integrity of the displayed data. In some embodiments, the indicator is several cartoon images of people 1001 in which the more people that are colored indicates a higher confidence level. In some embodiments, the indicator is a meter type 1002, or a single state status indicator with an optional numerical label 1003. In some embodiments, the confidence rating provides users with a quick way to qualitatively decide whether data presented from a crowdsourced report is an accurate assessment. In some embodiments, a report with a low significance rating (data gathered from only a few people) is less likely to be accurate, and one with a high significance rating (data gathered from a plurality of people) is more likely to be representative of actual conditions.

Figure 11:
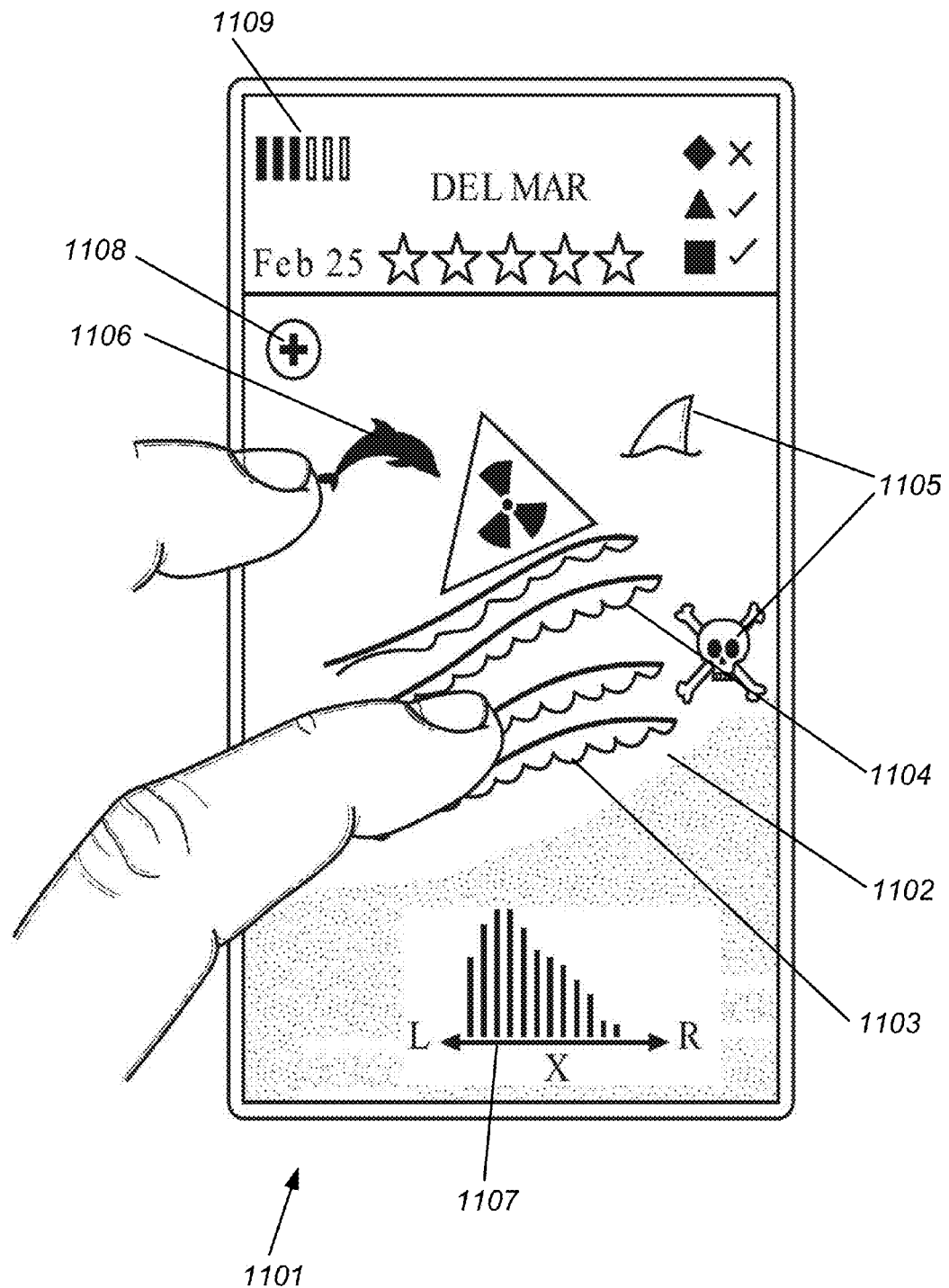
FIG. 11 shows a non-limiting example of the platforms, systems, methods and computer readable media to monitor a shore and near shore environment, in a non-limiting example an interface is provided to display an environmental data report.
Figure 12:
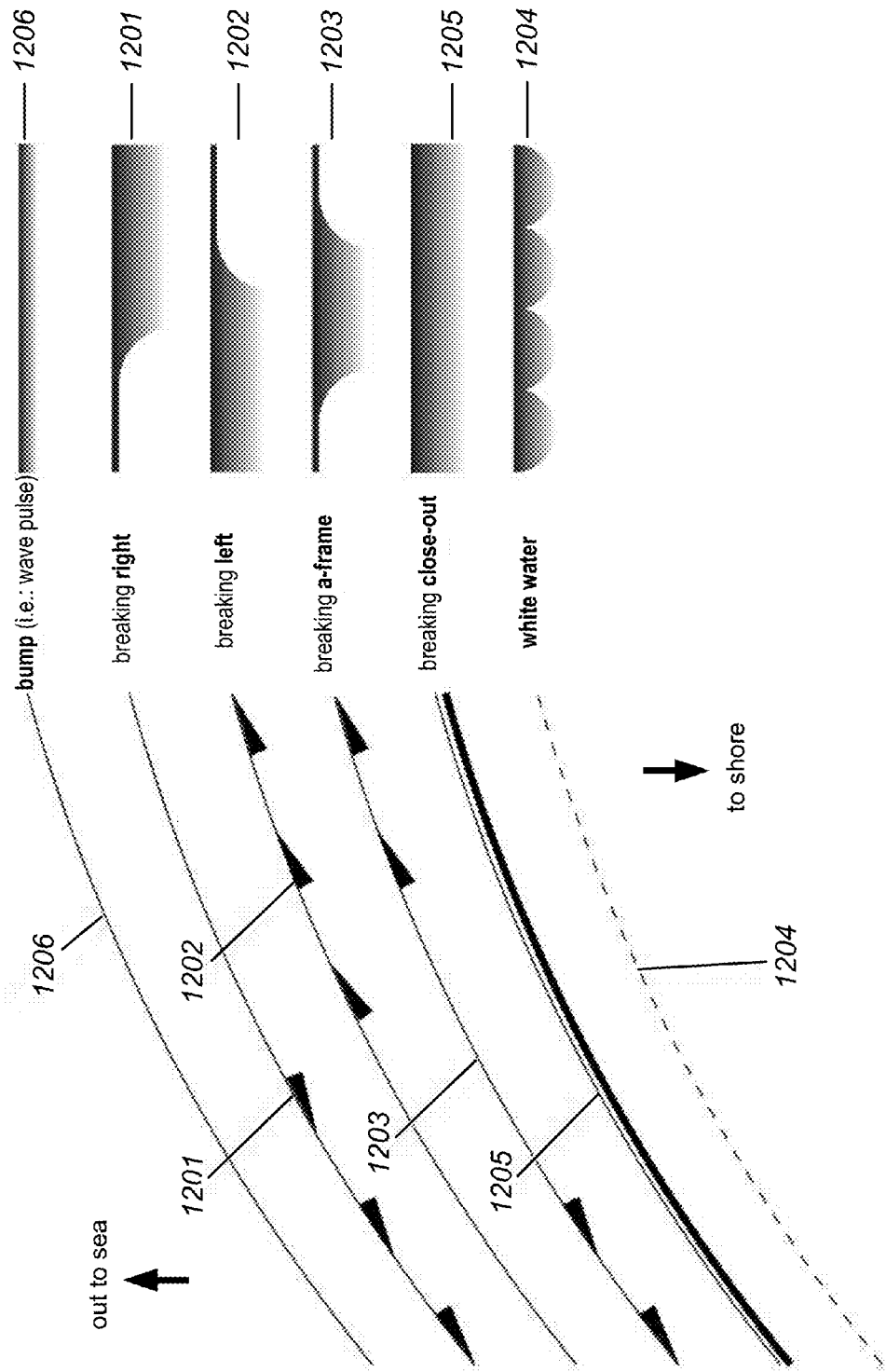
FIG. 12 shows a non-limiting example of the platforms, systems, methods and computer readable media to monitor a shore and near shore environment, in a non-limiting example an interface is provided to display wave phases and types for an environmental data report.

Referring to FIG. 11 and FIG. 12, in some embodiments the platforms, systems, methods and provide an interface for visualizing ocean conditions in a time-variable environment. In some embodiments, conditions update continually as new data is received. In some embodiments, a main graphical view 1101 presents a break and is updated as new data is received by the server. In some embodiments the break is animated. In some embodiments the waves displayed on the interface are animated. In some embodiments, the main view graphically depicts the shoreline 1102 with waves breaking 1103, wave break direction 1104, wave direction distribution 1107, and wave height. In some embodiments, the main view shows other crowdsourced information such as hazards 1105 or notable points of interest 1106. In some embodiments, points of interest comprise a dolphin sighting, a shark sighing, a hazard sighting, and/or an aggressive surfer. In some embodiments, additional data including hazards and notable points of interest can also be manually entered by other surfers or the user either in the same app or via a separate app. In some embodiments, additional data is entered by tapping an icon 1108 on the interface. In some embodiments, a confidence level 1109 is displayed on the interface. In some embodiments, tapping the display with a finger causes more detailed information to be displayed on the same screen, the additional information comprising wave speed, wave direction, wave rideability, information related to points of interest, and/or information related to hazards. In some embodiments, wave shapes are used to display data about break direction, for example a right break 1201, a left break 1202, or an a-frame break 1203. In some embodiments, wave shapes are used to denote where white water 1204 is occurring. In some embodiments, wave shapes are used to denote wave break close-outs 1205. In some embodiments, wave shapes and/or straight lines 1206 are used to denote bumps (i.e., wave pulses).

Figure 13:
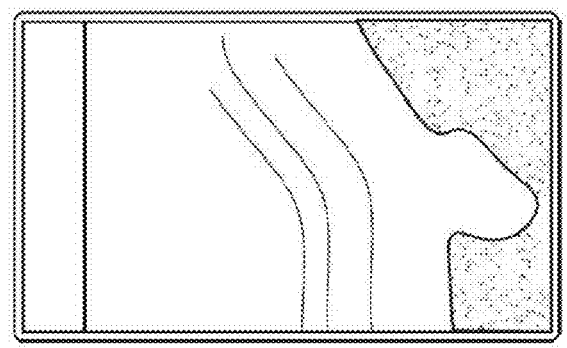
FIG. 13 shows a non-limiting example of the platforms, systems, methods and computer readable media to monitor a shore and near shore environment, in a non-limiting example an interface is provided to allow zooming in and out to view graphical data in an environmental data report.
Figure 13:
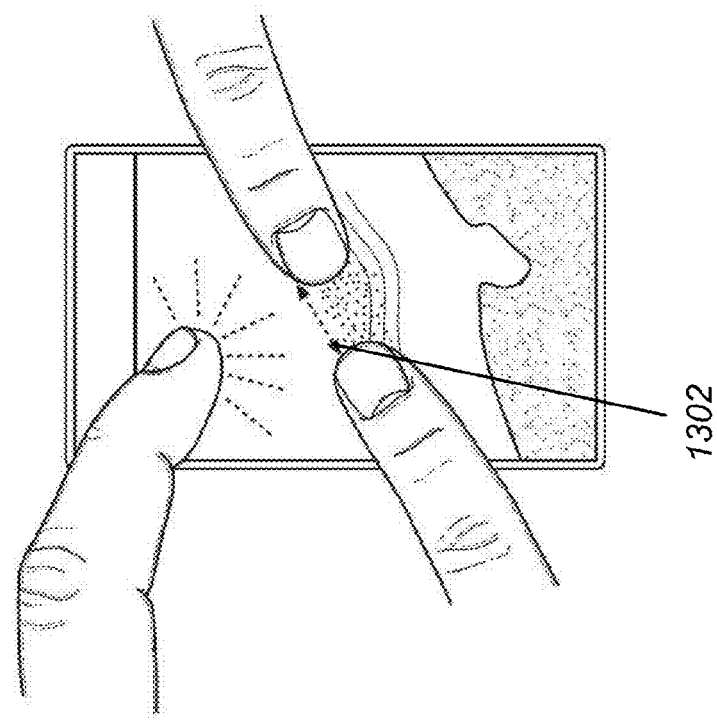
Figure 13:
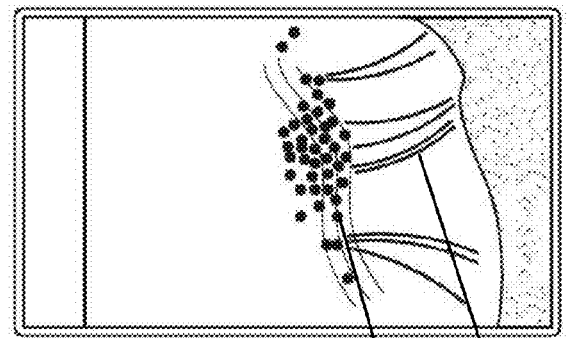

Referring to FIG. 13, in some embodiments of the platforms, systems, methods and media described herein, a user interacts with the interface by tapping to display the lineup positions and tracks of surfers providing data 1301. In some embodiments, a user interacts with the display using pinching and spreading to zoom in and out 1302. In some embodiments, a user is able to scroll and choose from a list of breaks. In some embodiments, wait zones 1303 and rides 1304 are depicted.

Figure 14:
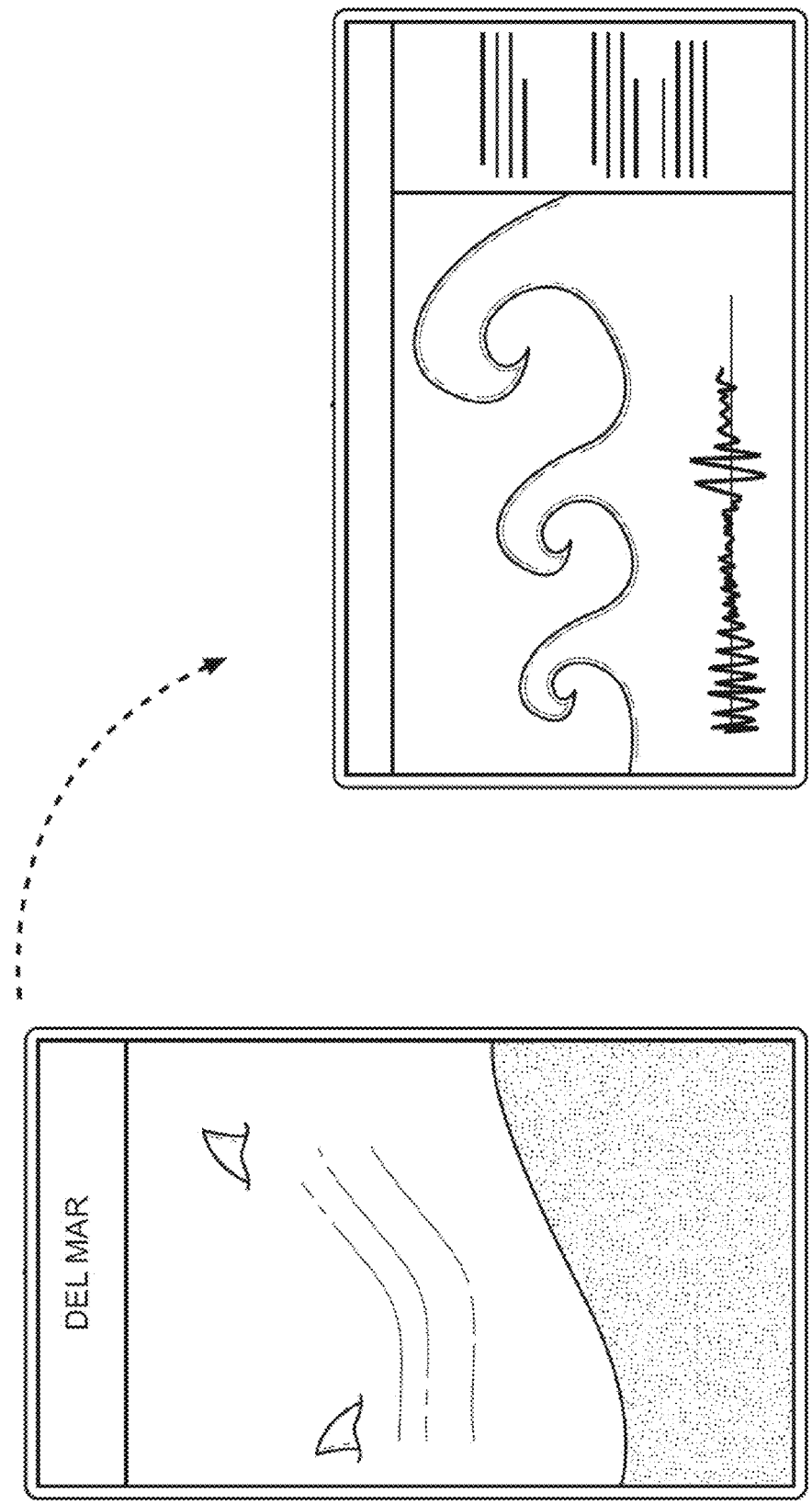
FIG. 14 shows a non-limiting example of the platforms, systems, methods and computer readable media to monitor a shore and near shore environment, in a non-limiting example an interface is provided to graphically show wave details in an environmental data report.

Referring to FIG. 14, in some embodiments of the platforms, systems, methods and media described herein, rotating the main view shows a secondary view that contains information comprising graphical information on wave timing.

Figure 15A:
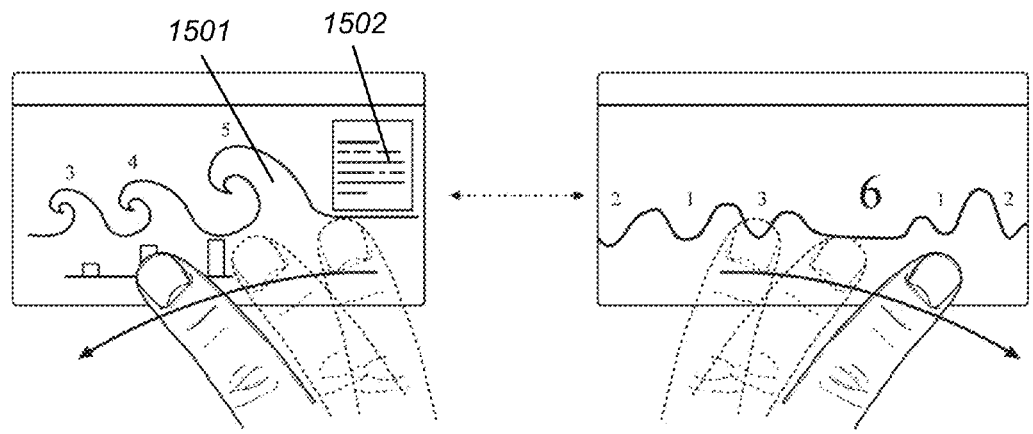
FIG. 15A shows a non-limiting example of the platforms, systems, methods and computer readable media to monitor a shore and near shore environment, in a non-limiting example an interface is provided to graphically display wave timing, set timing and wave heights in an environmental data report.
Figure 15B:
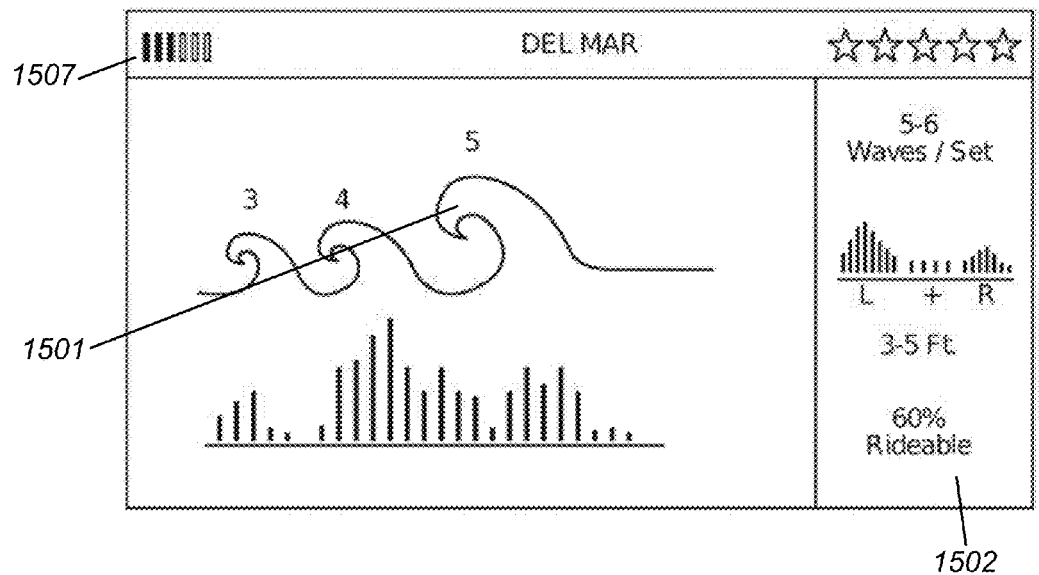
FIG. 15B shows a non-limiting example of the platforms, systems, methods and computer readable media to monitor a shore and near shore environment, in a non-limiting example an interface is provided to graphically display wave height and directional distribution in an environmental data report.
Figure 15C:
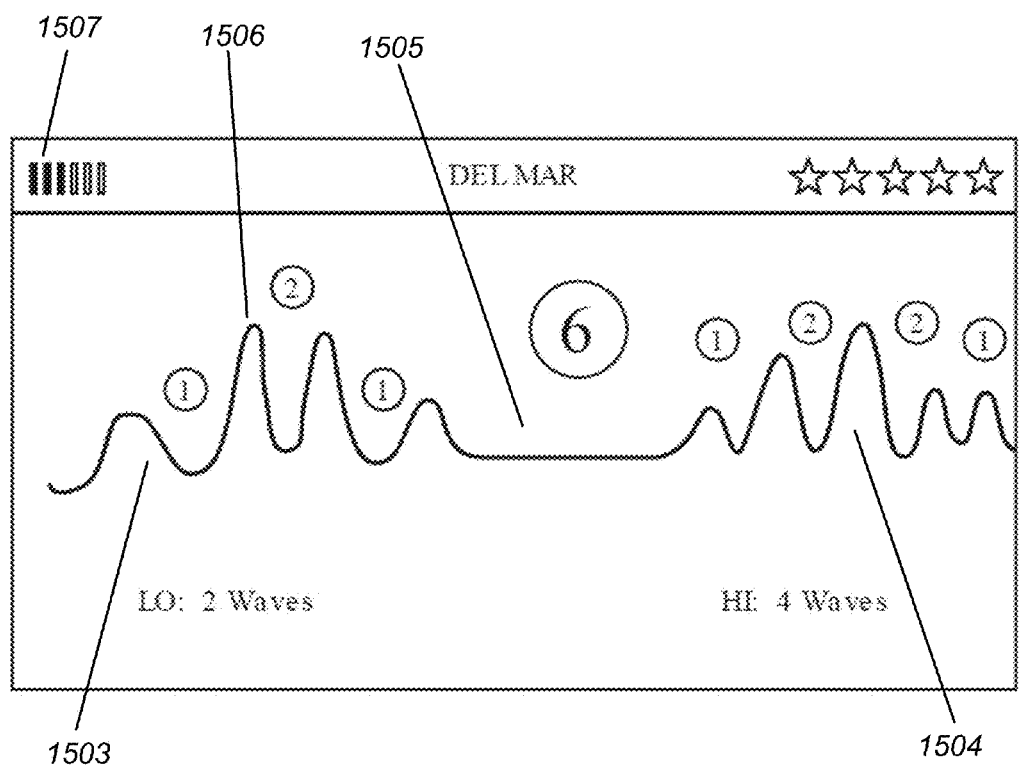
FIG. 15C shows a non-limiting example of the platforms, systems, methods and computer readable media to monitor a shore and near shore environment, in a non-limiting example an interface is provided to graphically display wave timing, set timing and wave height in an environmental data report.

Referring to FIGS. 15A-C, in some embodiments of the platforms, systems, methods and media described herein, a user is able to swipe across the secondary view to display more detail comprising wave timing details. In some embodiments, wave heights are graphically depicted 1501, the wave heights calculated by collecting a plurality of wave height data and then summarizing for a particular time interval by height and frequency of occurrence 1502; for example, 3-5 foot waves in the last hour, 45% were 3-foot, 35% were 4-foot, 25% were 5-foot. In some embodiments, when graphically depicting wave timing, two sets of waves are shown: one representing the set with the fewest waves in it 1503, and the other representing the set with the most waves in it 1504. In some embodiments, waves are displayed at varying sizes to indicate the heights. In some embodiments, the time between wave sets 1505 is depicted. In some embodiments, the time between waves is displayed 1506. In some embodiments, the wave break potential compared to the history of the break is displayed. In some embodiments the confidence level is depicted 1507. In some embodiments, in order to crowd-source data, the bobbing of each surfer in the line-up is tracked against their GPS position and clock time.

Figure 29:
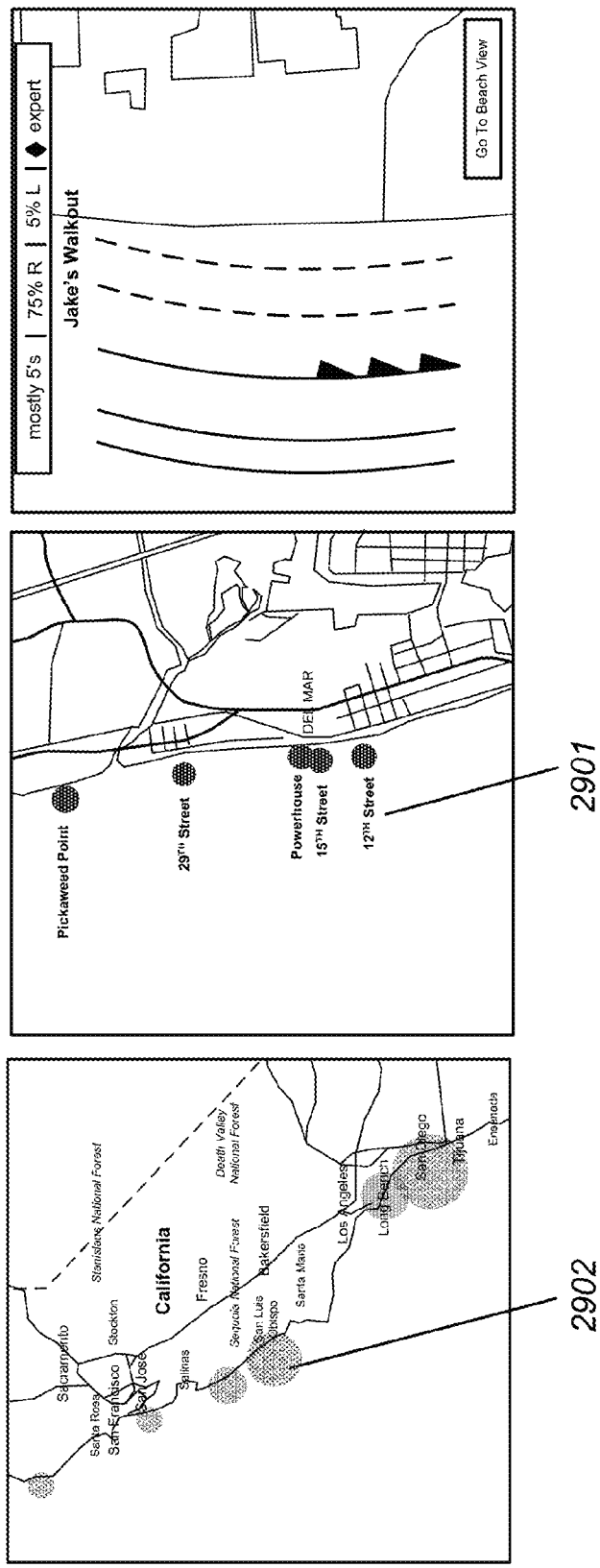
FIG. 29 shows a non-limiting example of the platforms, systems, methods and computer readable media to monitor a shore and near shore environment, in a non-limiting example zoomable maps for monitoring one or more surf locations are provided.

Referring to FIG. 29, in some embodiments, a user is able to choose a break from a zoomable map with monitored areas indicated by a graphical indicator 2901. In some embodiments, breaks are indicated by a graphic 2902, where the size of the graphic is proportional to the number of breaks in the area being indicated.

Figure 30:
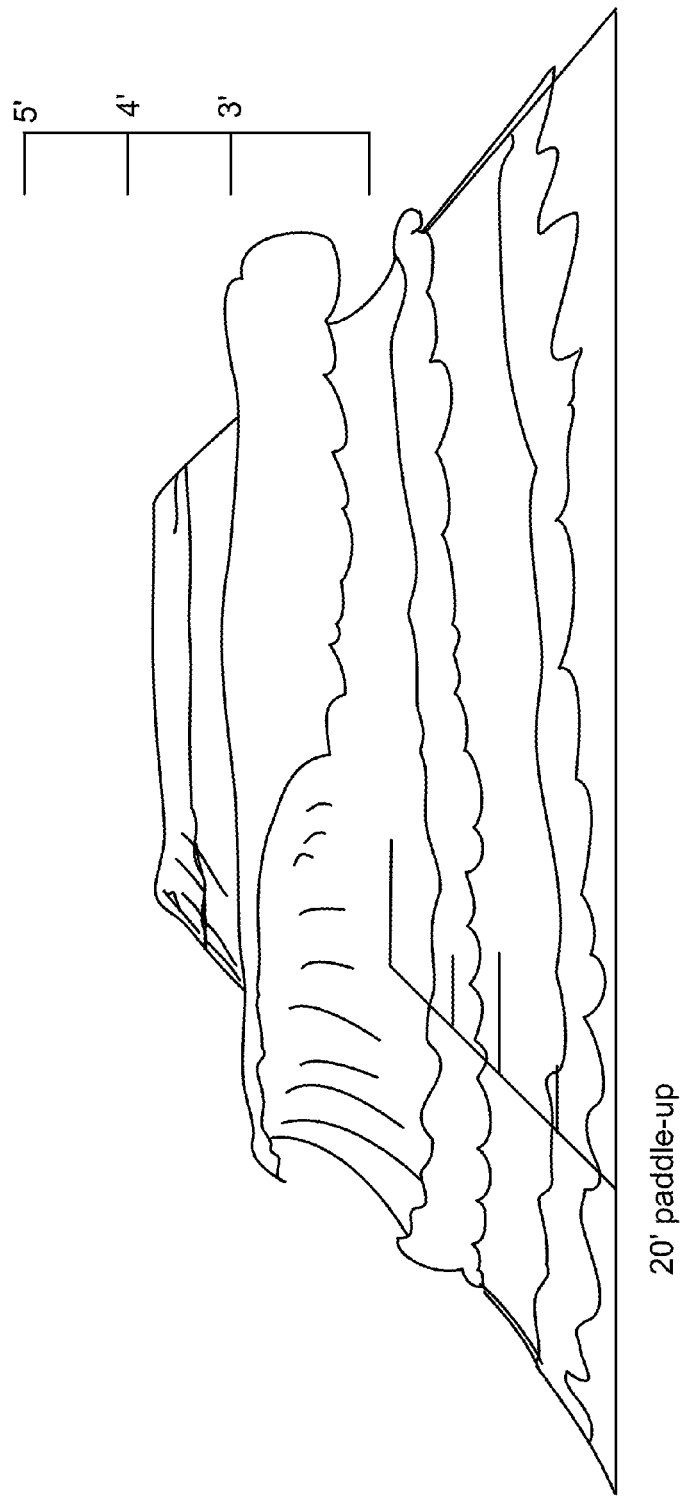
FIG. 30 shows a non-limiting example of the platforms, systems, methods and computer readable media to monitor a shore and near shore environment, in a non-limiting example a 3D graphical method for viewing surf report conditions is depicted.

Referring to FIG. 30, a 3D beach view with an overlay to depict wave heights and distances to waves is provided when a particular break is selected on the interface. In some embodiments the view depicted in FIG. 30 can be selected or toggled from the main screen view. In some embodiments, the view depicted in FIG. 30 is animated.

Processes and Methods to Monitor a Shore and Near Shore Environment

In certain aspects described herein are platforms, systems, methods and computer readable media described herein monitor a shore and near shore environment. In some embodiments, the platforms, systems methods and media comprise a plurality of sensors, each sensor associated with a near shore water recreationist or near shore water recreationist equipment, each sensor comprising: a detector configured to collect environmental data pertaining to a shore and near shore environment; and a communications element configured to transmit the environmental data collected by the detector, a server comprising a server processor configured to provide a server application comprising: a software module configured to receive the environmental data; a software module configured to apply an algorithm to the environmental data to determine a shore and near shore environmental condition; a software module configured to generate an environmental data report comprising the shore and near shore environmental condition; and a software module configured to transmit the environmental data report; and a device comprising a report processor configured to provide a report application comprising a software module configured to receive the environmental data report.

Figure 16A:
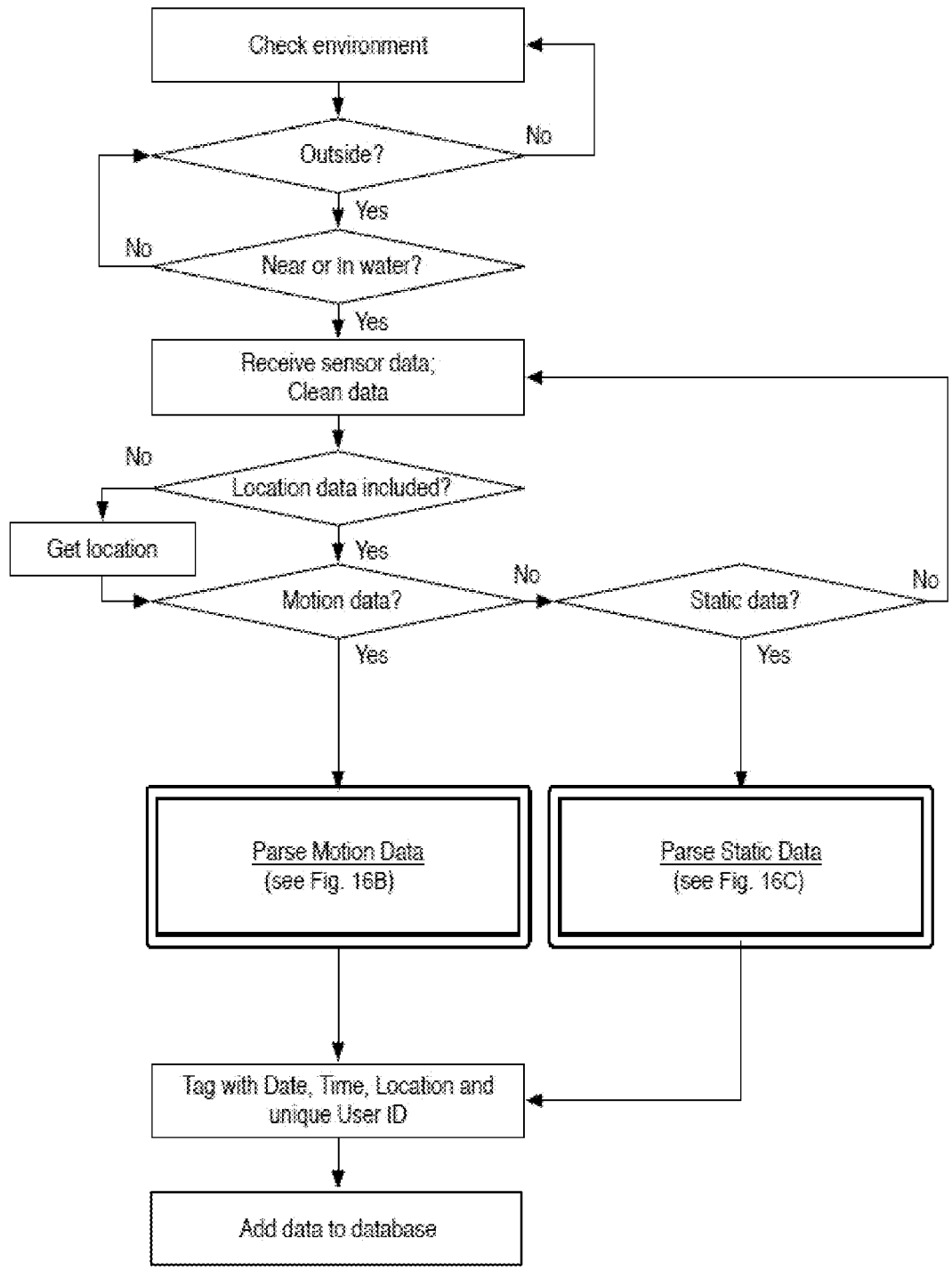
FIG. 16A, FIG. 16B and FIG. 16C show a non-limiting example of the platforms, systems, methods and computer readable media to monitor a shore and near shore environment, in a non-limiting example ocean data is derived by monitoring activity.
Figure 16B:
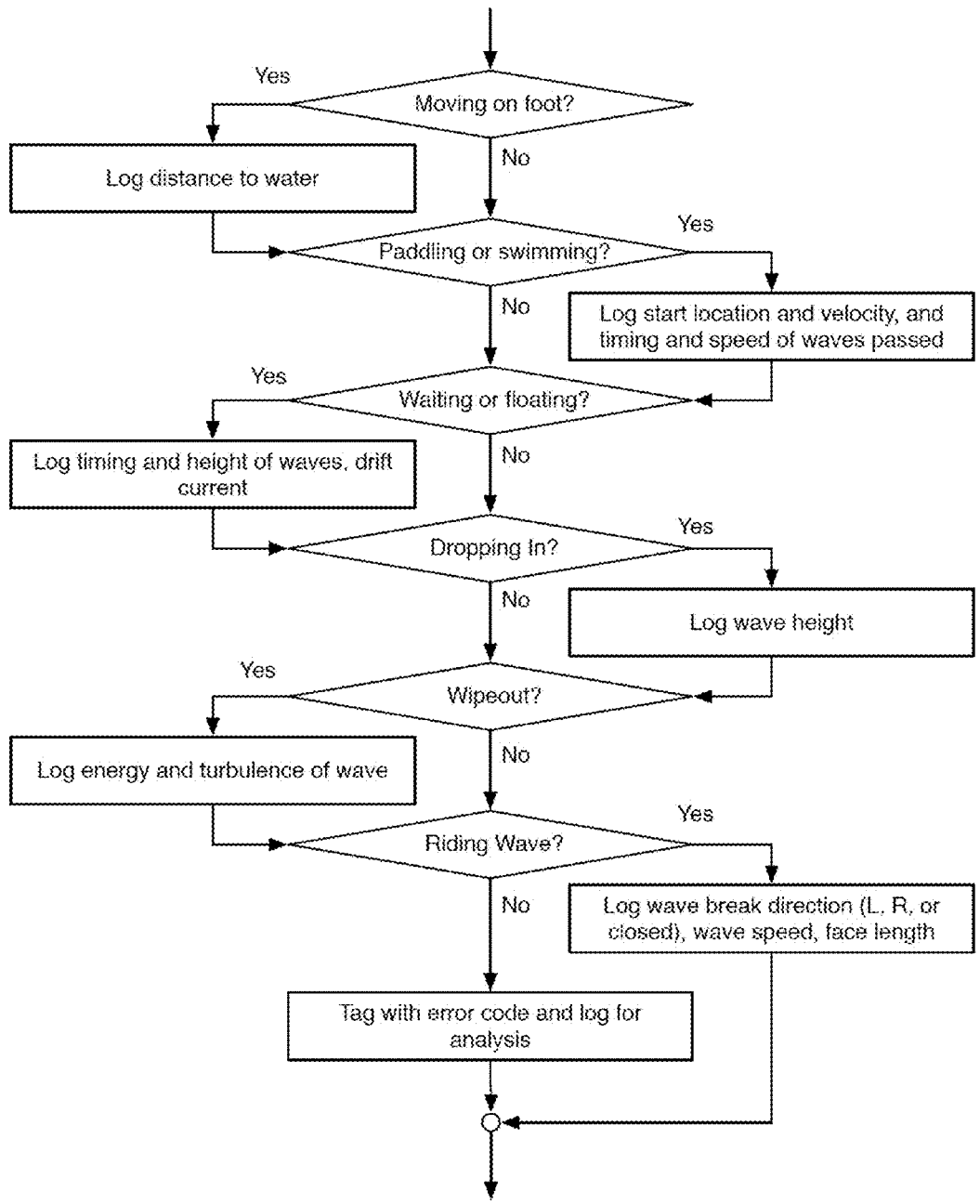
Figure 16C:
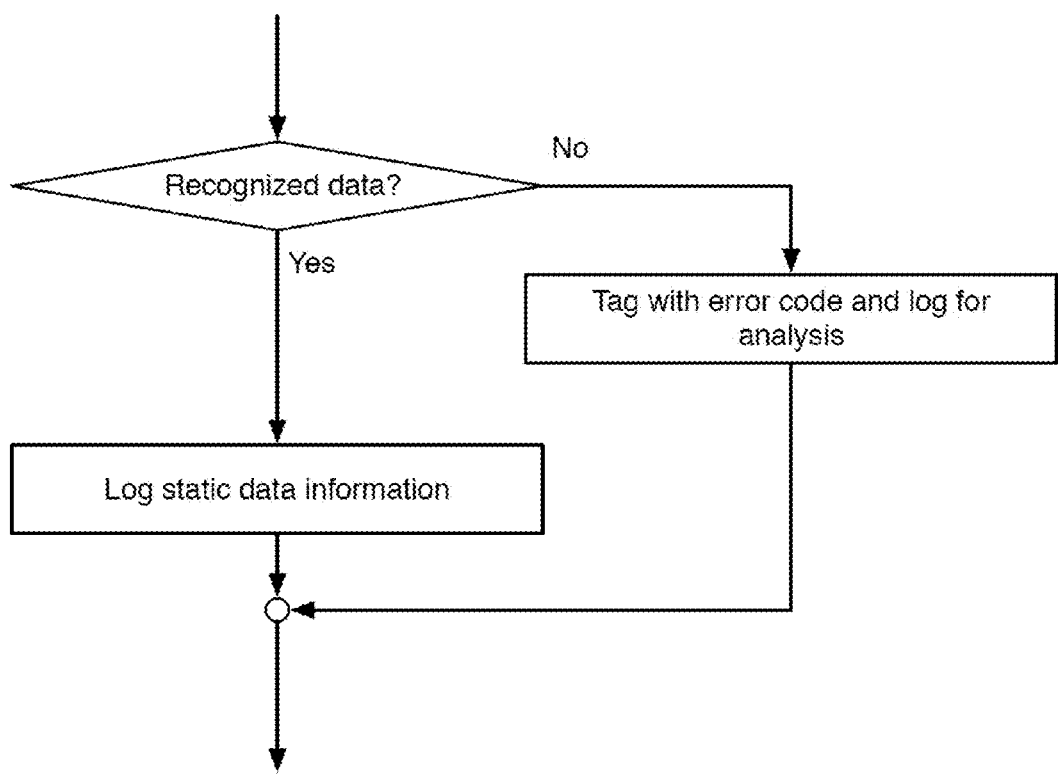

In some embodiments, the platforms, systems, methods and computer readable media monitor a shore and/or near shore environment to extract ocean data. In some embodiments, a method for monitoring shore and/or near shore activity to extract ocean data is shown, in a non-limiting example in FIG. 16A, FIG. 16B, and FIG. 16C the method comprising the following steps:

i. Check the environment of the sensor and/or detector to determine if the sensor and/or detector is outside. If not outside, then continue to check the environment. If outside, then check whether the sensor and/or detector is near or in the ocean. If not in or near the ocean, then check if the sensor or detector is outside. If near or in the ocean, then the sensor and/or detector is prepared to receive data.

ii. When the sensor and/or detector is prepared to receive data, check whether the sensor and/or detector comprises an element to determine the location of the sensor and/or detector. If the sensor and/or detector does not comprise an element to determine the location of the sensor and/or detector, then retrieve the location from the user. If the sensor and/or detector comprises an element to determine the location of the sensor and/or detector, then continue to the next step.

iii. When the sensor and/or detector comprises an element to determine the location of the sensor and/or detector, check whether the sensor and/or detector comprises an element to determine motion. If the sensor and/or detector does not comprise an element to determine motion, then check whether the sensor is prepared to receive data. If the sensor and/or detector does comprise an element to determine motion, then check whether the use it moving on foot. If the user is moving on foot, the distance to the water is logged. If the user is or is not moving on foot, next check whether the user is paddling or swimming. If the user is paddling or swimming, log the start location, timing and speed of waves encountered by the sensor and/or detector. If the user is or is not paddling or swimming, next check whether the user is waiting. If the user is waiting, log the timing and height of waves and log the drift current. If the user is or is not waiting, next check whether the user is dropping in a wave. If the user is dropping in, then log the wave height. If the user is or is not dropping in a wave, next check whether the user has wiped out. If the user has wiped out, then log the energy and turbulence of the wave that caused the wipeout. If the user has or has not wiped out, then check whether the user is riding a wave. If the user is riding a wave, log the wave break direction, wave speed and face length. If the user is not riding a wave and the sensor and/or detector is configured to collect motion data but the sensor and/or detector has not detected the user is moving on foot, has not detected the user is paddling or swimming, has not detected the user is waiting, has not detected the user is dropping in a wave, and has not detected the user has wiped out, then tag the data with an error code and log the data.

iv. When the sensor and/or detector comprises an element to determine the location of the sensor and/or detector, also check whether the sensor and/or detector comprises an element to (1) determine a condition of the shore or near shore environment, the condition comprising temperature, pH, salinity, turbidity, light, or clarity, (2) monitor bio-matter of the shore or near shore environment, the bio-matter comprising bacteria, algae, fungi, or plankton, and/or (3) monitor pollution of the shore or near shore environment, the pollution comprising hydrocarbons, radiation, or chemicals. If the sensor and/or detector does not comprise such an element, then check whether the sensor is prepared to receive data. If the sensor and/or detector comprises such an element, then check whether the data is recognized. If the data is not recognized, then tag the data with an error code and log the data. If the data is recognized, then log the data.

v. For all logged data, including data with an error code, tag with the data with a date, time, location, and a unique user ID, and add to a database.

In some embodiments, the sensor and/or detector collects motion data using an accelerometer, a gyroscope, a GPS and any combination thereof. In some embodiments, motion data is collected during activities comprising surfing, stand-up paddle boarding, bodyboarding, body surfing, swimming, kayaking and/or any activity in the ocean. In some embodiments, a wave comprises a bump in the water line before it crests, a rising wave, a breaking wave, or moving white water following the break of a wave. In some embodiments, logging data comprises transmitting the data to the server. In some embodiments, a device comprises the sensor and/or detector and the device comprises a store to log the data. In some embodiments, the sensor and/or detector comprises a store to log the data.

Figure 17A:
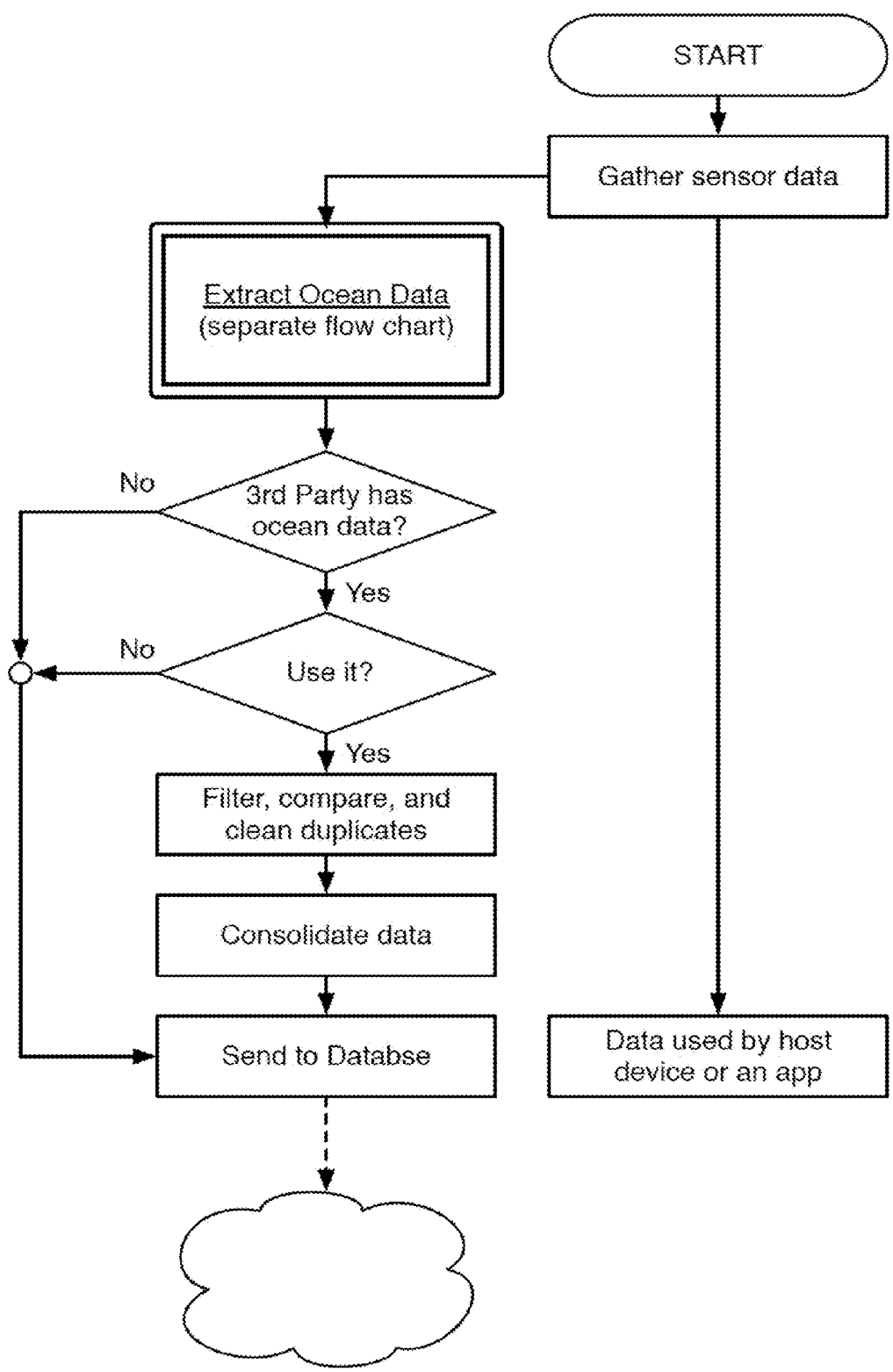
FIG. 17A and FIG. 17B show a non-limiting example of the platforms, systems, methods and computer readable media to monitor a shore and near shore environment, in each non-limiting example data is acquired from activity trackers.
Figure 19A:
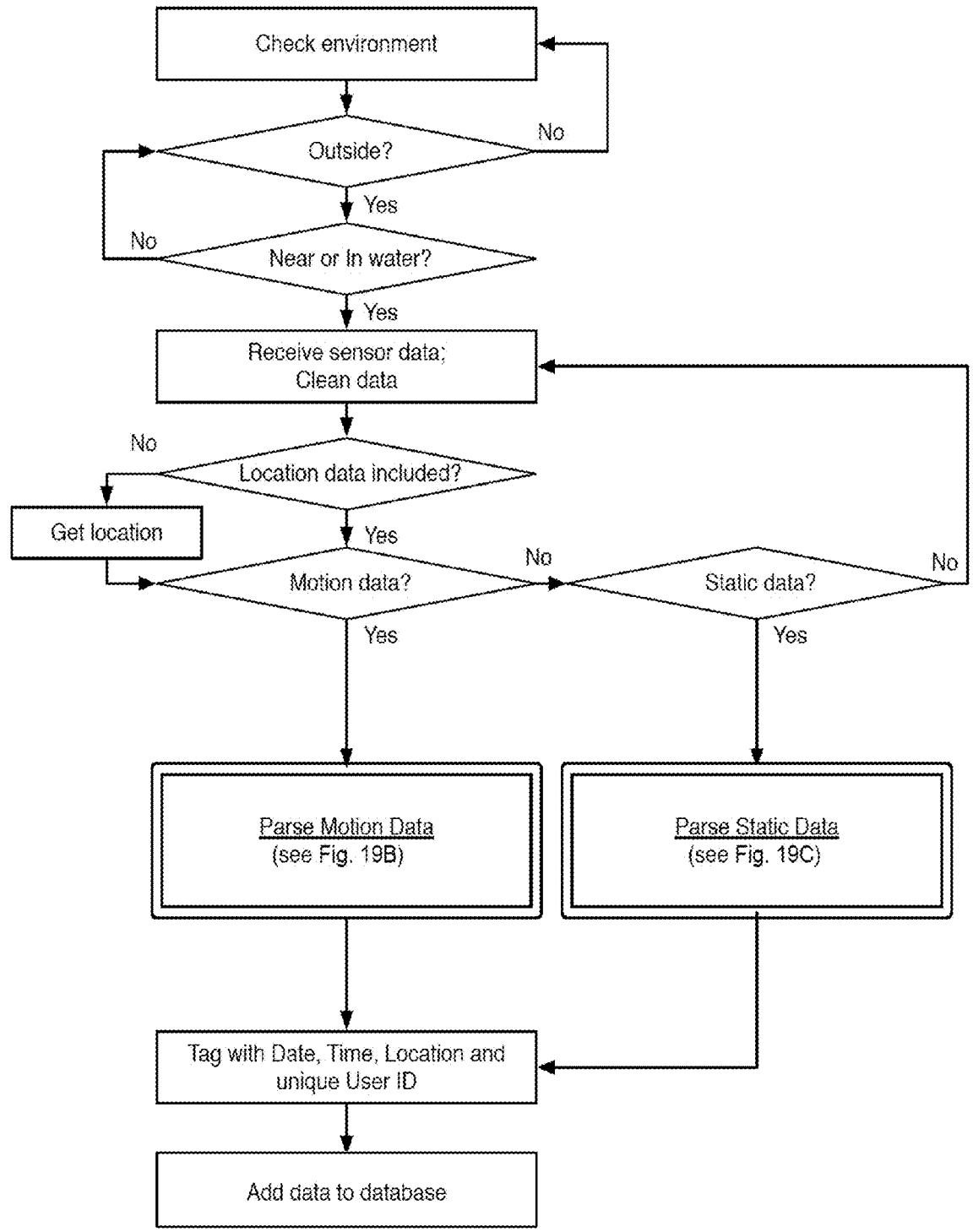
FIG. 19A, FIG. 19B and FIG. 19C show a non-limiting example of the platforms, systems, methods and computer readable media to monitor a shore and near shore environment, in a non-limiting example coastal data is extracted derived by monitoring activity.
Figure 19B:
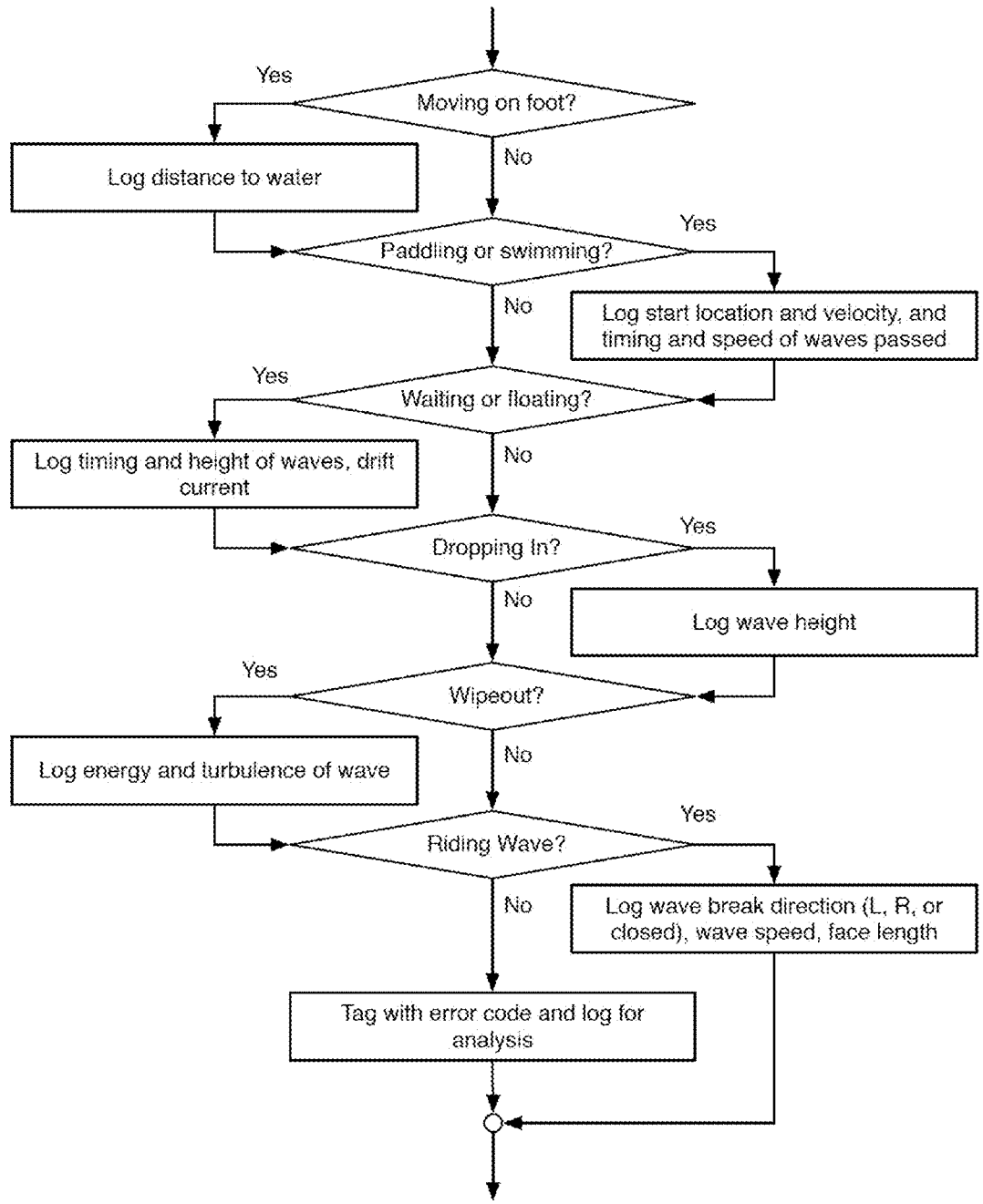
Figure 19C:
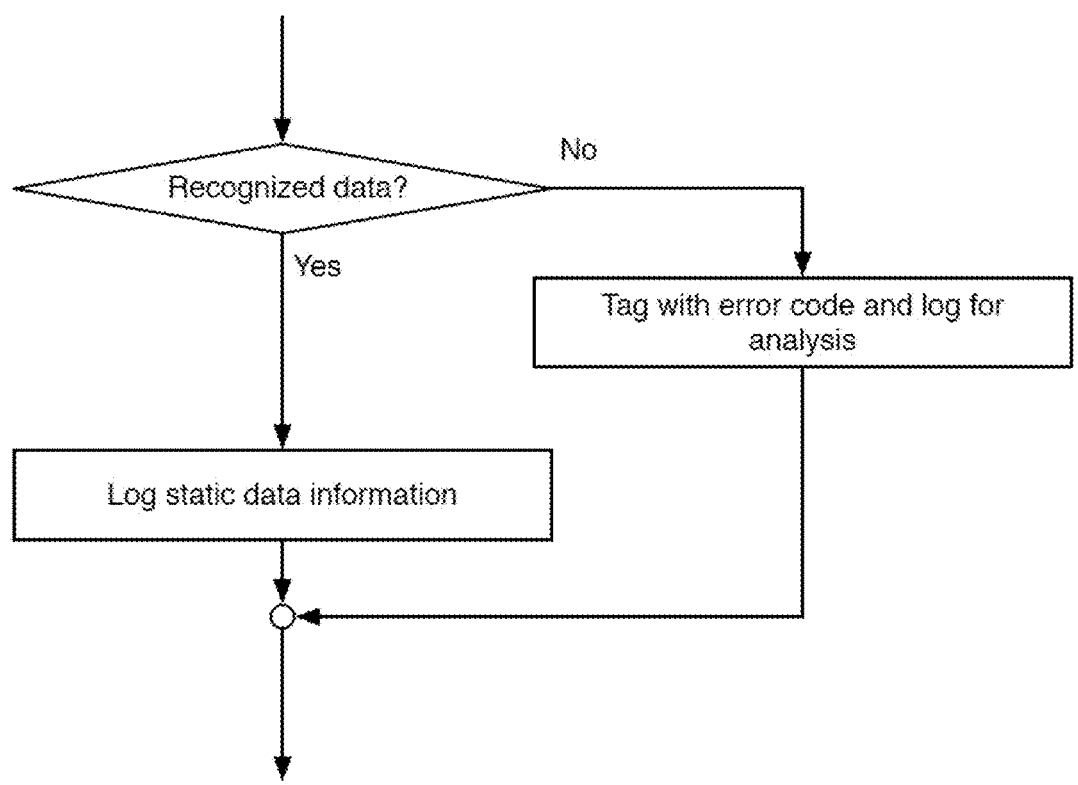

In some embodiments, the platforms, systems, methods and computer readable media described herein comprise a plurality of sensors each sensor comprising a detector. In some embodiments the sensor is "smart" such that it gathers data from a shore and near shore environment and manipulates the data, for example using the method described in FIG. 16A-C and/or FIG. 19A-C. In some embodiments a device comprises a "smart" sensor, the device capable of collecting additional shore and near shore environment data. In some embodiments, a device comprising a "smart" sensor is a "smart device." In some embodiments, non-limiting examples of a "smart" sensor and/or a "smart device" are a surfing application on a smart phone, a surfing watch for activity tracking, a GPS watch, an advanced sensor with a processor, a cellular phone, a smart phone, and a smart watch. As a non-limiting example, referring to FIG. 17A, a device comprising a "smart" sensor functions according to the following steps:

i. Gather environmental data pertaining to a shore and near shore environment, submit the data to the process described in FIG. 16A-C and/or FIG. 19A-C and/or use the environmental data pertaining to a shore and near shore environment by the host device and/or an application on the device.

ii. Check if the device is capable of collecting other activity or environmental data. If the device is not capable of collecting other activity or environmental data or if the data is determined not to be useful, just send the sensor collected data to a database. If the other environmental data or activity data is determined to be useful, then filter, compare and clean duplicate data, consolidate the other data with the sensor collected data and send to the database.

Figure 17B:
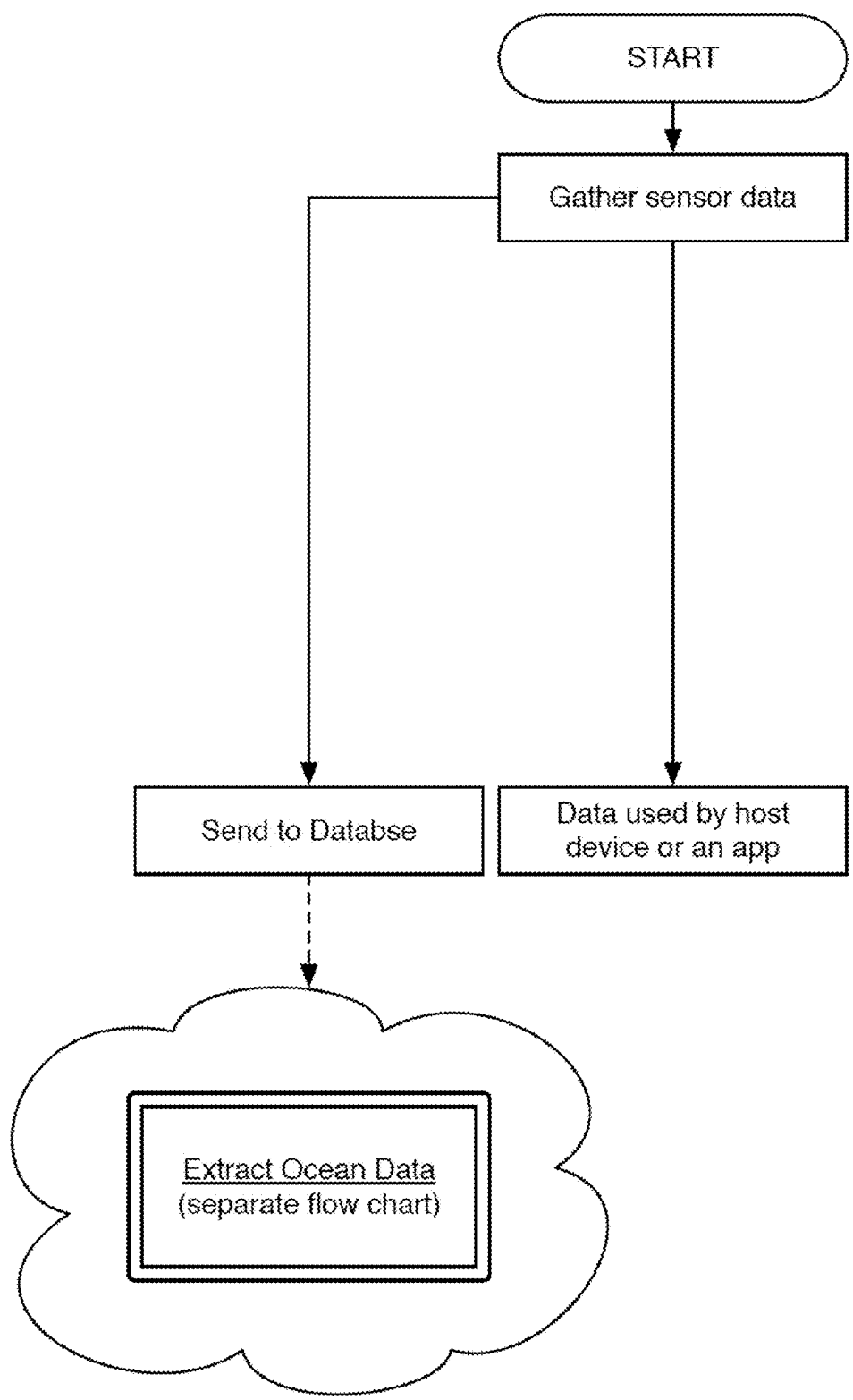

In some embodiments, the sensor is "dumb" such that it transmits raw data collected by the sensor to the database. In some embodiments, a device comprises a "dumb" sensor. In some embodiments, a device comprising a "dumb" sensor is a "dumb device." In some embodiments, non-limiting examples of a "dumb" sensor and/or a "dumb device" are a simple activity tracker, an activity tracking device, a personal tracking device, a health application on a smart phone, an activity tracking application on a smart phone, a data logging device, a personal activity tracker, a Fit Bit, a Jawbone UP, a Misfit Shine, a Nike+ Fuelband, a Samsung Gear Fit, a Garmin Vivofit, or TomTom Multi-Sort GPS watch. As a non-limiting example, referring to FIG. 17B, a device comprising a "dumb" sensor functions according to the following steps: Gather environmental data pertaining to a shore and near shore environment and send the data to a database and/or use the environmental data pertaining to a shore and near shore environment by the host device and/or an application on the device. In some embodiments, the environmental data is manipulated using, for example, the methods depicted in FIG. 16A-C and/or FIG. 19A-C.

Figure 18:
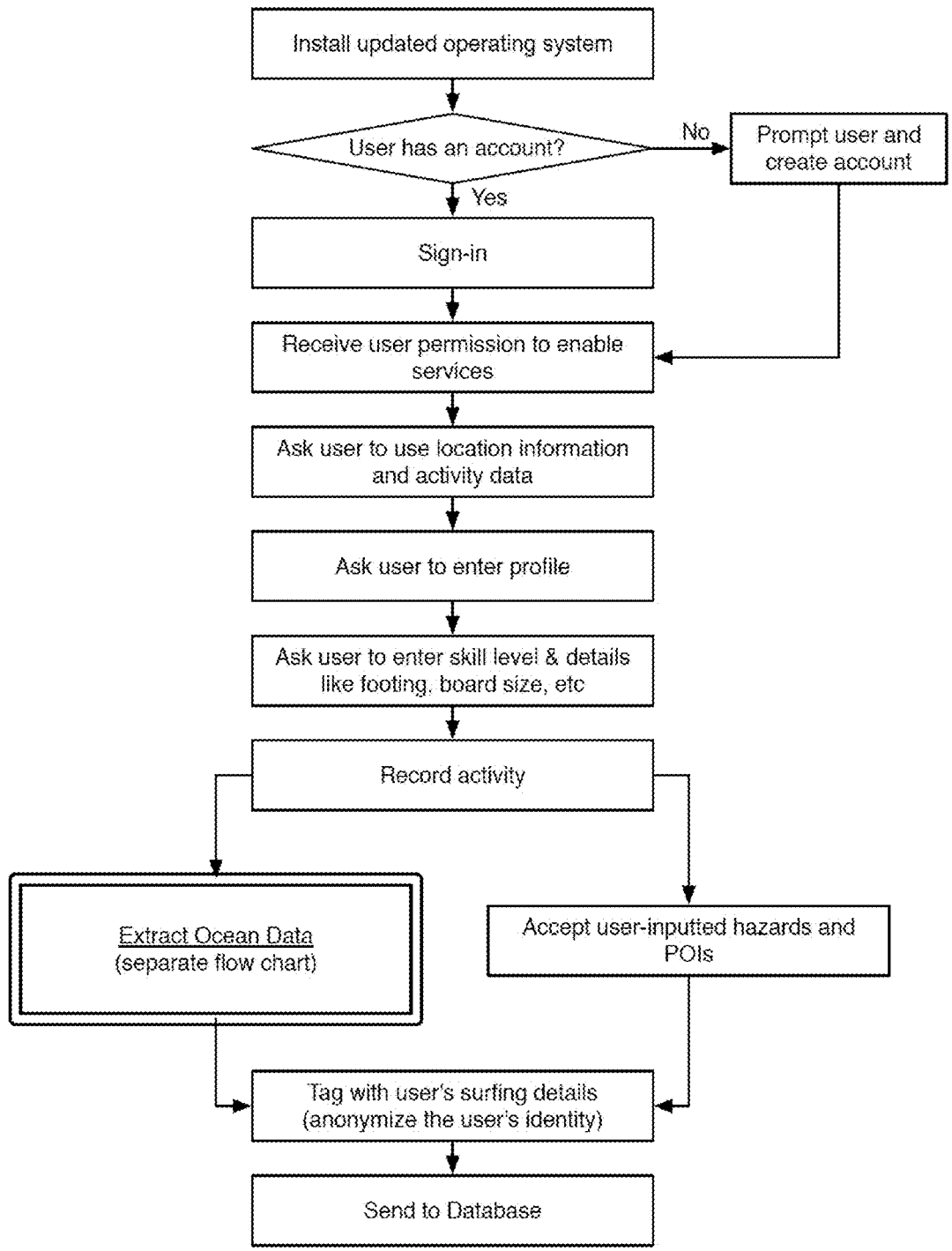
FIG. 18 shows a non-limiting example of the platforms, systems, methods and computer readable media to monitor a shore and near shore environment, in a non-limiting example data is acquired by an application.

In some embodiments, the platforms, systems, methods and computer readable media described herein comprise a surf application. In some embodiments, the application can be installed on a computing device comprising a computing processor, such as a laptop or portable computer, a smart phone, a tablet, a smart watch. In some embodiments the device comprises one or more of an accelerometer, a location tracking element (e.g., GPS), a compass, and an altimeter. In some embodiments, the application will display surf conditions on the device. As a non-limiting example, referring to FIG. 18, the application functions according to the following process:

i. Install updated operating system for the application
ii. Check whether the user has an account. If the user does not have an account prompt the user to create an account. If the user does have an account, prompt the user to sign in.
iii. After the user has created an account and/or signed in, receive user permission to enable services.
iv. Ask the user to approve use of location information and activity data.
v. Ask the user to enter a profile.
vi. Ask the user to enter profile elements comprising skill level, footing, and board size.
vii. Begin to record user activity.
viii. After recording activity, extract ocean data, for example using methods described in FIG. 16A-C and/or FIG. 19A-C and/or accept user-input data comprising hazards and/or points of interest.
ix. After extracting ocean data and/or accepting user-input data, tag all data with user's surfing details so as to make the user's identity anonymous.
x. Send the tagged data to a database.

In some embodiments, the platforms, systems, methods and computer readable media monitor a shore and/or near shore environment to extract coastal data. In some embodiments, a method for monitoring shore and/or near shore activity to extract coastal data is shown, in a non-limiting example in FIG. 19A, FIG. 19B, and FIG. 19C, the method comprising the following steps:

i. Check the environment of the sensor and/or detector to determine if the sensor and/or detector is outside. If not outside, then continue to check the environment. If outside, then check whether the sensor and/or detector is near or in the water. If not in or near the water, then check if the sensor or detector is outside. If near or in the water, then the sensor and/or detector is prepared to receive data.
ii. When the sensor and/or detector is prepared to receive data, check whether the sensor and/or detector comprises an element to determine the location of the sensor and/or detector. If the sensor and/or detector does not comprise an element to determine the location of the sensor and/or detector, then retrieve the location from the user. If the sensor and/or detector comprises an element to determine the location of the sensor and/or detector, then continue to the next step.
iii. When the sensor and/or detector comprises an element to determine the location of the sensor and/or detector, check whether the sensor and/or detector comprises an element to determine motion. If the sensor and/or detector does not comprise an element to determine motion, then check whether the sensor is prepared to receive data. If the sensor and/or detector does comprise an element to determine motion, then check whether the use it moving on foot. If the user is moving on foot, the distance to the water is logged. If the user is or is not moving on foot, next check whether the user is paddling or swimming. If the user is paddling or swimming, log the start location, timing and speed of waves encountered by the sensor and/or detector. If the user is or is not paddling or swimming, next check whether the user is waiting. If the user is waiting, log the timing and height of waves and log the drift current. If the user is or is not waiting, next check whether the user is dropping in a wave. If the user is dropping in, then log the wave height. If the user is or is not dropping in a wave, next check whether the user has wiped out. If the user has wiped out, then log the energy and turbulence of the wave that caused the wipeout. If the user has or has not wiped out, then check whether the user is riding a wave. If the user is riding a wave, log the wave break direction, wave speed and face length. If the user is not riding a wave and the sensor and/or detector is configured to collect motion data but the sensor and/or detector has not detected the user is moving on foot, has not detected the user is paddling or swimming, has not detected the user is waiting, has not detected the user is dropping in a wave, and has not detected the user has wiped out, then tag the data with an error code and log the data.
iv. When the sensor and/or detector comprises an element to determine the location of the sensor and/or detector, also check whether the sensor and/or detector comprises an element to (1) determine a condition of the shore or near shore environment, the condition comprising temperature, pH, salinity, turbidity, light, or clarity, (2) monitor bio-matter of the shore or near shore environment, the bio-matter comprising bacteria, algae, fungi, or plankton, and/or (3) monitor pollution of the shore or near shore environment, the pollution comprising hydrocarbons, radiation, or chemicals. If the sensor and/or detector does not comprise such an element, then check whether the sensor is prepared to receive data. If the sensor and/or detector comprises such an element, then check whether the data is recognized. If the data is not recognized, then tag the data with an error code and log the data. If the data is recognized, then log the data.

v. For all logged data, including data tagged with an error code, tag with the data with a date, time, location, and a unique user ID, and add to a database.

In some embodiments, the sensor and/or detector collects motion data using an accelerometer, a gyroscope, a GPS and any combination thereof. In some embodiments, motion data is collected during activities comprising surfing, stand-up paddle boarding, bodyboarding, body surfing, swimming, kayaking and/or any activity in the water. In some embodiments, a wave comprises a bump in the water line before it crests, a rising wave, a breaking wave, or moving white water following the break of a wave. In some embodiments, logging data comprises transmitting the data to the server. In some embodiments, a device comprises the sensor and/or detector and the device comprises a store to log the data. In some embodiments, the sensor and/or detector comprises a store to log the data.

Figure 20:
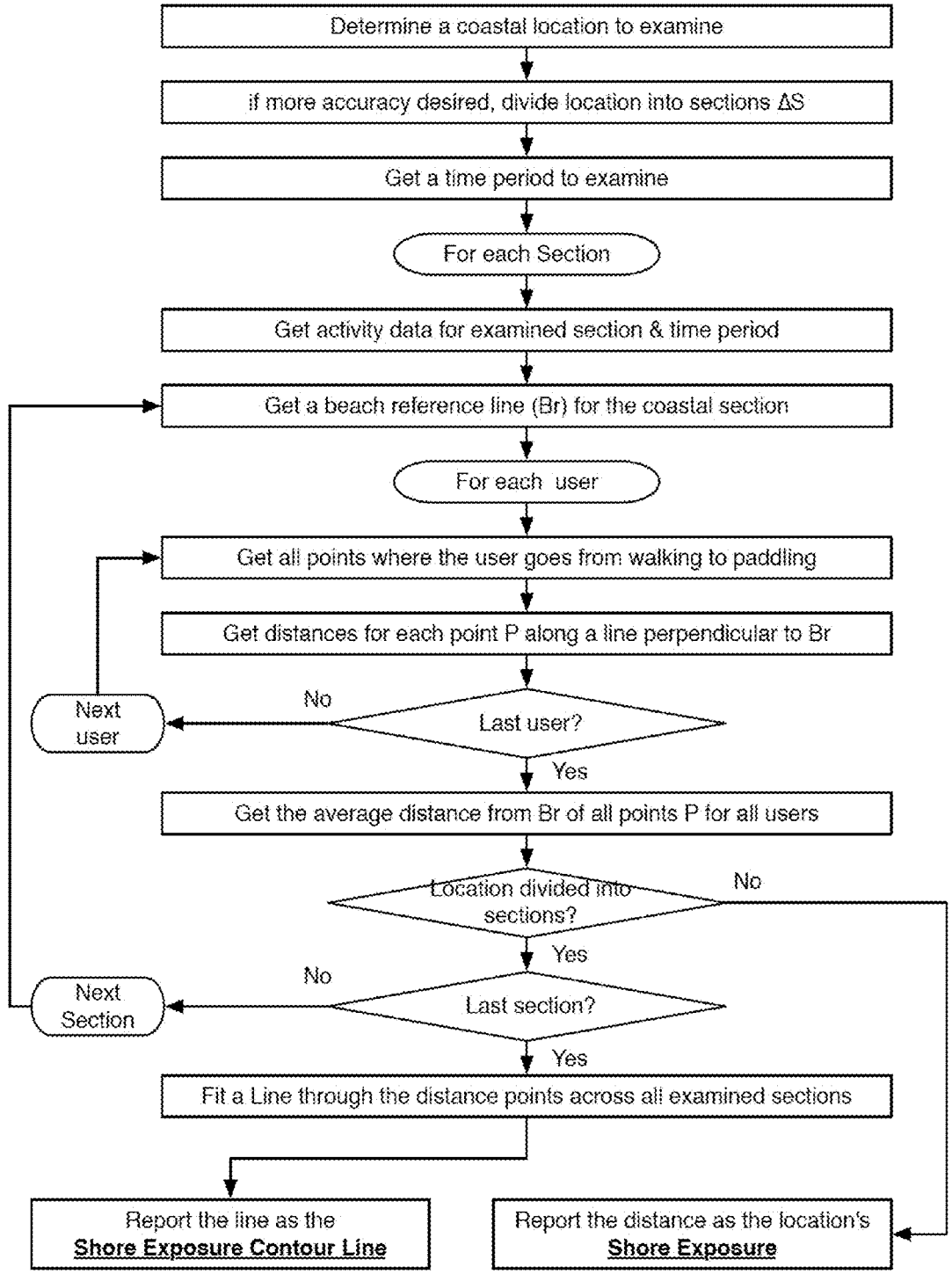
FIG. 20 shows a non-limiting example of the platforms, systems, methods and computer readable media to monitor a shore and near shore environment, in a non-limiting example a method for determining shore exposure is provided.

In some embodiments, the platforms, systems, methods and computer readable media monitor a shore and/or near shore environment to determine shore exposure. In some embodiments, shore exposure describes the movement of the surf zone relative to the shore. In some embodiments, shore exposure is described as the distance between the surf zone and inland boundary of the beach. The area within where waves generally wash on and off shore is described as the swash zone. In some embodiments, the swash zone moves may or may not contain water as the waves wash on and off the shore. The point at which water is generally always present and does not fluctuate significantly is the border between the Swash Zone and the Surf Zone; in some embodiments, this point is the paddle point. In some embodiments, the paddle point is inside the Surf Zone. In some embodiments, the paddle point is the point at which surfers switch from walking in the water to paddling on their board. In some embodiments, a method to determine shore exposure is shown in a non-limiting example in FIG. 20.

In some embodiments, by aggregating the paddle points for multiple, adjacent coastal sections, a curve can be fitted through the points. In some embodiments, this line reflects the topography of the tidal floor and corresponding shoreline; the accuracy of this line increases as the ΔS decreases and the number of sections in an examined area increases.

Figure 21A:
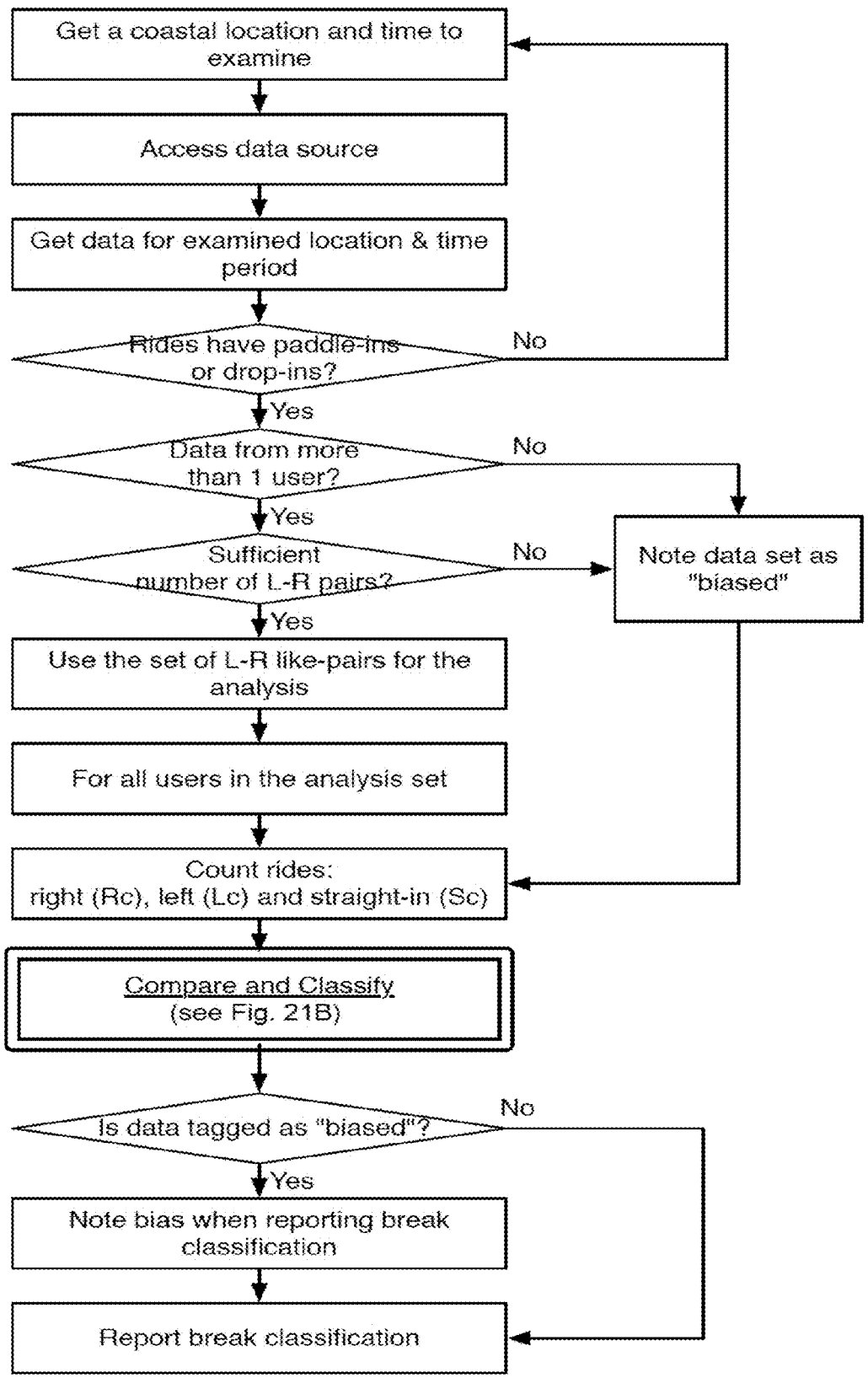
FIG. 21A and FIG. 21B shows a non-limiting example of the platforms, systems, methods and computer readable media to monitor a shore and near shore environment, in a non-limiting example a method for determining breaking wave direction is provided.
Figure 21B:
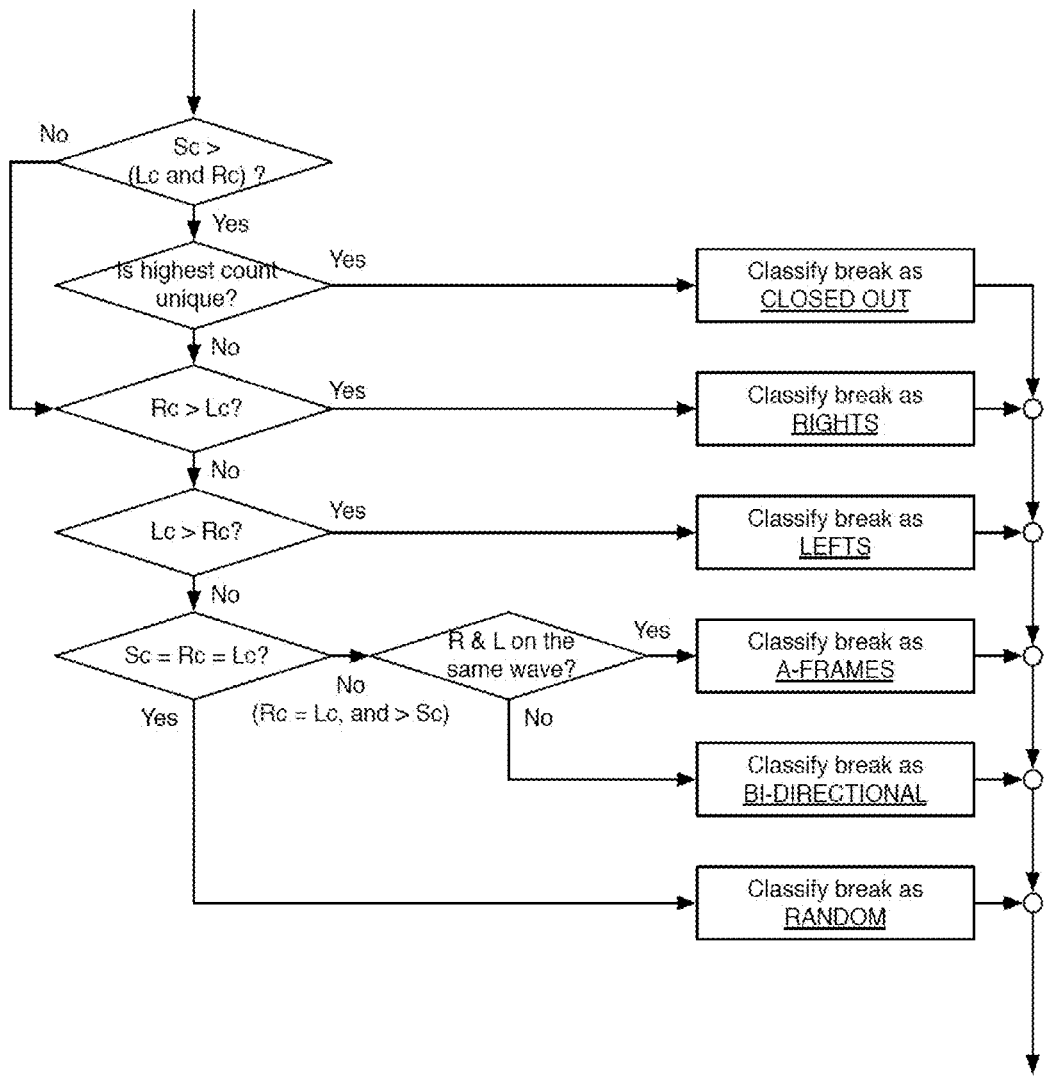

In some embodiments, the platforms, systems, methods and computer readable media monitor a shore and/or near shore environment to determine a wave break direction. In some embodiments, determining a wave break direction comprises data from a plurality of sensors. In some embodiments, determining a wave break direction uses data from a plurality of pairs of left and right riders to compensate for population bias from an abundance of one type of rider, or riders with a preference for a particular direction. In some embodiments, when the data contains more data points from left or right riders, the data is labeled as "biased." In some embodiments, a method to determine a wave break direction is shown in a non-limiting example in FIG. 21A and FIG. 21B. In some embodiments, data for paddle-ins and/or drop-ins includes paddle-ins and/or drop-ins that lead to successful rides as well as paddle-ins and/or drop-ins that lead to a turn at the bottom of the wave but only lead to partial ride before wiping out, and paddle-ins and/or drop-ins that lead to a wipeout. In embodiments, a left rider is a goofy-footed rider, or a rider that prefers turning left on a wave, regardless of footing. In some embodiments a right rider is a regular-footed rider, or a rider that prefers turning right on a wave, regardless of footing. In some embodiments left and right pairs, left-handed and right-handed riders, respectively, who are of similar ability. In some embodiments, rider details such as ability, direction preference, and footing are part of a user profile, for example the user profile created according to the example shown in FIG. 18.

Figure 22:
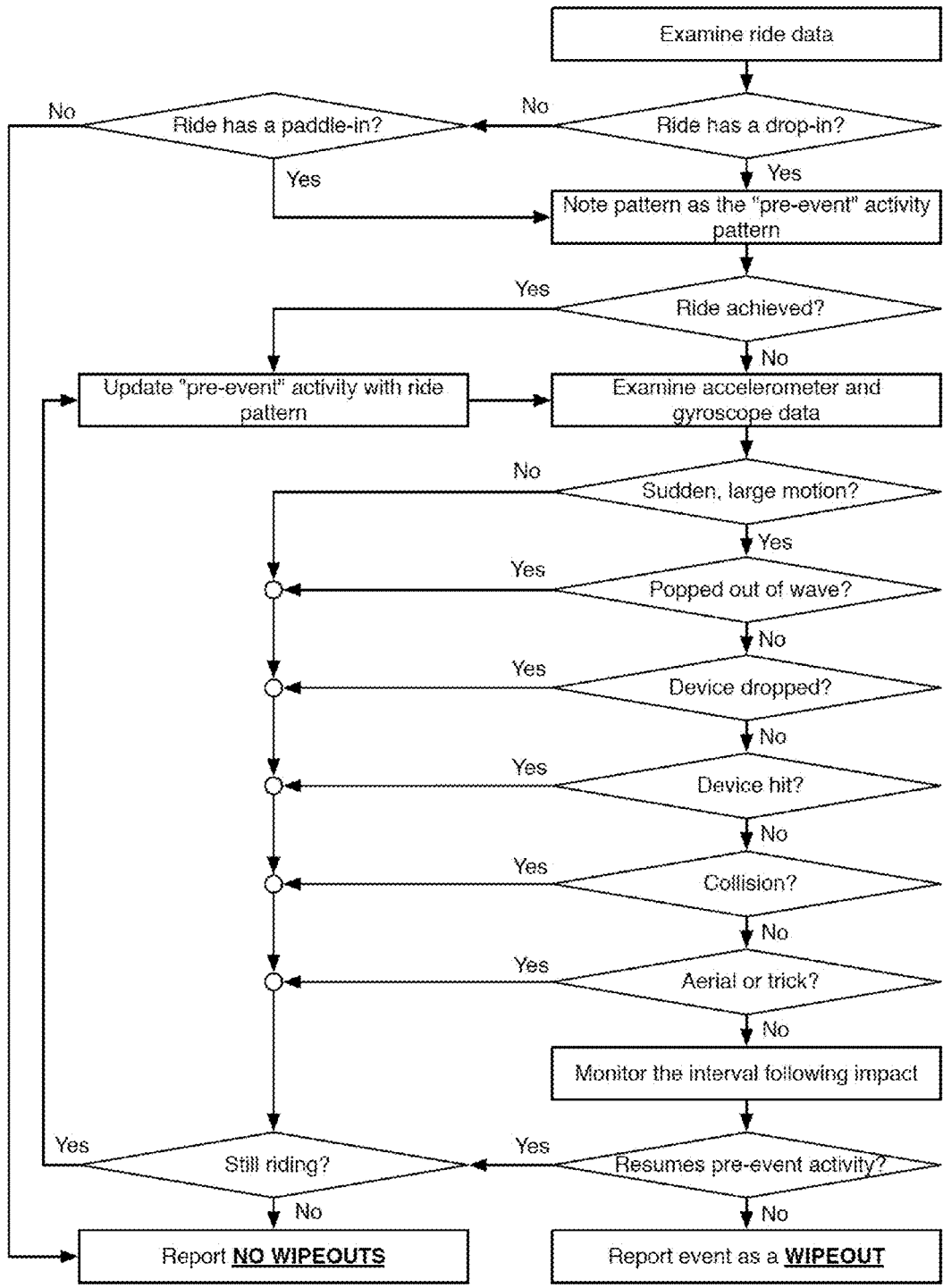
FIG. 22 shows a non-limiting example of the platforms, systems, methods and computer readable media to monitor a shore and near shore environment, in a non-limiting example a method for determining a wipeout is provided.

In some embodiments, the platforms, systems, methods and computer readable media monitor a shore and/or near shore environment to determine a wipeout. In some embodiments, data from one or more sensors comprising an accelerometer and/or a gyroscope are used to determine a wipeout. In some embodiments a method for determining a wipeout comprises interrogating environmental data pertaining to a shore and near shore environment to find a sudden change in speed and/or sudden change in orientation, and/or sudden, large acceleration caused by the user comprising the sensor falling in a wave, and then interrogating the data to check whether a sustained period of large magnitude, turbulent activity follows the sudden change in speed and/or sudden change in orientation as the user tumbles in the surf. In some embodiments, a method to determine a wipeout is shown in a non-limiting example in FIG. 22, the method comprising the steps:

i. Examine the ride data.

ii. Determine whether the ride has a drop-in. If the ride does not have a drop-in, then determine whether the ride has a paddle-in. If the ride does no not have a paddle-in, then report that the ride has no wipeouts. If the ride has a drop-in or a paddle-in, then note the drop-in or the paddle-in as a "pre-event" activity pattern and check whether a ride is achieved. If a ride is achieved, then update the "pre-event" activity with the ride pattern. If a ride is not achieved or is not achieved, examine the accelerometer and/or gyroscope data.

iii. Check whether there is a sudden change in speed and/or direction. If there is a sudden change in speed and/or direction, then check whether the rider has popped out of the wave. If the rider has not popped out of a wave, check whether the sensor and/or device comprising the sensor has dropped. If the sensor and/or device comprising the sensor is not dropped, then check whether the sensor and/or device comprising the sensor is hit. If the sensor and/or device comprising the sensor is not hit, then determine whether there is a collision. If there is not a collision, check whether the rider performed an aerial and/or trick. If the rider did not perform an aerial and/or a trick, then monitor the interval of data following impact. If the rider does not resume "pre-event" activity, then report the event as a wipeout. If the rider resumes "pre-event" activity, then check whether the rider is still riding. If the rider is still riding, then update "pre-event" activity. If the rider is not still riding, then report no wipeouts.

iv. Check whether there is a sudden change in speed and/or direction. If there is not a sudden change in speed and/or direction, the rider has popped out of a wave, the sensor and/or device comprising the sensor is dropped, the sensor and/or device comprising the sensor is hit, there was a collision, and/or the rider performed an aerial or a trick, then check whether the rider is still riding. If the rider is still riding, then update "pre-event" activity with the ride pattern. If the rider is not still riding, then report no wipeouts.

Figure 23:
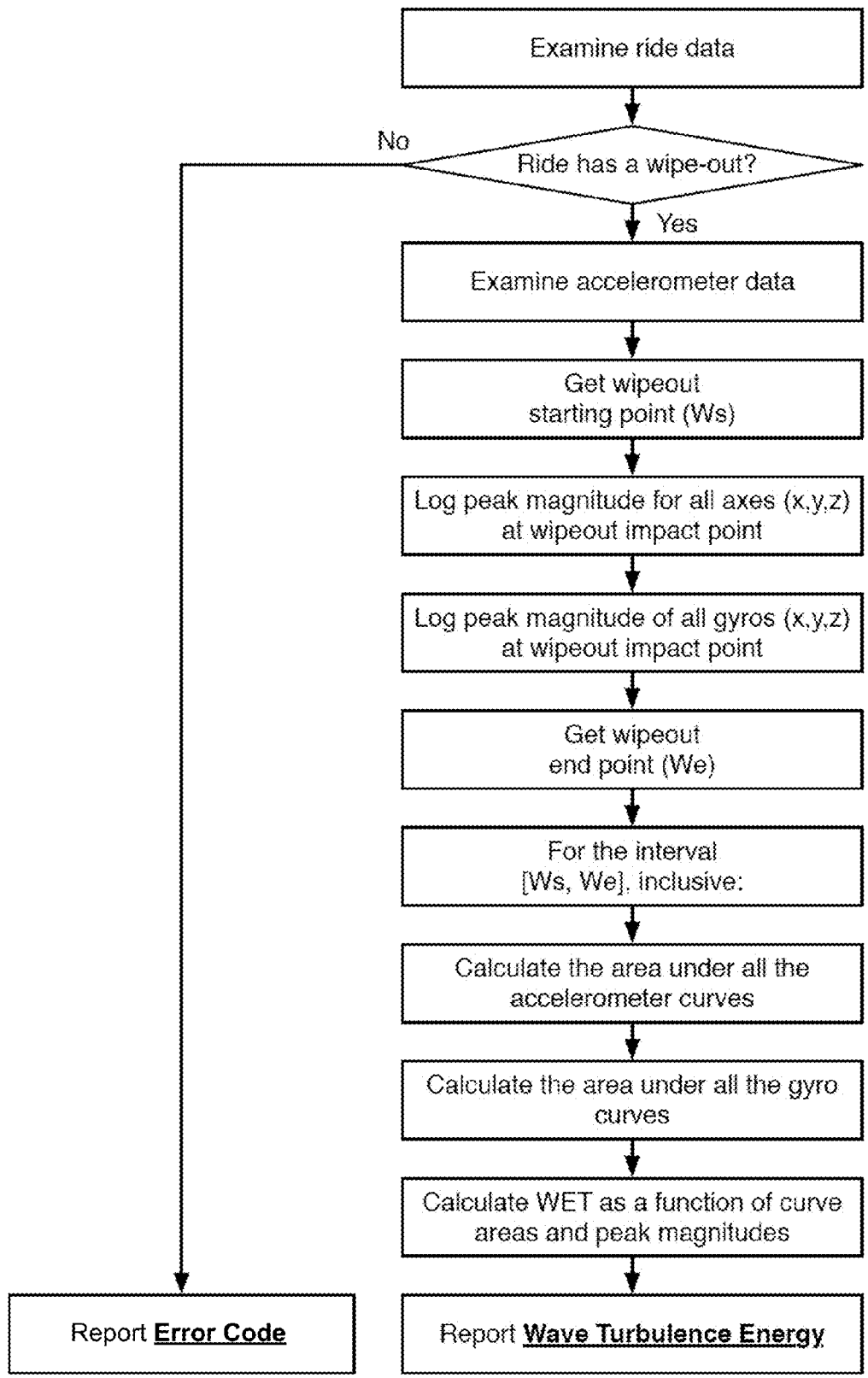
FIG. 23 shows a non-limiting example of the platforms, systems, methods and computer readable media to monitor a shore and near shore environment, in a non-limiting example a method for determining breaking wave energy is displayed.

In some embodiments, the platforms, systems, methods and computer readable media monitor a shore and/or near shore environment to quantitatively characterize breaking wave energy. In some embodiments, the wave break energy is averaged across multiple riders riding a single wave. In some embodiments, the wave break energy is calculated for a single rider riding multiple waves. In some embodiments, the wave break energy is calculated for a single rider riding a single wave. In some embodiments, the sensor is worn and/or attached to the user. In some embodiments, the sensor is attached to the user's surf board and/or near water recreationist equipment. In some embodiments the sensor comprises an accelerometer and/or a gyroscope. In some embodiments, a method to calculate breaking wave energy is shown in a non-limiting example in FIG. 23, the method comprising the steps:

i. Examine ride data to determine if the ride has a wipe-out. If the ride does not have a wipe-out, report an error code. If the ride has a wipe-out, examine the accelerometer data to get the wipeout starting point (Ws) and log peak magnitudes for one or more accelerometer axes (e.g., x, y, z) at the wipeout impact point.

ii. Log the peak magnitude of one or more gyroscope axes (e.g., x, y, and z) at the wipeout impact point.

iii. Get the wipeout end point (We).

iv. For the interval [Ws, We], calculate the area under all accelerometer curves, calculate the area under all gyroscope curves, and calculate the breaking wave energy as a function of curve areas and peak magnitudes.

v. Report the breaking wave energy

Figure 24:
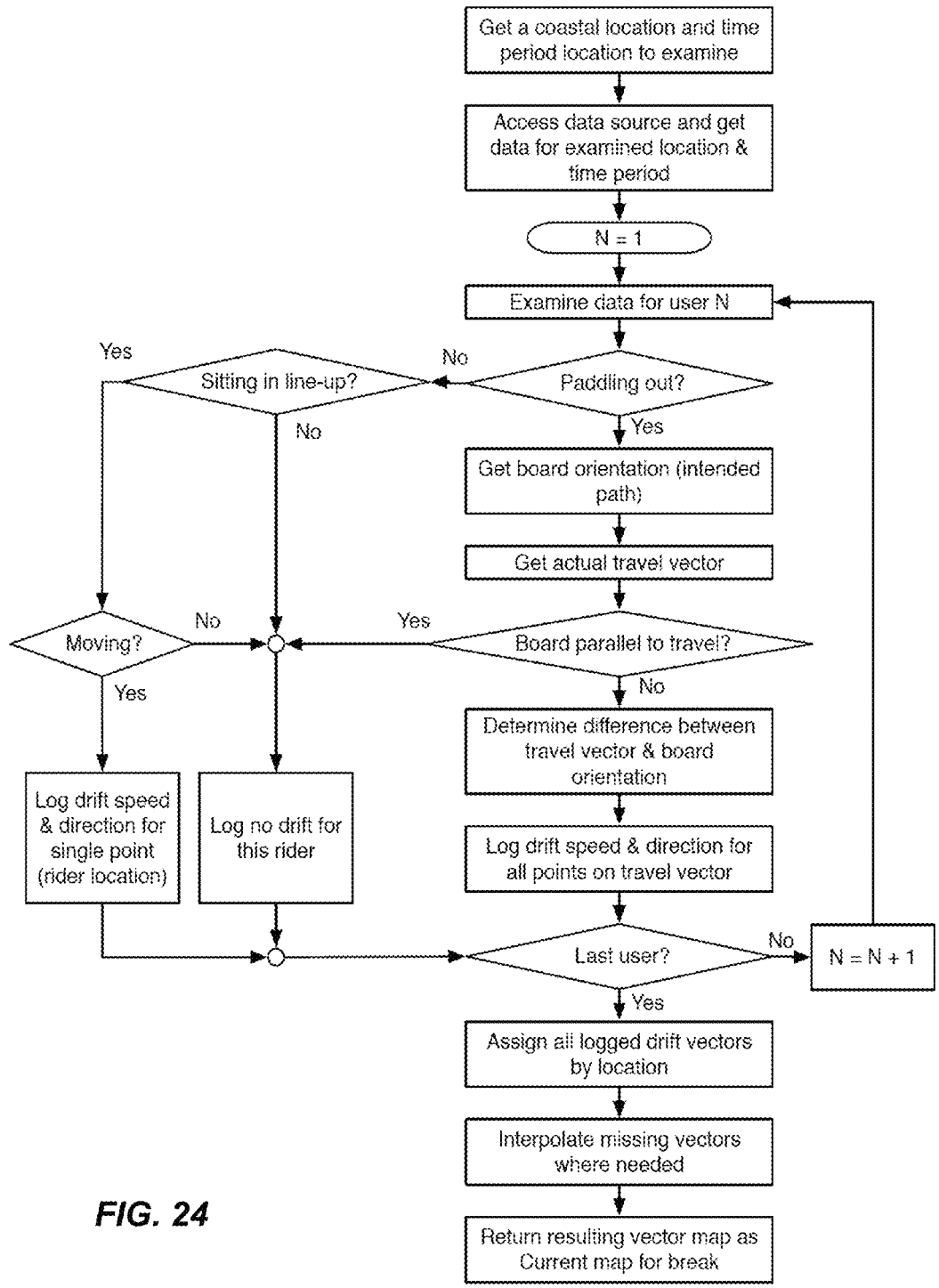
FIG. 24 shows a non-limiting example of the platforms, systems, methods and computer readable media to monitor a shore and near shore environment, in a non-limiting example a method for calculating current is shown.

In some embodiments, the platforms, systems, methods and computer readable media monitor a shore and/or near shore environment to calculate coastal currents such as near-shore currents or rip currents. In some embodiments, multiple, randomly located detectors are used to collect data from which current is calculated. In some embodiments, one or more detectors are moving. In some embodiments, the method monitors surfers paddling and/or sitting in a line-up. In some embodiments, a surfer sitting in a line up generates drift data. In some embodiments, a surfer in motion generates a set of data along a path. In some embodiments, the data are vectors indicating a direction and speed of travel. In some embodiments, a plurality of vectors are analyzed to calculate current. In some embodiments, a method calculate current is shown in a non-limiting example in FIG. 24, the method comprising the steps:

i. Determine a coastal location time period to examine.

ii. Access data source.

iii. Retrieve data from data source according to selected location and time period.

iv. For users N=1 to N, Examine data for user N according to the following:
 a. Determine whether the user is paddling.
 b. If the user is not paddling, determine whether the user is sitting in the line-up. If the user is not sitting in the line-up, log no drift for the user.
 c. If the user is not paddling, and the user is sitting in the line-up, determine whether the user is moving. If the user is not moving, log no drift for the user. If the user is moving, log drift speed and direction for the user location.
 d. If the user is paddling, determine board orientation and actual travel vector
 e. If board is not parallel to travel vector, log no drift for the user.
 f. If the board is parallel to the travel vector, determine the difference between the travel vector and the board orientation. Log the drift speed and direction data for all points on the travel vector.
 g. Determine whether user N is the last user. If user N is not the last user, N=N+1.

v. If user N is the last user, assign all logged drift vectors by location and interpolate missing vectors as needed.

vi. Return resulting vector map as the map depicting the current map for the coastal location and/or break.

In some embodiments, if the current vector or vectors are perpendicular to a baseline on the shore, then the current is a rip current. If the current is a rip current, then the width and length of the rip current can be determined by comparing all adjacent drift vectors and designating the rip current boundaries as a pair of lines that separates adjacent vectors where there is a dramatic difference in speed and/or direction. In some embodiments rip current vectors have opposite direction to wave velocity.

Figure 25:
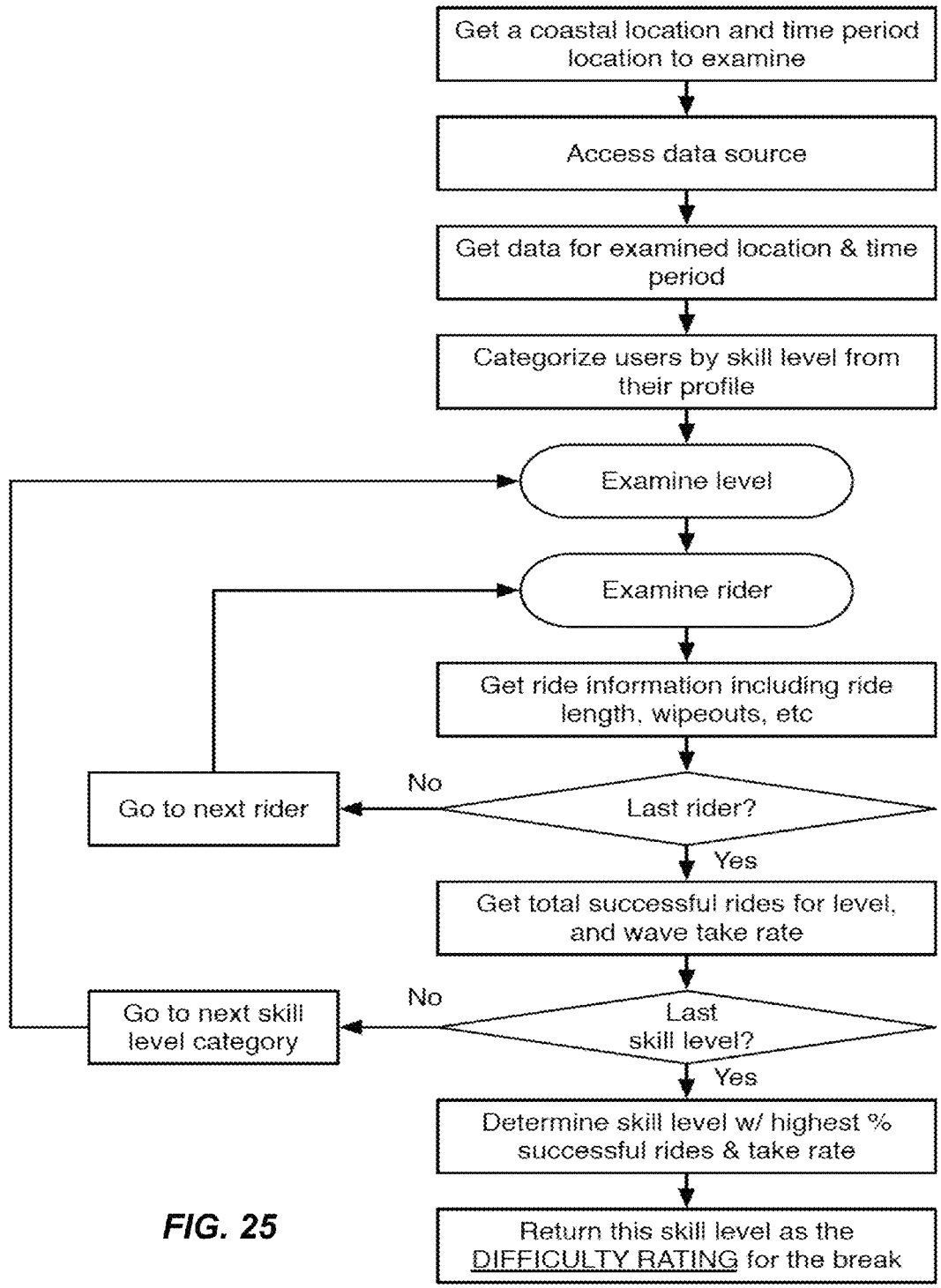
FIG. 25 shows a non-limiting example of the platforms, systems, methods and computer readable media to monitor a shore and near shore environment, in a non-limiting example a method for determining difficulty rating for a break is depicted.

In some embodiments, the platforms, systems, methods and computer readable media monitor a shore and/or near shore environment to determine a difficulty rating for a break. In some embodiments, multiple, randomly located detectors are used to collect data from which a difficulty rating is calculated. In some embodiments, a difficulty rating for a break is determined by examining the skill level of the surfers in a break and their relative successes of surfing in the break. In some embodiments, success is determine by monitoring a take rate, for example the number of waves taken compared to the number of waves presented, and the number of success surfing rides, for example a ride that does end in a wipeout and/or other accident. In some embodiments, a method to determine a difficulty rating for a break is shown in a non-limiting example in FIG. 25, the method comprising the steps:

i. Determine a coastal location time period to examine.

ii. Access data source.

iii. Retrieve data from data source according to selected location and time period.

iv. Categorize users by skill level extracted from the respective user's profile.

v. For skill levels S=1 to S, examine user data for skill level S according to the following:
 a) For users N=1 to N, Examine data for user N according to the following: Examine the skill level of the rider and the rider. Determine ride information, for example ride length and/or number of wipeouts. Determine whether user N is the last user. If user N is not the last user, N=N+1.
 b) If S is not the last skill level, S=S+1.

vi. If S is the skill level, determine the skill level with the highest % successful rides and take rate.

vii. Return this skill level as the difficulty rating for the break.

Figure 27:
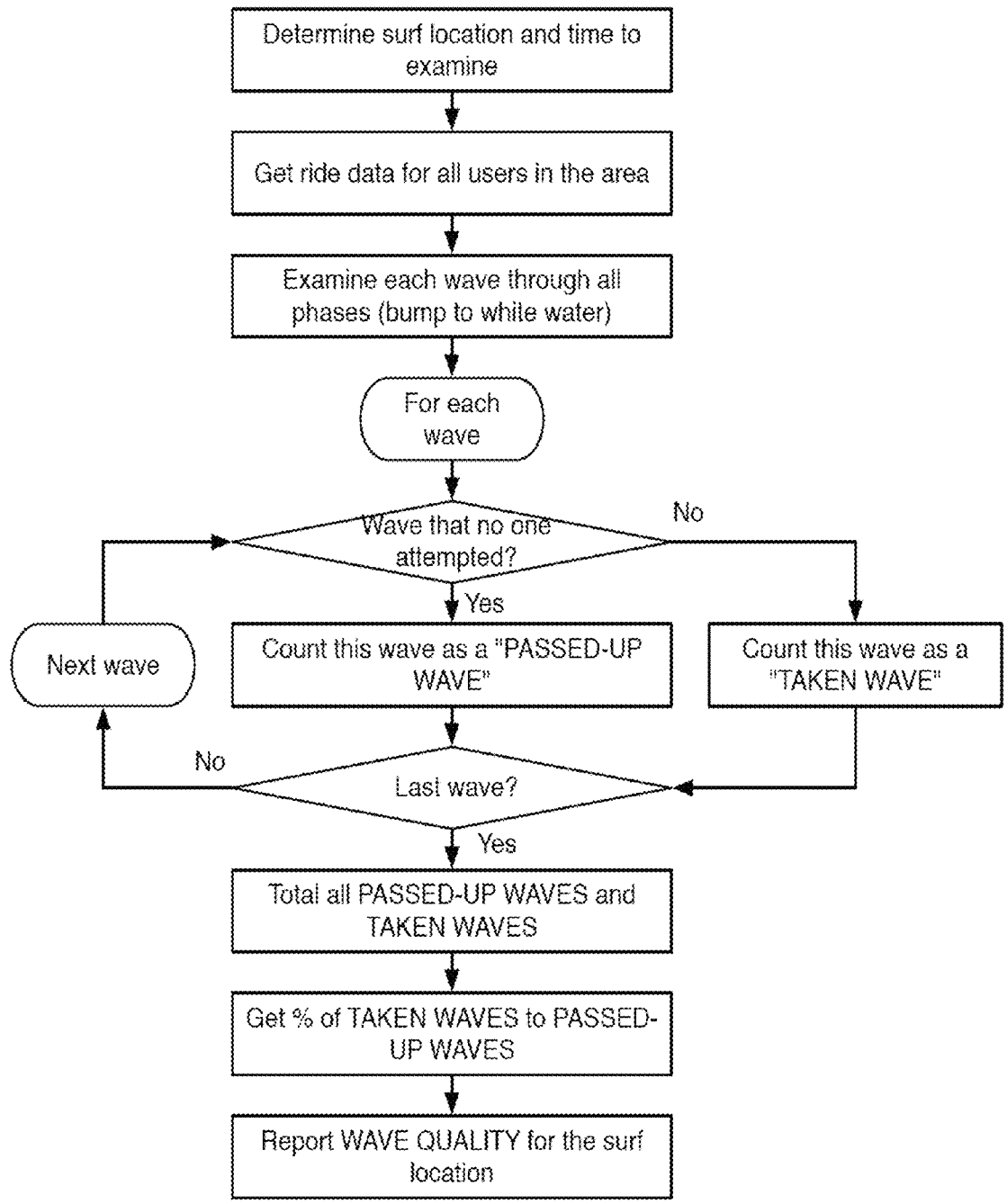
FIG. 27 shows a non-limiting example of the platforms, systems, methods and computer readable media to monitor a shore and near shore environment, in a non-limiting example of a method for determining a quantitative indicator for wave ride quality at a surfing location, also referred to as a "stoke factor" is depicted.

Referring to FIG. 27, in some embodiments, the platforms, systems, methods and computer readable media monitor a shore and/or near shore environment to determine a wave ride quality (also known as the "stoke factor") at particular surfing location according to the depicted method. In the non-limiting example method depicted in FIG. 27, a quantitative index is used to describe the suitability of waves at a particular surf location. In some embodiments, the method compares the number of waves passed up to the number of waves surfed to determine a mathematical score to express the quality of a surf location. In some embodiments, the experience level of the surfer is accounted for when describing the surf quality.

Figure 28:
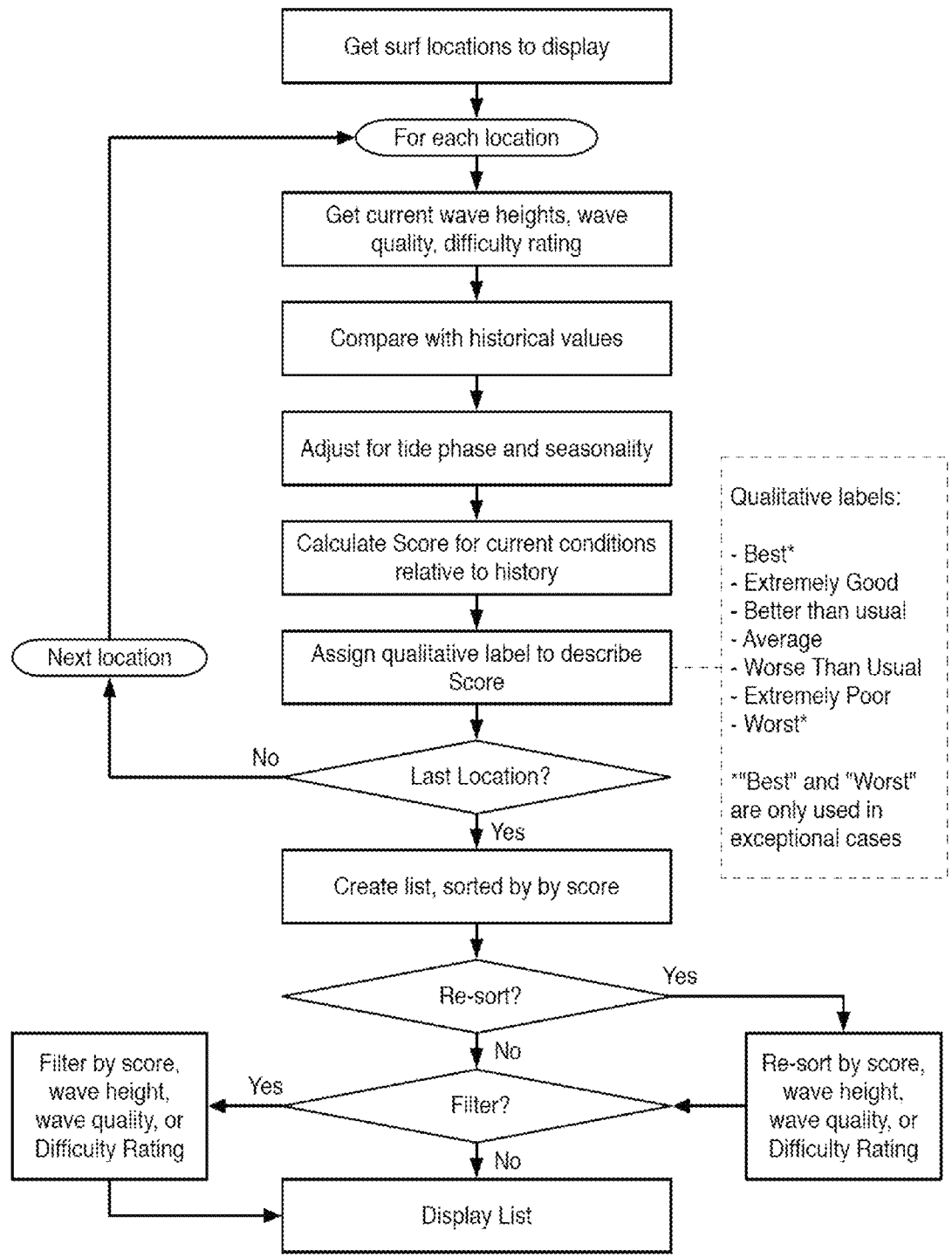
FIG. 28 shows a non-limiting example of the platforms, systems, methods and computer readable media to monitor a shore and near shore environment, in a non-limiting example of a method for ranking and displaying surf locations for informed browsing is shown.

Referring to FIG. 28, in some embodiments, the platforms, systems, methods and computer readable media monitor a shore and/or near shore environment to rank and display surf locations for informed browsing according to the depicted method. In some embodiments, surfers will desire a particular break condition that is not realized by only wave heights. In some embodiments, breaks are given a potential score based on additional factors such as the rating of a wave for a particular surfing skill level.

Application Programming Interface and Graphical User Interface

In some embodiments, the platforms, systems, methods and computer readable media comprise an application programming interface, the application programming interface providing access to the environmental data. In some embodiments the application programming interface interacts with the server using data query language. In some embodiments the application programming interface comprises data query language. In some embodiments, the application programming interface provides access to the raw sensor data or cleaned data. In some embodiments, the application programming interface provides access to the pre-analytic data. In some embodiments, the application programming interface provides access to the analytic data. In some embodiments, a device comprising a processor configured to provide an application, comprising a software module configured to use the API provides access one or more of the environmental data, the raw sensor data or cleaned data, the pre-analytic data, the analytic data, and/or the environmental data report. In some embodiments, the application comprises a web application, software application, and/or mobile application or applet.

In some embodiments, the platforms, systems, methods and computer readable media further comprises a graphical user interface, the graphical user interface provides access to the environmental data. In some embodiments, the application programming interface provides access to the raw sensor data or cleaned data. In some embodiments, the graphical user interface providing access to the pre-analytic data. In some embodiments, the platform further comprises a graphical user interface, the graphical user interface providing access to the analytic data. In some embodiments, a device comprising a processor configured to provide an application comprising a software module configured to display a graphical user interface provides access to one or more of the environmental data, the raw sensor data or the cleaned data, the pre-analytic data, the analytic data, and/or the environmental data report. In some embodiments the graphical user interface is displayed as a standalone application or as an extension to an existing application. In some embodiments, the graphical user interface is a web application. In some embodiments, the graphical user interface is a pop-up window and/or an overlay. In some embodiments, the graphical user interface is a website. In some embodiments the graphical user interface is a mobile application.

Digital Processing Device

In some embodiments, the platforms, systems, media, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art. In some embodiments, the digital processing devices is a computational device, an external and/or any other device described herein.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Server Configuration

In some embodiments, a suitable server configuration includes 1, 2, 3, 4, 5, 6, 7, 8, 9, 10, 20, 30, 40, 50, 60, 70, 80, 90, 100, 200, 500, 1000 or more servers, one or more server farms, and cloud-based server resource allocation systems. In some embodiments, the servers are co-located. In some embodiments, the servers are located in different geographical locations. In some embodiments the servers are housed in the same rack. In some embodiments, the servers are housed in multiple racks. In some embodiments, the multiple racks are in the same geographic region. In some embodiments the racks are in different geographic regions. [In some embodiments, the server is or a plurality of servers employ a software framework such as Hadoop, Google MapReduce, HBase, and/or Hive, for storage and large-scale processing of data-sets on clusters of hardware.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web applications software framework such as Hadoop, Google MapReduce, HBase, and/or Hive, for storage and/or large-scale processing of data-sets on clusters of hardware is employed. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Swift, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, Google Play, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, Swift, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of clinical trial, profile, and/or molecular phenotype information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices. Persons of ordinary skill in the art will recognize that the methods, platforms, systems and media described herein, in some embodiments, require big data storage and analysis platforms.

While embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-implemented shore or near shore environment monitoring system comprising a server comprising a server processor and non-transitory computer-readable storage media encoded with a computer program including instructions executable by the server processor to create a server application comprising:
   a. a software module configured to receive environmental data from a plurality of sensors, each sensor associated with a near shore water recreationist or near shore water recreationist equipment, wherein each sensor comprises:
      i. a detector configured to collect environmental data pertaining to a shore or near shore environment; and
      ii. a communications element configured to transmit the environmental data collected by the detector;
   b. a software module configured to parse and clean the environmental data received from each sensor;
   c. a software module configured to apply an algorithm to the parsed and cleaned environmental data to generate pre-analytic data, the pre-analytic data comprising one or more events and one or more conditions to which one or more sensors was subjected, the pre-analytic data comprising one or more of: shore exposure, sea level rise, wave position, wave travel direction, wave travel speed, wave and set timing, wave kinetic energy, wave potential energy, wave break energy, shore current speed, shore current direction, wave heights, and wave phase;
   d. a software module configured to apply an algorithm to a set of pre-analytic data to generate analytic data; and
   e. a software module configured to generate an environmental data report comprising a shore or near shore environmental condition, the shore or near shore environmental condition generated using analytic data.

2. The system according to claim 1, wherein the detector comprises one or more of: an accelerometer, a gyroscope, a compass, an altimeter, a clock, and a GPS.

3. The system according to claim 1, wherein cleaning the environmental data comprises one or more of: removing erroneous data, removing outlier data, flagging erroneous data, interpolating missing data, and flagging outlier data.

4. The system according to claim 1, wherein the pre-analytic data comprises user behavior comprising one or more of: walking, paddling, swimming, floating, dropping into a wave, riding a wave, wiping out, or exiting a wave.

5. The system according to claim 1, wherein the pre-analytic data comprises near shore dynamics comprising one or more of: shore exposure, sea level rise, wave position, wave travel direction, wave travel speed, wave and set timing, wave kinetic energy, wave potential energy, wave break energy, shore current speed, shore current direction, wave heights, and wave phase.

6. The system according to claim 1, wherein the analytic data comprises trends of a plurality of events, correlations of a plurality of events, trends of a plurality of conditions, correlations of a plurality of conditions, trends of a plurality of events and conditions, or correlations of a plurality of events and conditions.

7. The system according to claim 1, wherein the analytic data comprises one or more of: surf condition, surf condition difficulty level, surf location quality, wave patterns, shore exposure, surf location conditions compared to historic potential, and surf location current ranking compared to other surf locations.

8. The system according to claim 1, wherein the environmental data report comprises a surf report, and wherein the shore or near shore environmental condition comprises one or more of: wave height, wave patterns, wave frequency, wave timing, surf condition, surf condition difficulty level, surf location quality, surf location wave quality, surf location conditions compared to historic potential, surf location current ranking compared to other surf locations, and shore exposure.

9. The system according to claim 1, wherein the environmental data report comprises a meteorological report, and wherein the shore or near shore environmental condition comprises one or more of: weather information, tide information, water condition, wave height, wave frequency and timing, current information, surf conditions, and surf location wave quality.

10. The system according to claim 1, wherein the environmental data report comprises a geographical report, and wherein the shore or near shore environmental condition comprises one or more of: coastline changes, shore or near shore topology, ocean floor topology, and bathymetry.

11. The system according to claim 1, wherein the environmental data report comprises an ecological report, and wherein the shore or near shore environmental condition comprises one or more of: sea level rise, erosion, bio-matter data, water pH, water salinity, and pollutant levels.

12. The system according to claim 1, wherein the environmental data report comprises a municipal report, and wherein the shore or near shore environmental condition comprises information related to coastal tourism, infrastructure development, transportation, residential development, public health, coastal resilience, maritime services, and adaptation.

13. The system according to claim 1, wherein the near shore water recreationist comprises a surfer, a stand-up paddle boarder, a paddle boarder, a body boarder, a boogie boarder, a body surfer, a kayaker, a swimmer, a snorkeler, a free diver, a diver, or a person in the water.

14. The system according to claim 1, wherein the sensor is worn by the near shore water recreationist, the sensor worn on a wrist, an armband, a piece of clothing, a wet suit, a piece of footwear, or a piece of swimwear.

15. The system according to claim 1, wherein the near shore water recreationist equipment comprises a surfboard, a kayak, a paddle board, a body board, a raft, an inner tube, a flotation device, and a device associated with the near shore water recreationist.

16. The system according to claim 15, wherein the sensor, the detector, or the sensor and the detector is incorporated into one or more fins of the surfboard, the paddle board, or the body board.

17. The system according to claim 1, wherein the communications element is configured to transmit the environmental data to a computational device comprising a computer, a cellular phone, a smart phone, a tablet, a smart watch, an activity tracking device, or a sports sensor, and wherein the computational device comprises a communications element configured to transmit the environmental data to the software module configured to receive the environmental data.

18. The system according to claim 17, wherein the computational device comprises a processor configured to provide an application comprising a software module configured to apply an algorithm to parse and clean the environmental data, the cleaned environmental data transmitted to the server.

19. The system according to claim 18, wherein the computational device comprises a software module configured to apply an algorithm to the cleaned environmental data to generate pre-analytic data, the pre-analytic data transmitted to the server.

20. The system according to claim 1, wherein environmental data collected by at least a first portion of the plurality of sensors is cross checked with environmental data collected by at least a second portion of the plurality of sensors so as to reconcile the environmental data collected by each cross-checked sensor, wherein reconciliation is based on one or more of: location where the environmental data was collected and time and date the environmental data was collected.

21. A computer-implemented shore or near shore environment monitoring system comprising a server comprising a server processor and non-transitory computer-readable storage media encoded with a computer program including instructions executable by the server processor to create a server application comprising:
  a) a software module configured to receive environmental data from a plurality of sensors, each sensor associated with a near shore water recreationist or near shore water recreationist equipment, wherein each sensor comprises:
    i) a detector configured to collect environmental data pertaining to a shore or near shore environment; and
    ii) a communications element configured to transmit the environmental data collected by the detector;
  b) a software module configured to parse and clean the environmental data received from each sensor, wherein cleaning the environmental data comprises one or more of: removing erroneous data, removing outlier data, flagging erroneous data, interpolating missing data, and flagging outlier data;
  c) a software module configured to apply an algorithm to the parsed and cleaned environmental data to generate pre-analytic data, the pre-analytic data calculated based one or more events and one or more conditions to which one or more sensors was subjected, the pre-analytic data comprising one or more of: shore exposure, sea level rise, wave position, wave travel direction, wave travel speed, wave and set timing, wave kinetic energy, wave potential energy, wave break energy, shore current speed, shore current direction, wave heights, and wave phase;

d) a software module configured to apply an algorithm to a set of pre-analytic data to generate analytic data, the analytic data comprising one or more of: surf condition, surf condition difficulty level, surf location quality, wave patterns, shore exposure, surf location conditions compared to historic potential, and surf location current ranking compared to other surf locations; and e) a software module configured to generate an environmental data report comprising a shore or near shore environmental condition, the shore or near shore environmental condition generated using analytic data.

* * * * *